June 13, 1933. C. R. GABRIEL 1,914,085
BLANK THREADING MACHINE
Filed Aug. 2, 1928 18 Sheets-Sheet 1

INVENTOR:
Charles R. Gabriel,
By Attorneys,
Fraser, Myers & Manley

June 13, 1933.  C. R. GABRIEL  1,914,085
BLANK THREADING MACHINE
Filed Aug. 2, 1928  18 Sheets-Sheet 6

INVENTOR:
Charles R. Gabriel,
By Attorneys,

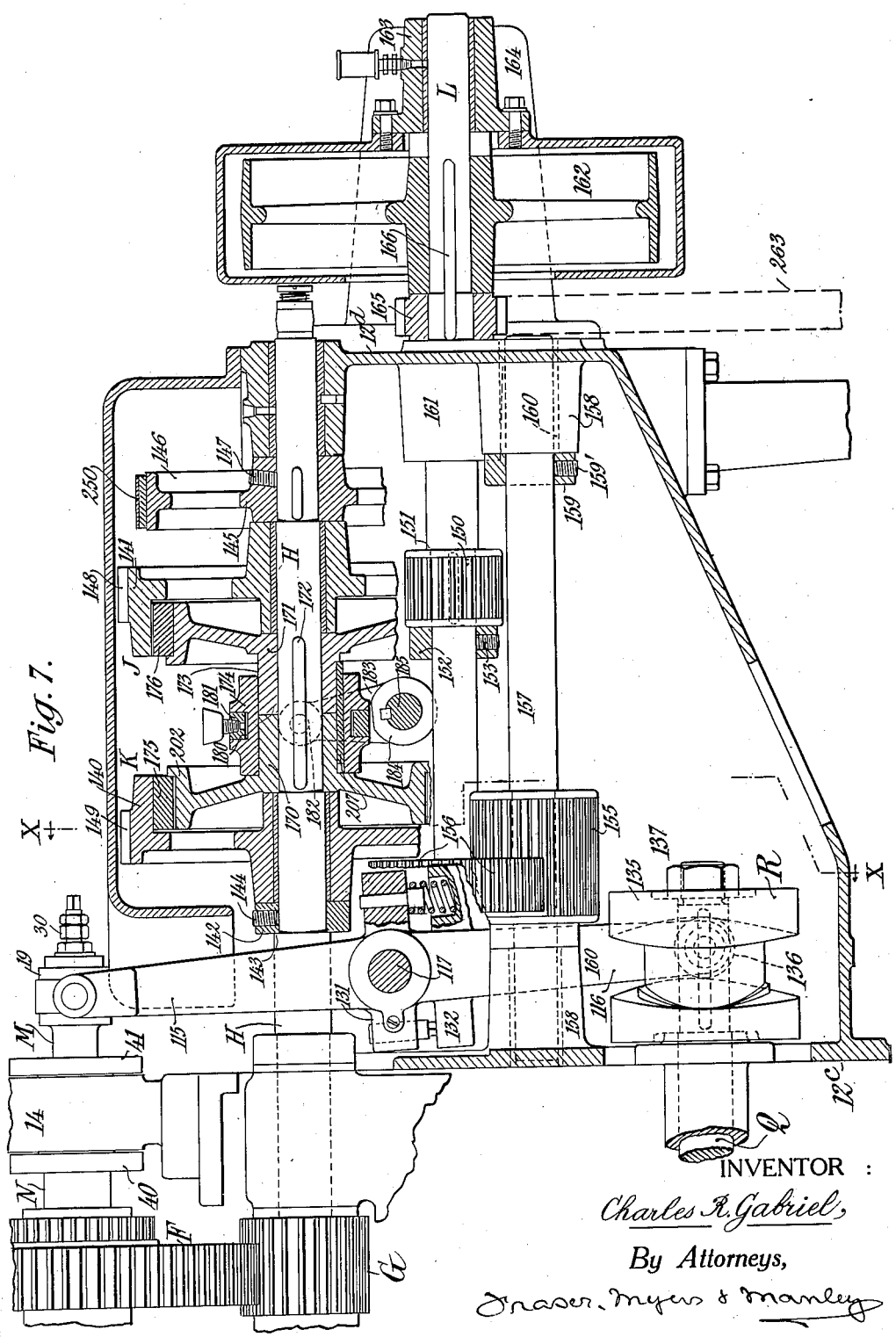

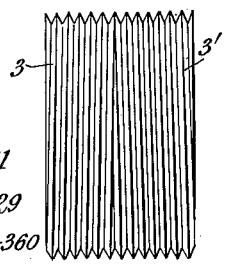
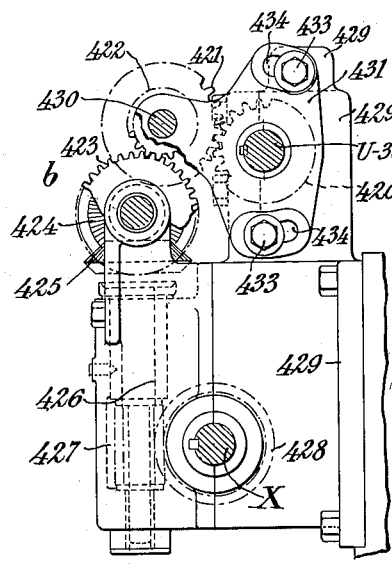
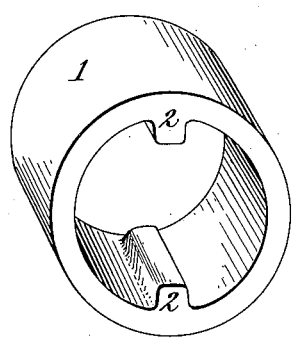
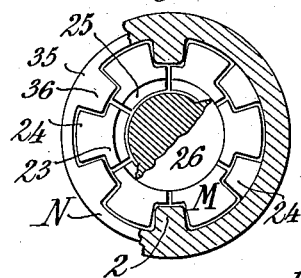
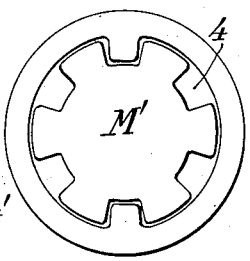
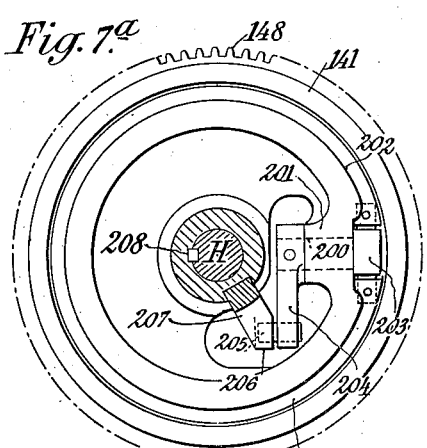
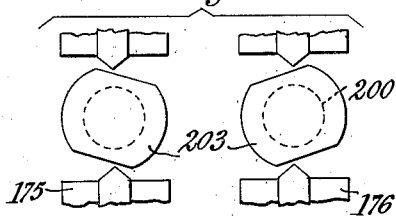
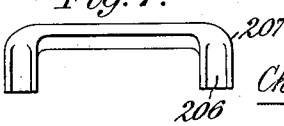

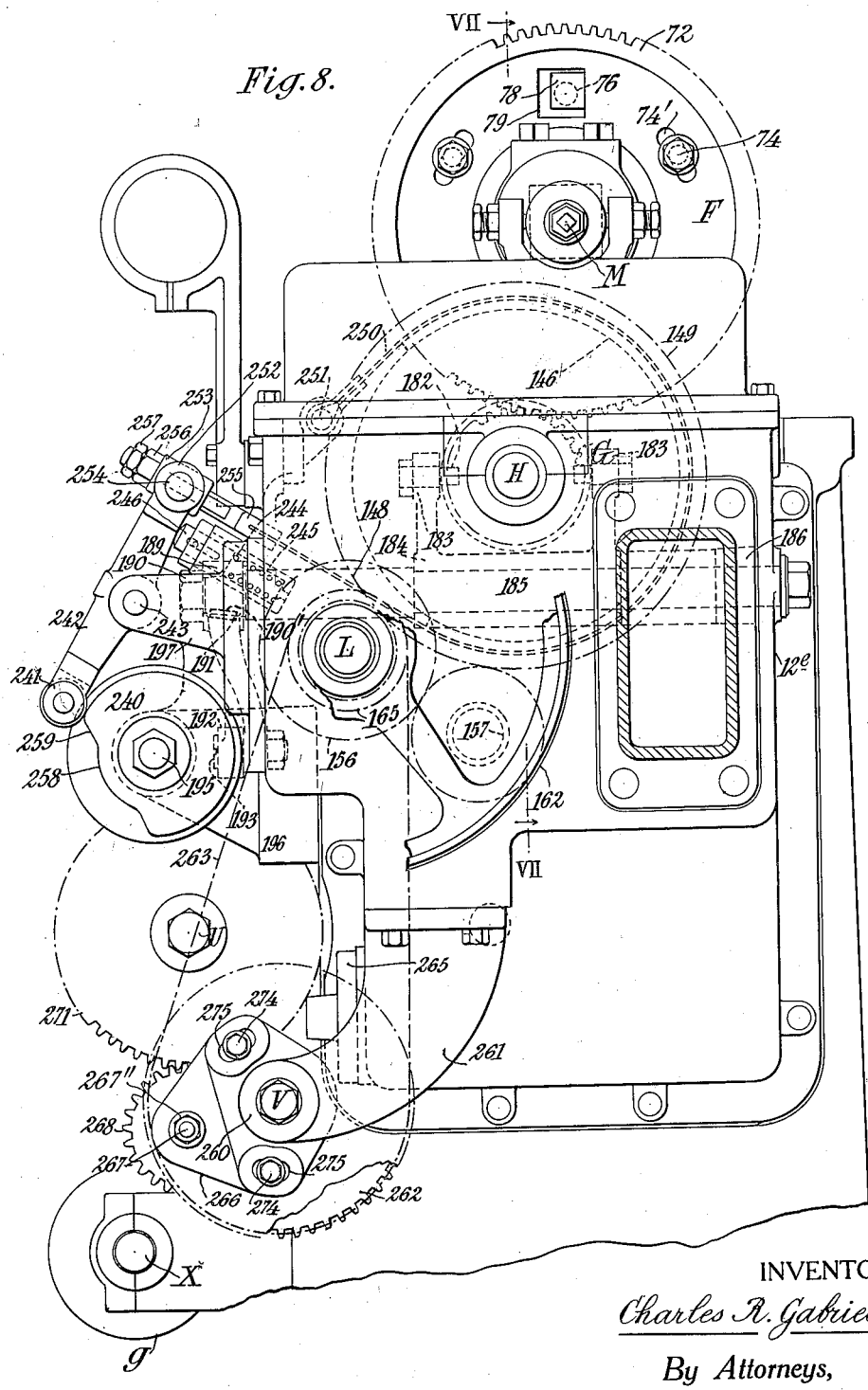

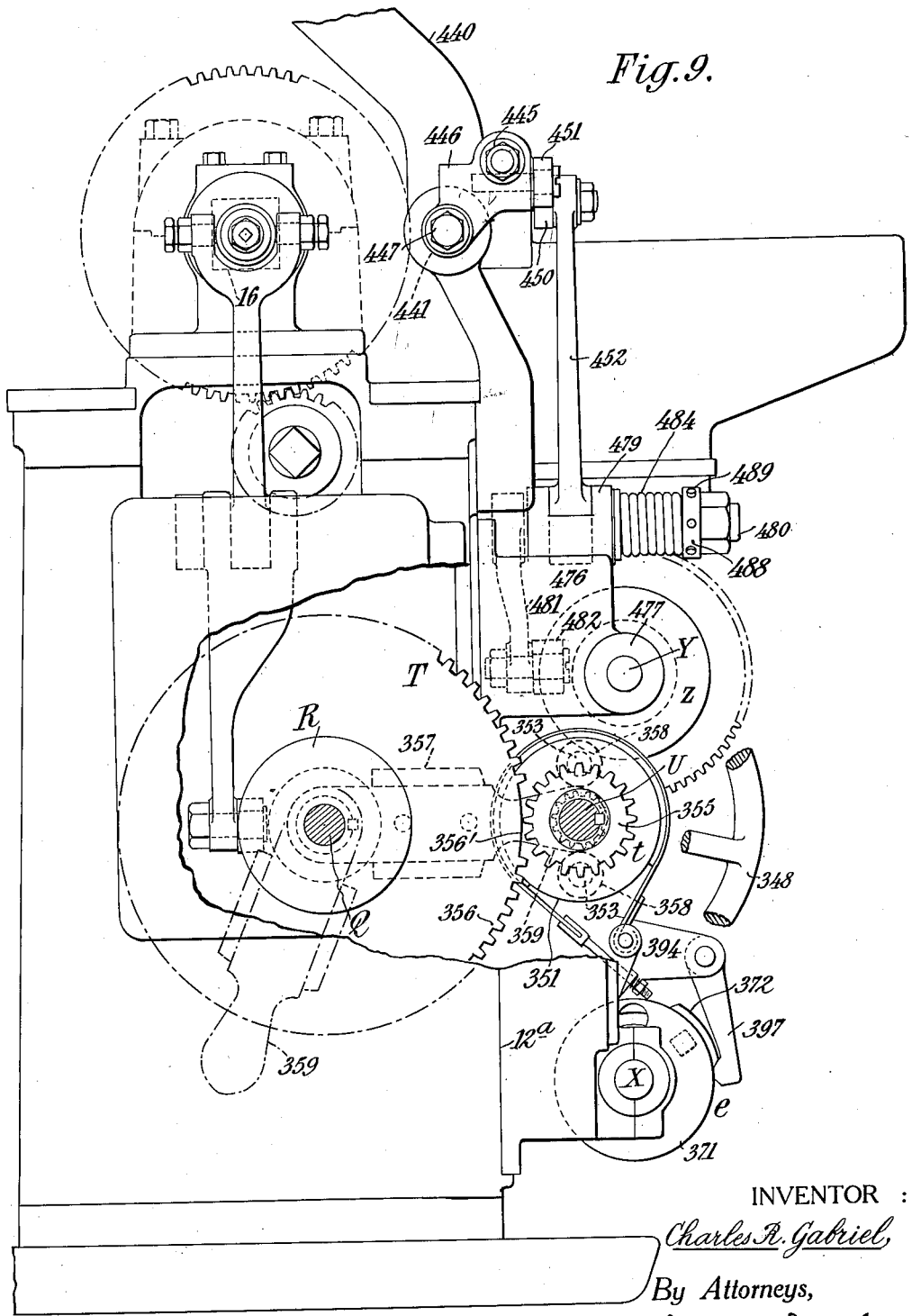

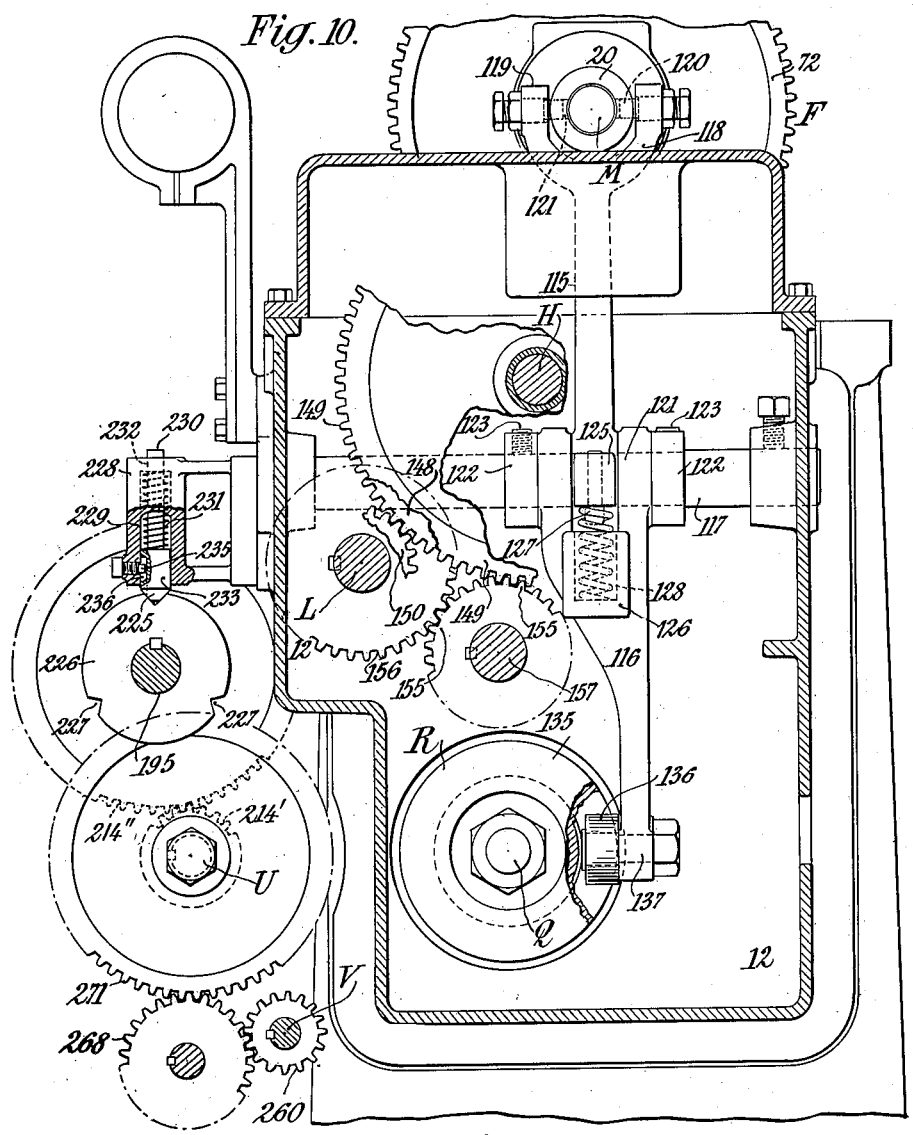

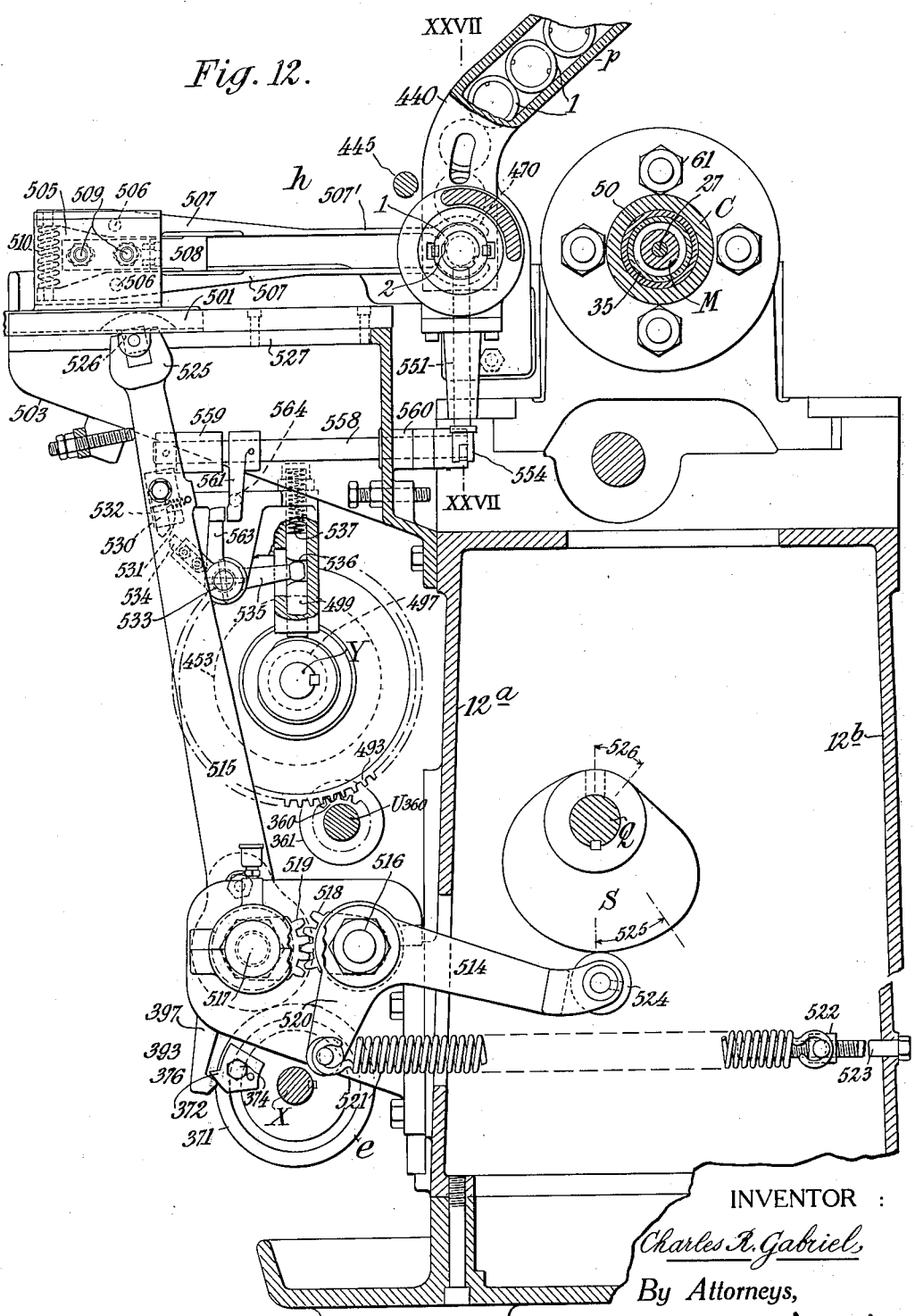

June 13, 1933.   C. R. GABRIEL   1,914,085
BLANK THREADING MACHINE
Filed Aug. 2, 1928   18 Sheets-Sheet 14
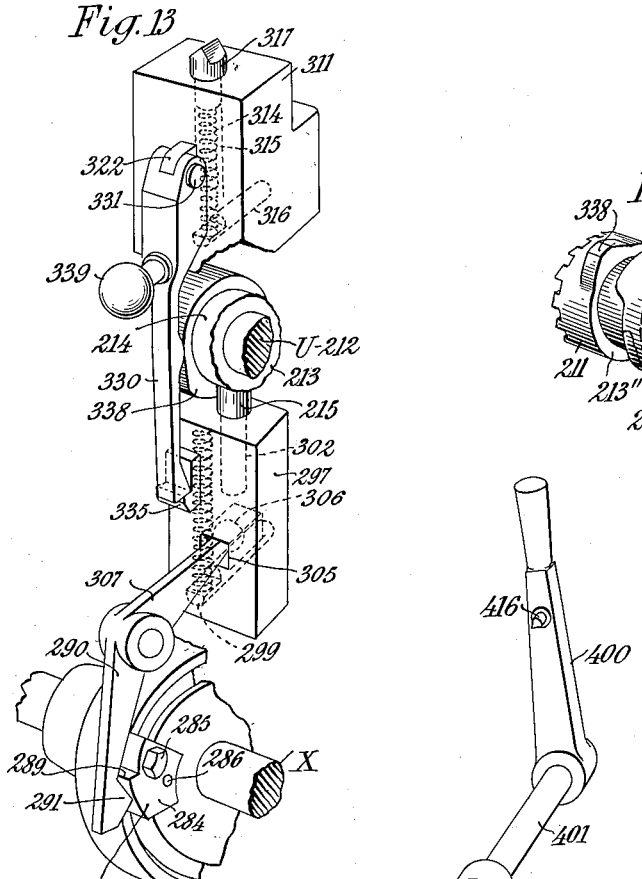
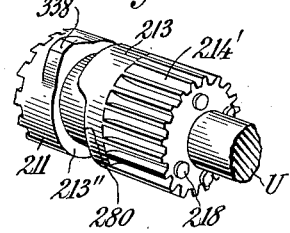
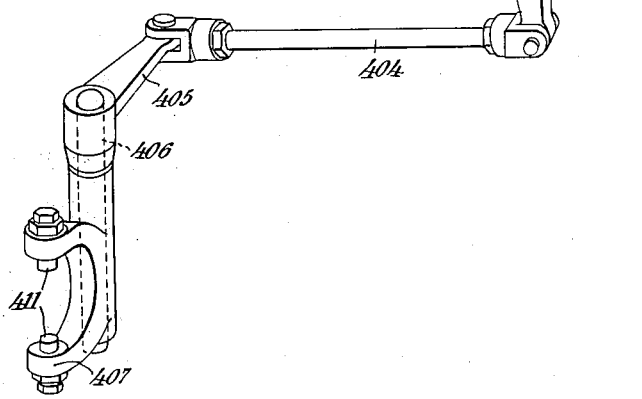
INVENTOR:
Charles R. Gabriel,
By Attorneys,
Fraser, Myers & Manley June 13, 1933.     C. R. GABRIEL     1,914,085
BLANK THREADING MACHINE
Filed Aug. 2, 1928     18 Sheets-Sheet 15
Fig. 16.
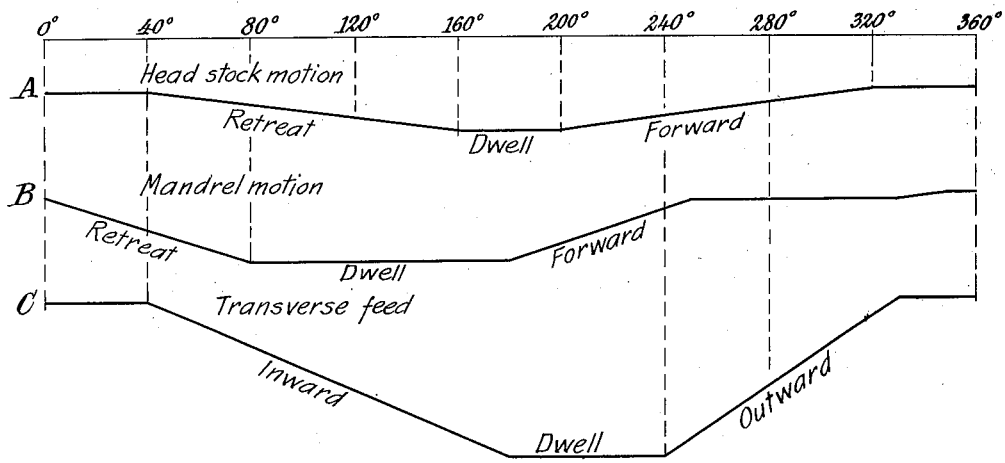
Fig. 15ª
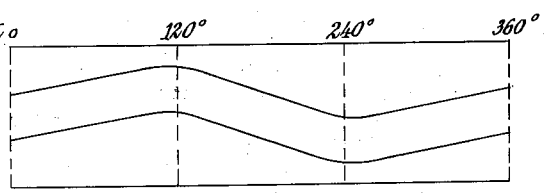
Fig. 16ª
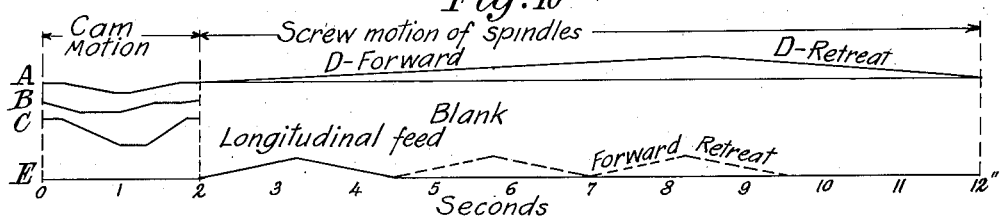
Fig. 15.
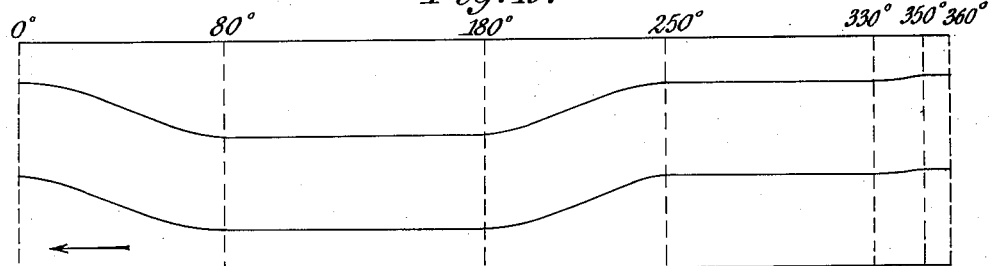
INVENTOR:
Charles R. Gabriel,
By Attorneys,
Fraser, Myers & Manley June 13, 1933.  C. R. GABRIEL  1,914,085
BLANK THREADING MACHINE
Filed Aug. 2, 1928   18 Sheets-Sheet 16
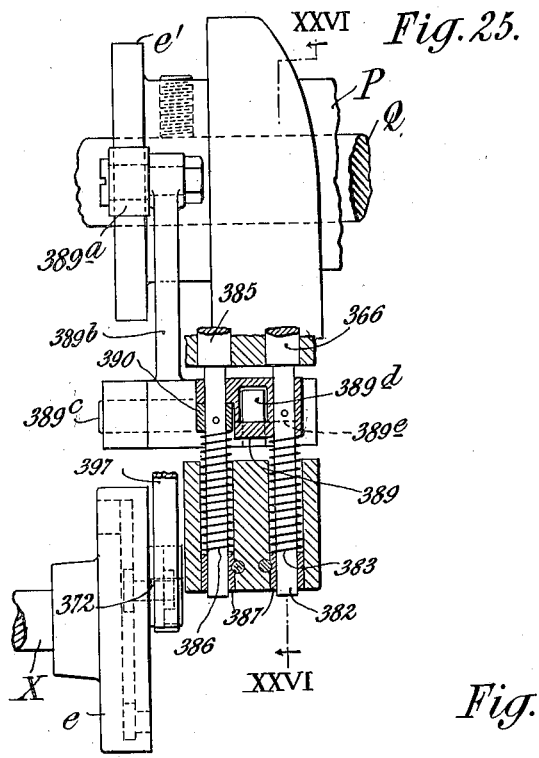
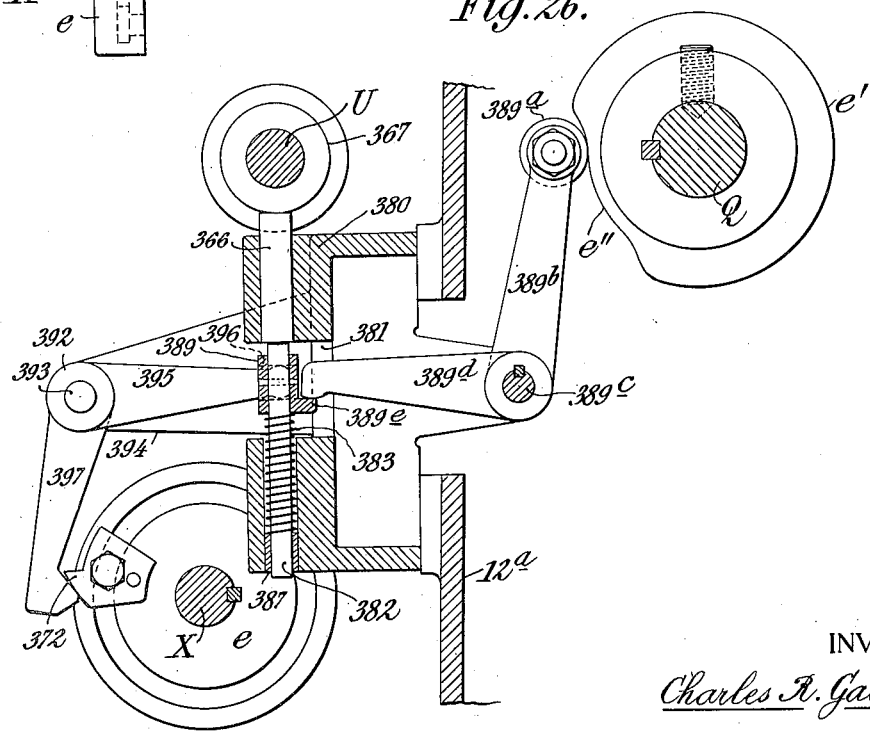
INVENTOR:
Charles R. Gabriel,
By Attorneys,
Fraser, Myers & Manley

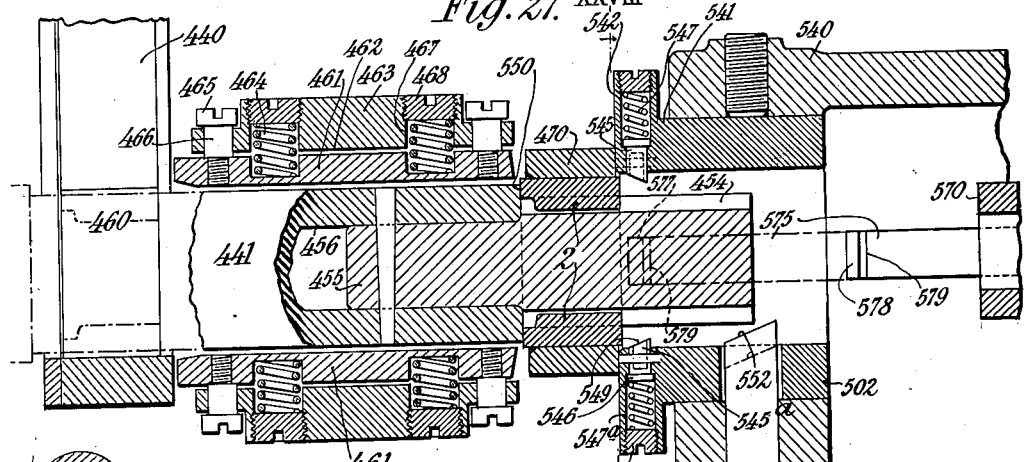

June 13, 1933.   C. R. GABRIEL   1,914,085
BLANK THREADING MACHINE
Filed Aug. 2, 1928   18 Sheets-Sheet 18

INVENTOR :
Charles R. Gabriel,
By Attorneys,
Fraser, Myers & Manley

Patented June 13, 1933

1,914,085

UNITED STATES PATENT OFFICE

CHARLES R. GABRIEL, OF BROOKLYN, NEW YORK, ASSIGNOR TO E. W. BLISS COMPANY, OF NEW YORK, N. Y., A CORPORATION OF DELAWARE

BLANK-THREADING MACHINE

Application filed August 2, 1928. Serial No. 297,009.

This invention relates to automatic screw-cutting machines, and in the preferred embodiment more particularly to machines for automatically threading pipe nipples such as are employed in the assembly of the usual cast radiator sections, such nipples being threaded from opposite ends with right and left hand pipe threads. It is desirable that these opposite threads should meet, and to a limited extent cross each other near the center of the nipple so that the abutting faces of radiator sections may be drawn into close contact when the nipple is screwed wholly within them. Such nipples being externally threaded over their entire surface, are provided with internal splines or the like, whereby the nipple may be prevented from being torsionally displaced while the threads are cut thereon, the said splines also serving subsequently to permit of the tightening of the nipple by means of a special internal wrench.

The object of this invention is to provide a screw-cutting machine which will automatically produce right and left-hand, threaded nipples or perform other screw-threading operations at a comparatively high rate of speed and with great accuracy. In the accomplishment of this result, the machine in its preferred embodiment is provided with screw-threading dies or chasers which engage the blank at opposite ends and simultaneously cut thereon right and left hand threads. These dies or thread-cutting tools are positively advanced along the blank at the speed required by the pitch of the thread which is being cut, so that such threads are not required to exert any axial thrust upon the said cutting tools, this resulting in a more accurate and smooth thread. The production speed of the machine is materially increased by reciprocating the tools almost immediately after they are withdrawn from the ends of the blank, at a materially higher speed than the motion required by the pitch of the threads when the cutters are in engagement with the blank, such reciprocation causing the tools to be momentarily separated from the blank holder a sufficient distance to permit of the removal of the finished piece of work and the ready insertion of a subsequent blank by automatic feeding mechanism. The production speed of the machine is further increased by providing a high speed reverse whereby the cutters are backed off the completed threads at a materially higher speed than they are permitted to advance during the actual threading operation, which latter speed is necessarily limited by the limiting cutting speed at which the material of the blank may be successfully worked. The cutting speed will differ with various materials, but for each material there is a limiting speed beyond which satisfactory thread-cutting cannot be reliably performed, as is well understood. There is, however, no such limitation in backing the cutters off the threaded blank.

A further object of the invention is to provide improved automatic timing means whereby friction clutches controlling the advance and backing off of the thread-cutting tools will be accurately controlled to insure threads of the desired length.

The invention further contemplates improved means for supporting the nipples or other hollow blanks while they are being acted upon by cutting tools, there being provided torsion-sustaining elements entering the blank from opposite ends whereby the torsion load on each element is only one-half that which would be imposed upon a support entering the blank from one end only. In addition to said torsion-sustaining elements, axially slidable members are adapted to be clamped against the ends of the hollow blank to prevent its axial displacement.

Another object of the invention is to provide an automatic feed for internally keyed or splined nipple blanks, whereby such blanks will be delivered to a mandrel with their keys disposed in accurate alignment with keyways formed in the mandrel.

A further object of the invention is to provide an automotive blank rejector and re-feed mechanism, whereby when a blank fails to slide along a gauge or test bar or to pass some other physical test, it will be rejected, such rejection resulting in the feeding of one or more additional blanks until a proper blank is fed. In the preferred embodiment of such mechanism, one or more blanks which fail to pass the automatic inspection are discarded and other blanks substituted therefor during a single production cycle, whereby while the machine is doing work upon one blank, a number of defective blanks will be rejected and a suitable blank deposited in a position ready to be carried to the acutal work holder upon the completion of the immediate production cycle. In this manner the production of the machine is not slowed up, even though a number of defective blanks are present in any lot deposited in the magazine, unless an unusual number of such defective blanks are delivered consequently one after another.

Further objects of the invention reside in the construction and combination of the mechanical elements, as hereinafter set forth.

In the following detailed description, reference is had to the accompanying drawings in which similar reference characters refer to corresponding elements, and wherein Figure 1 is a perspective view of an automatic nipple-threading machine constituting the preferred embodiment of the present invention.

Fig. 7 is a vertical axial cross-section of the friction clutches, and in addition shows in elevation certain of the driving connections thereof. This view also shows the right hand mandrel-actuating mechanism.

Fig. 7a is a side elevation of the right hand clutch (forward driving clutch) shown in Figs. 7 and 7b, as viewed from the left.

Fig. 7b is a front elevation of the forward and reverse driving clutches shown in section in Fig. 7, certain portions being cut away to show the clutch-actuating mechanism.

Fig. 7c is a front elevation of the member which connects the clutch-shifting collar with the two clutch-control arms.

Fig. 7d shows the angular relationship of the clutch-expanding cams when both clutches are in neutral.

Fig. 8 is an end view of the machine, the view being taken from the right in Fig. 1, portions of the driving pulley and its end bearing support being broken away.

Fig. 9 is an end view of the machine taken from the left, a portion of the frame being broken away to show the cam shaft acceleration mechanism.

Fig. 10 is a transverse cross-section taken along the line X—X of Figs 1, 4 and 7, the view being taken from the right.

Fig. 12 is a transverse cross-section taken along the line XII—XII of Figs. 1 and 5, the view being taken from the right.

Fig. 13 is a large scale perpective view of the working parts of the timing mechanism for the main drive friction clutches, which mechanism also appears in Figs. 1 and 4.

Fig. 14 is a perspective view of the driven element of the dog clutch which is controlled by the mechanism shown in Fig. 13.

Fig. 15 is a development of the cam which actuates the mandrels.

Fig. 15a is a development of the cam which controls the main driving clutches.

Fig. 16 is a timing diagram showing the relationship between the various movements of the head-stocks, mandrels, and the transverse blank feed.

Fig. 16a is a diagram showing the timing of the longitudinal blank feed with respect to the cam and screw-actuated movement of the spindles and the movement of other parts during a complete production cycle.

Fig. 17 is a perspective view of a nipple blank.

Fig. 18 is a full scale side elevation of the nipple as it appears after being threaded.

Fig. 19 is a transverse cross-section of one form of mandrel which may be used to support the nipple blank during the threading operation.

Fig. 20 is a transverse cross-section of the form of corresponding mandrel shown to the left in Fig. 3.

Fig. 21 is a detailed view of the adjustable mounting for intermediate driving gear 268.

Fig. 22 is a fragmentary view of the lower end of the headstock slide-actuating lever, and shows the adjusting means for varying the position of the cam roller at the lower end of such lever.

Fig. 23 is a side elevation of the cycle shaft gear drive.

Fig. 25 is a front elevation and partial section of the timing mechanism which controls the movement of the main cam shaft.

Fig. 26 is a transverse cross-section of the same mechanism, the view being taken along the line XXVI—XXVI of Fig. 25.

Fig. 27 is a vertical axial cross-section taken along the line XXVII of Fig. 12, showing details of the feed bar and blank-rejector mechanism on a larger scale.

Fig. 28 is a transverse cross-section taken along the line XXVIII of Fig. 27.

Fig. 29 is a plan view of the rock shaft and connections through which the transverse feed arm times the movement of the longitudinal blank feed.

Fig. 32 is a perpective view of the linkage through which the manually-controlled clutch is actuated.

Various features of the nipple-threading machine illustrated in the accompanying drawings and presently to be described are applicable to a variety of screw-cutting machines and analogous mechanisms. The machine illustrated, which constitutes the preferred embodiment of the invention, is designed primarily to produce the right and left hand threaded nipple shown in Fig. 18 from the short, tubular blank shown in Fig. 17. The nipple blank 1 is provided internally with a pair of longitudinal keys 2, the said keys being formed integrally with the blank which is preferably cast in the form illustrated. The blanks commonly employed are made of malleable iron. Upon the cylindrical outer surface of the blank a left handed thread 3 and a right handed thread 3' must be cut, the threads coming together near the center of the nipple and preferably crossing each other slightly to permit the nipple to draw internally-threaded members which may be screwed upon the opposed threads thereof into close contact.

The particular type of nipple illustrated carries standard pipe threads.

The diametrically opposed internal keys 2 are utilized to screw the nipple into a piece of work, a special mandrel having corresponding keyways cut therein being inserted within the nipple and exerting its torsional force against the said keys. These keys also serve to prevent the rotation of the nipple blank while it is being threaded by the nipple-threading machine according to the present invention, the blank being engaged internally by a pair of mandrels which enter the blank from opposite ends. The transverse cross-section of one form of these mandrels is shown in Fig. 20 and a modified form in Fig. 19. The mandrels are provided with three pairs of diametrically-opposed keyways 4, and while only one pair is utilized to engage the internal keys of the nipple blank while the blank occupies a fixed angular position, the provision of three pairs of keyways separated by angles of 60° permits of the blank being engaged with the mandrel in six different angular positions, with the result that it will never be necessary to rotate the blank more than sixty degrees in order to bring its keys into registration with one or another of said pairs of keyways.

Having briefly described the nipple blank and the nature of the threading operation which is to be performed thereon, the mechanism whereby this operation is automatically accomplished will now be considered in its general aspects, and hereinafter in greater detail.

Figure 2:
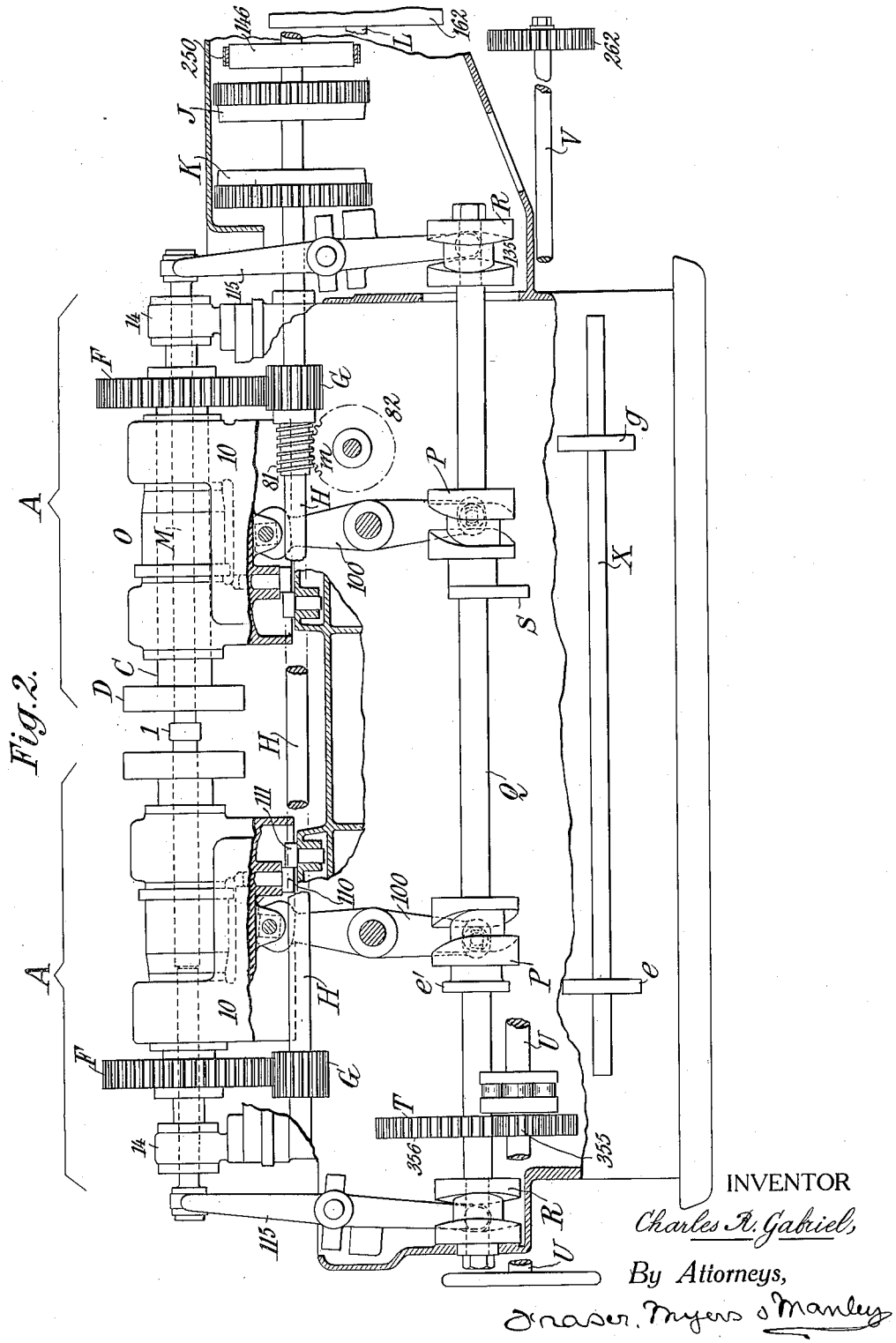
Figure 2 is a vertical longitudinal section of the machine shown in Fig. 1, the various parts being shown diagrammatically.

As diagrammatically illustrated in Fig. 2, the nipple-threading machine according to the present invention comprises a pair of opposed slidable head-stocks A, A' mounted in axial alignment upon a bed or frame B. Upon hollow live spindles C carried by the said head-stocks, the cutting heads D are mounted, these cutting heads carrying any suitable form of threading tools E (Fig. 3) for cutting right and left handed threads upon the nipple blank 1, which is disposed, as shown, between the cutter heads D. The spindles C are driven by large gears F which engage the pinions G on the spindle driving shaft H, the width of the pinions being sufficiently great to permit of a certain longitudinal sliding movement of the head-stocks without carrying the gears F out of mesh with the said pinions.

To the right upon the spindle driving shaft H, forward and reverse driving clutches J, K are provided, said clutches receiving power through suitable gearing from the power shaft L, which is connected to any suitable source of power.

Figure 4:
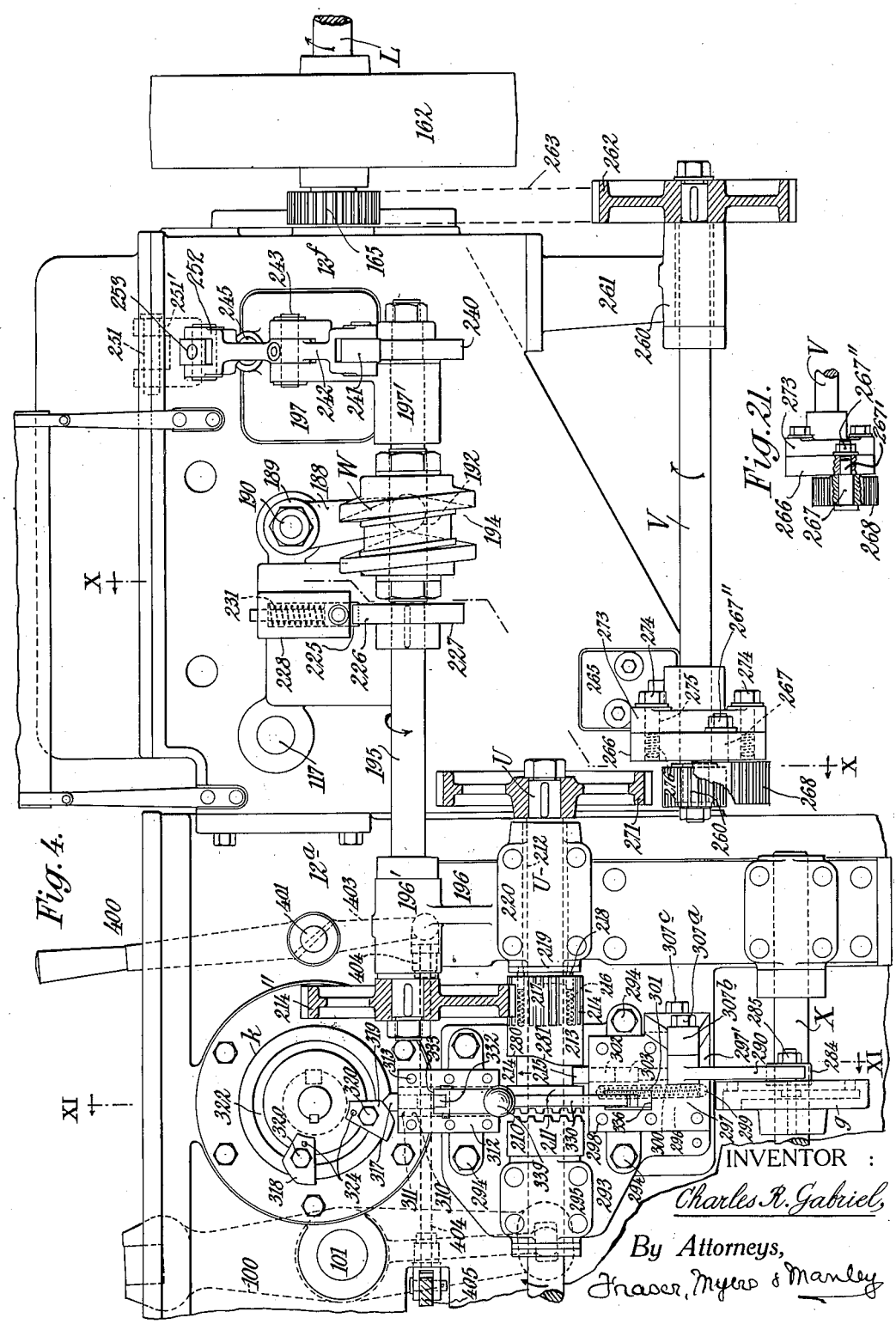
Figs. 4, 5 and 6 are front elevations of the right hand, center, and left hand sections respectively of the machine shown in Fig. 1, the three figures combined covering the entire length of the machine.

The nipple blank 1 during the actual threading operation is supported internally by mandrels M which penetrate the nipple and are pressed together or abut centrally thereof, the end portions of said mandrels being provided with keyways 24', as shown in Fig. 20 or 4, as shown in Fig. 19, which engage the internal keys 2 of the blank. The mandrels, while slidably carried within the head-stocks, are non-rotatably mounted and thus provide the necessary angularly stationary support for the nipple, whereby the latter is held against the torsional stress imposed by the cutting tools E. Axially slidable torsion sustaining sleeves N surround the mandrels, the sleeves being slidably splined to the mandrels to secure the latter against torsional displacement. The adjacent ends of these sleeves serve as collets which are caused to engage the ends of the nipple 1 to prevent its axial displacement by the action of the cutting tools.

Figure 3:
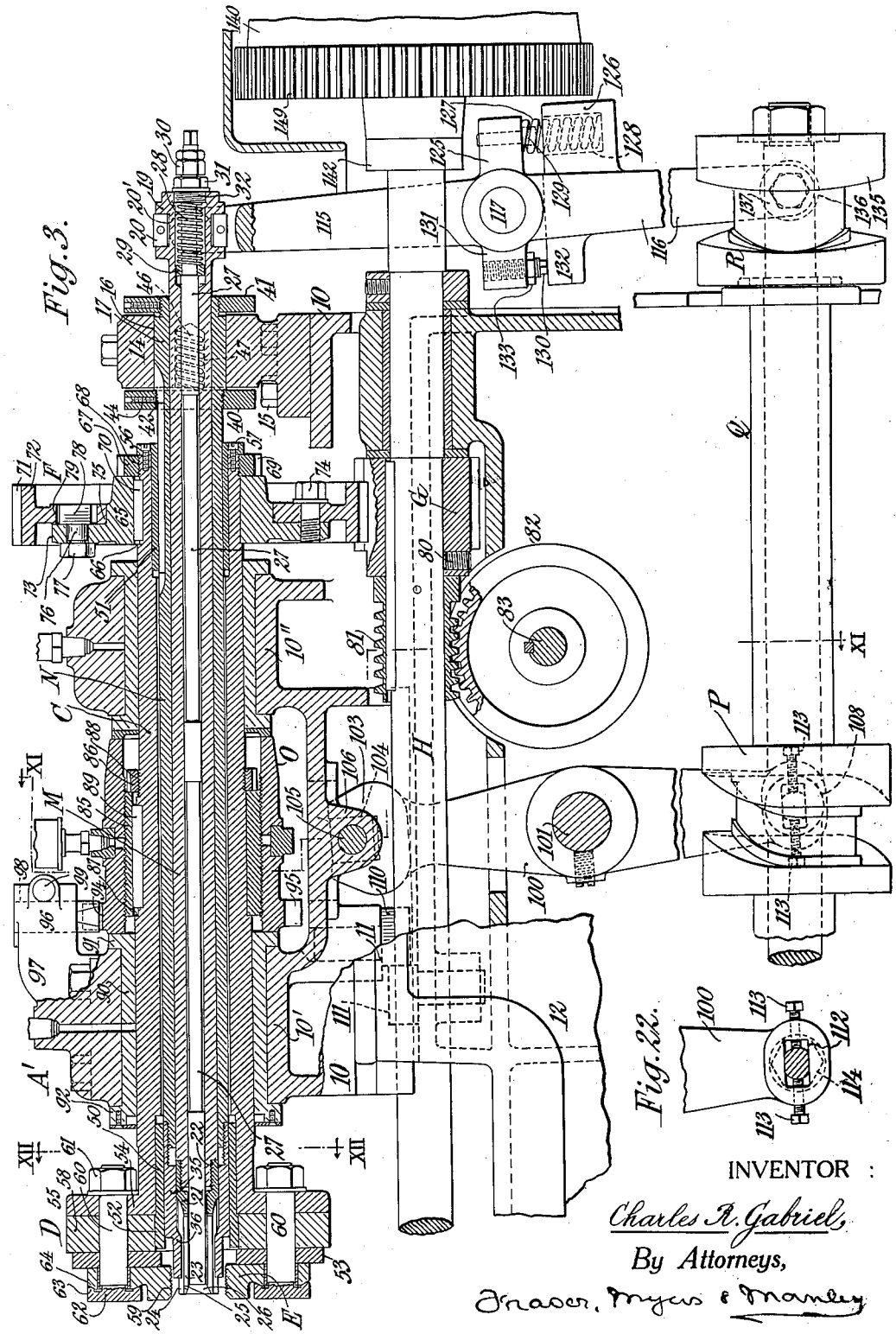
Fig. 3 is a vertical longitudinal cross-section taken along the axis of the spindles and showing details of the right hand sliding head-stock and its actuating mechanism on a larger scale than in Fig. 2.

While the blank is being threaded, the slidable head-stocks or heads A, A' are held stationary, the spindles C being advanced toward the center of the blank in accordance with the pitch of the thread which is to be cut by nuts O which engage threaded leaders on the spindles, the nuts being securely mounted upon and locked against rotation with respect to the head-stocks A, A', as best seen in Fig. 3. A rotation of the spindles in one direction will cause them to advance the cutters toward the center of the nipple, a reverse rotation causing the cutters to separate or back off the threaded nipple, the axial movement of the cutters in both directions being positively controlled by the leaders and nuts O.

After a nipple has been threaded and the cutters turned back to a point where they disengage the nipple, the head-stocks A, A' are quickly separated to permit the release of the finished nipple and the insertion of a new blank therebetween, the head-stocks being then brought together rapidly to permit the cutters to engage the new blank with a minimum loss of time. This reciprocation of the head-stocks is brought about by the action of head-stock actuating cams P carried upon cam shaft Q. At either end of the cam shaft, mandrel-actuating cams R are provided, these cams being designed to effect the withdrawal of the mandrels after the completion of a threading operation whereby the nipple is released, the cams then advancing the mandrels to engage the subsequent blank, which is automatically brought into position by a transverse feed mechanism hereinafter to be described. It may be here noted that such transverse feed mechanism is controlled by a cam S carried upon the cam shaft Q in common with the head-stock and mandrel-controlling cams P and R.

During the comparatively long period required for threading the nipple and backing off the cutters, the head-stocks and mandrels, as well as the transverse blank-feeding mechanism controlled by the cam shaft Q, are held in a fixed position. The said cam shaft Q is therefore rotated only intermittently. After the threading operation is completed and the cutters turned back to the point where they disengage the nipple, the cam shaft Q is set in motion, and in executing one complete revolution, which may occupy a period less than one-fourth the time required for the threading of a nipple, causes the separation of the heads and mandrels, the insertion of a new blank therebetween, and then advancing first the mandrels, and after the disappearance of the transverse feed mechanism, the head-stocks, whereby a new nipple blank is locked in position ready to be threaded. The intermittent movement of cam shaft Q is preferably controlled by a uniform acceleration device T, as will hereinafter be more fully set forth.

The driving element of the uniform accelerating device T is mounted at the left end of a clutch shaft U (Fig. 1), the said shaft receiving power from the main drive shaft L through an intermediate shaft V. Through the clutch shaft U, all the various moving parts of the machine are driven with the exception of the thread-cutting tools and the connections for rotating such tools hereinbefore set forth. There are, therefore, two driving systems, both receiving power from the shaft L. The first system causes the rotation of the thread cutters, the second supplies the power to reciprocate the head-stocks to actuate the blank-feeding mechanism and also to control the shifting of the main driving clutches J, K, as will more fully appear in the following description. The shaft U is termed the clutch shaft because it carries elements of three separate clutches, one controlling the actuation of the main clutch-shifting mechanism W, another controlling the actuation of the main cam shaft Q through the uniform acceleration device T, and the third serving to disconnect the left half of the shaft from the right half, whereby certain functions may be performed by the mechanism connected to the two halves independently of each other. Through the said clutch shaft U, a cycle shaft X is driven, and also a shaft Y through which the longitudinal blank-feed control cam Z is actuated. An oil pump $a$ which supplies a flow of lubricant to the thread-cutting tools to cool them while they are in action and facilitate the threading of the blank, is also driven from the said clutch shaft.

The cycle shaft X is connected to the clutch shaft U through a gear train $b$, the speed reduction being such that the cycle shaft will make one complete revolution for each production cycle of the machine, and this shaft is the primary timer for the operation of the machine as a whole. The main cam shaft Q is set in motion at the correct period in the production cycle by the clutch $c$, the engagement of which is controlled by clutch-tripping mechanism $d$, this mechanism being actuated by a rotary trip dog $e$ carried near the left hand end of the said cycle shaft. The action of the main driving clutches J, K which control the forward and reverse rotation of the thread-cutting tools, and which, in turn, are controlled by the main clutch-shifting mechanism W, is timed by the automatic clutch-timing mechanism $f$, the initial movement of which at the commencement of a production cycle, is effected by the action of a rotary trip $g$ disposed toward the right hand end of the aforesaid cycle shaft X. The rotary trips $g$, $e$ carried by the cycle shaft are so related that the trip $g$ will first bring about the automatic advance and withdrawal of the thread-cutting tools through the operation of the forward and reverse driving clutches J, K, the trip $e$ thereafter causing the engagement of clutch c whereby the cam shaft Q is rotated to bring about the rapid reciprocation of the slidable head-stocks A, A', and the nipple-supporting mandrels M, the said cam shaft simultaneously actuating the transverse feed slide h to transfer a new blank from the longitudinal blank feed j into a position where it will be engaged by the mandrels M. It will thus be seen that the operation of the machine is primarily controlled by the cycle shaft X.

Figure 1:
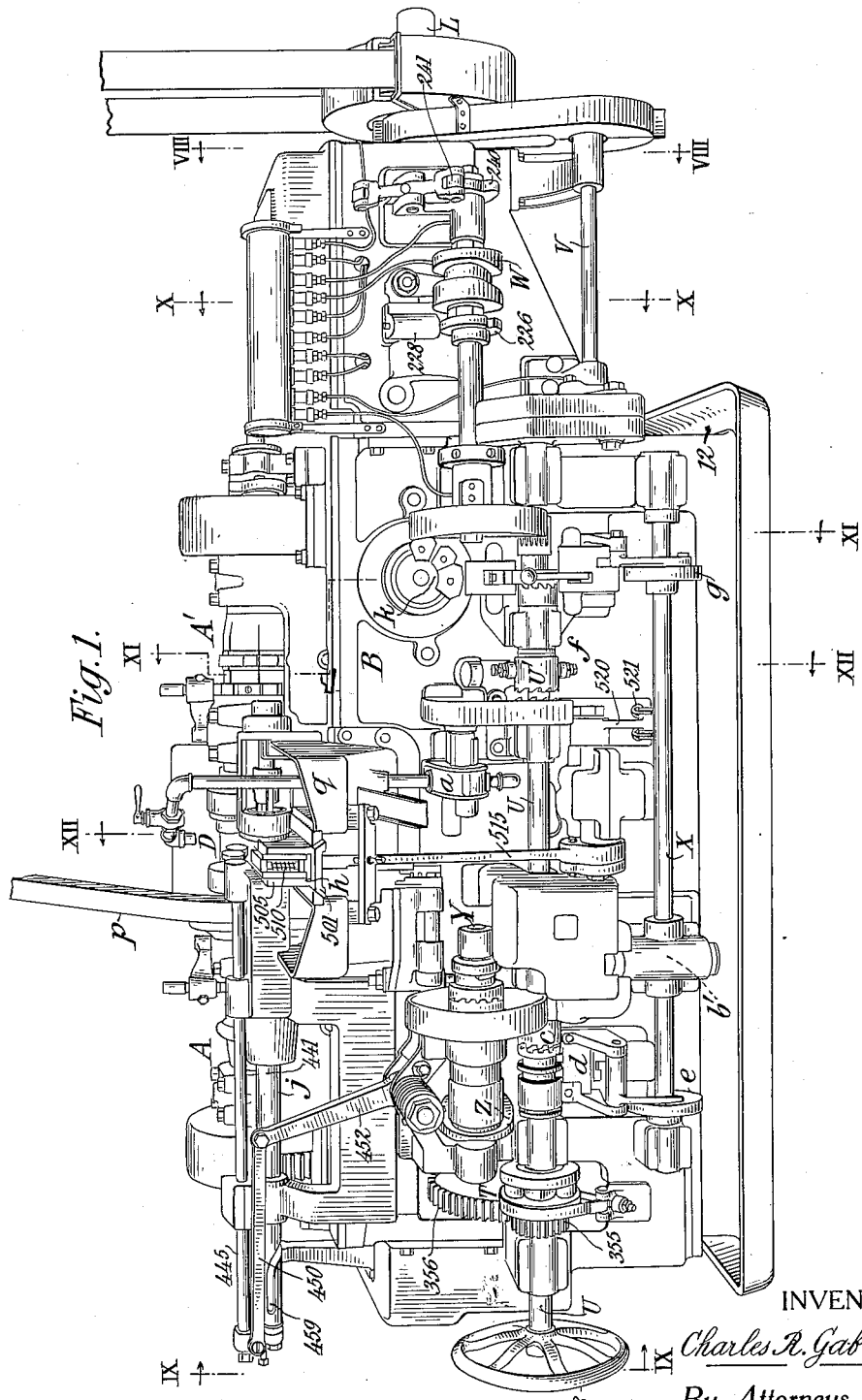
Figure 11:
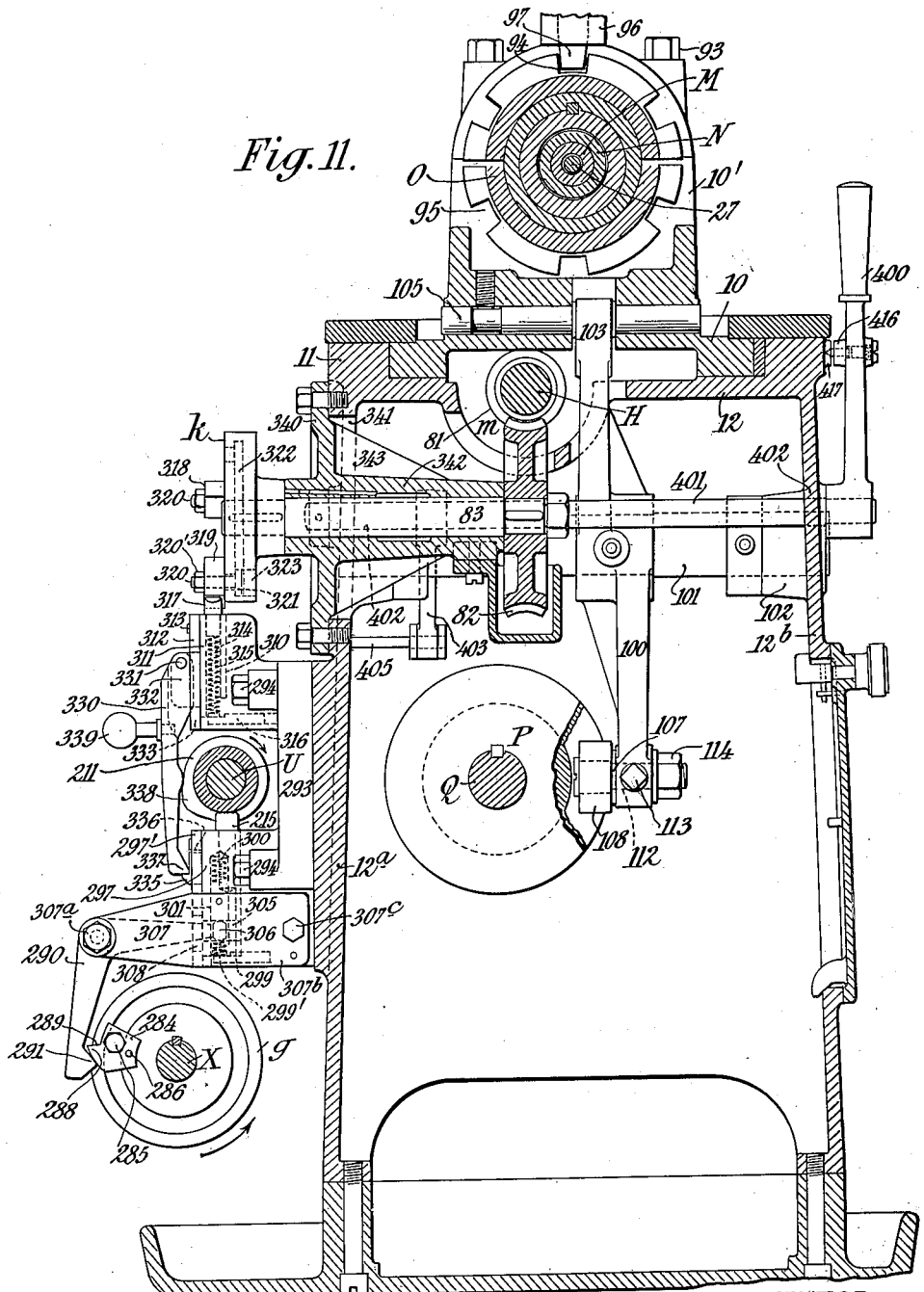
Fig. 11 is a transverse cross-section taken along the line XI—XI of Figs. 1 and 4, the view being taken from the right.

While the initial movement of the automatic timing mechanism f which controls the clutch-shifting mechanism W is imparted by the rotary trip g, the subsequent movements of such timing mechanism, whereby the forward driving clutch J is disengaged and the reverse driving clutch engaged, and thereafter the reverse driving clutch disengaged, are imparted by the movement of an oscillating rotary trip k. The said oscillating trip k, as will be seen in Figs. 1, 2 and 11, is driven by the main spindle drive shaft H through the worm drive m. Since shaft H is driven alternately in one direction and then the other by the clutches J and K in order to advance and withdraw the rotary cutting tools, it will be apparent that the trip k driven thereby will be rotated first in one direction and then the other. The operation of this oscillating trip k will be set forth in connection with the detailed description of the automatic clutch-timing mechanism f.

A secondary timing device is also provided for the mechanism d whereby the clutch c, after being engaged by the action of the rotary trip e, will be disengaged at the proper time. This secondary control of the clutch c through which the cam shaft Q is driven, is actuated by a trip cam e' mounted upon said shaft, the arrangement being such that upon each complete revolution of the shaft, its drive will be disconnected through the action of the said trip cam.

The operator of the machine feeds the nipple blanks at random into an inclined chute or magazine p, from whence, by the action of gravity, the lowest blank in the chute descends into the longitudinal blank-feeding mechanism j, said mechanism being adapted to shift the said blank axially and at the same time to rotate the blank whereby it will be fed into the transverse feed slide h, with the internal keys of the blank accurately oriented so as to be engaged by the keyways of the mandrels M when the blank is carried by said transverse slide into axial alignment with such mandrels.

The longitudinal feed mechanism j cooperating with the blank rejector and re-feed mechanism, generally designated by the letter q, insures the successive feeding of two or more blanks should one or more of the blanks fail to permit the passage of a test mandrel through the central blank opening, as will hereinafter be set forth. It may here be noted that the rejected blank, in being axially displaced by the advance of the testing bar, acts directly upon a trip mechanism to immediately bring about the feed of the successive blank, and this "re-feeding" action may occur several times during the period that is required to complete the threading of a nipple which is engaged by the thread-cutting tools, i.e., during a single production cycle of the machine.

Having briefly set forth the general functions and relationships of the several mechanisms which constitute the automatic nipple-threading machine according to the present invention, these mechanisms will now be described in detail under the following headings: (1) The headstock assembly and axial shifting mechanism therefor; (2) The spindle drive for rotating the thread-cutting tools; (3) The main clutch-timing mechanism for controlling the rotation of the spindles; (4) The cam shaft drive and controlling mechanism; (5) The manual control for starting and stopping; (6) The blank feeding mechanism; (7) The blank-rejecting mechanism.

*The headstock assembly and axial shifting mechanism therefor.*—Referring to Fig. 2, it will be seen that the two headstocks A, A', between which the nipple blank 1 is engaged during the thread-cutting operation, are substantially alike so that only the right hand head-stock A' has been illustrated in an enlarged detailed section. This enlarged view is shown in Fig. 3, to which reference is had in the following description (also see Figs. 11 and 20). It will be understood that the description of the right hand head-stock A' applies also to the left hand head-stock A except that the two are reversed, the parts appearing to the right in one, occupying a symmetrical position to the left in the other.

The head-stock body comprises a frame or slide 10 which is adapted to freely move longitudinally of the machine upon a suitable guideway 11 formed in the upper surface of the bed 12. The bed, as will be noted in Fig. 1, is a substantially box-like structure extending beyond the ends of both head-stocks. The slide 10 provides two axially-aligned bearing supports 10', 10", within which the hollow spindle C is journalled. The frame 10 also carries at the extreme right, a guide 14 which is secured to the main body of the frame 10 by bolts 15. This guide is provided with a squared central opening 16 in axial alignment with the spindle C, the said opening receiving the squared end 17 of the torsion-sustaining sleeve N which lies within the hollow spindle C and around which the spindle freely rotates. Within the torsion-sustaining sleeve N, the hollow mandrel bar M is slidably mounted, the said bar extending to the right beyond the end of the sleeve N and carrying at its free end a circumferentially grooved head 19 which is engaged by a mandrel-shifting collar 20 actuated by the cam-controlled mechanism hereinafter described. At the left hand end of mandrel rod M, the splined mandrel head 21 is mounted, the said mandrel head being screwed fast to the hollow mandrel bar M, as shown at 22. The mandrel head 21 may be a solid mandrel of the type shown in cross-section in Fig. 19, but in the preferred embodiment shown in Fig. 20 it comprises an expansible member having a plurality of resilient fingers 23 formed integrally with the base of the mandrel head and extending parallel to the axis of the mandrel.

Upon each of the resilient fingers 23, a longitudinal key 24 is formed, the fingers and keys being disposed so as to provide between adjacent keys, spaces 24' of angular width sufficient to receive the internal keys 2 of the nipple blank. There are six of these spaces or keyways 24' disposed at intervals of 60° around the circumference of the mandrel providing three pairs of diametrically-opposed keyways, any one of which may receive the diametrically-opposed pair of internal keys 2 formed in the nipple blank. The mandrel keyways 24' are at all times engaged toward their inner ends by corresponding keys formed in the surrounding torsion sustaining sleeve, as will hereinafter more fully appear.

Within the open end of mandrel head 21 a conical seat 25 is formed, the said seat being engaged by the conical mandrel expander 26. This mandrel expander is formed at the left hand end of the mandrel expander rod 27 which extends through the entire length of the hollow mandrel bar M. Within the enlarged head 19 at the right hand end of the mandrel bar M, a spring 28 is mounted, the spring at its left end acting upon a collar 29 rigidly mounted upon the aforesaid mandrel expander rod 27, the spring tending to move the rod to the left and thereby to eject the conical expander 26 from the expansible mandrel head, thus permitting the resilient fingers 23 to spring inwardly to their normal or unexpanded position. The movement of mandrel expander rod 27 under the action of spring 28 is limited by the adjusting nut 30 screwed on to the end of rod 27. This nut, when moved to the left by the action of the spring, engages the threaded plug 31 which is screwed into the opening at the end of the mandrel bar M, and which plug provides a seat for the spring 28 while permitting the free movement of the bar 27 through the central opening 32 within the plug. The degree of expansion of the mandrels is determined by their movement toward each other which is regulated by an adjustable stop 130, as will hereinafter be described.

When a nipple blank has been fed into correct alignment with the opposed mandrels, as shown in Fig. 2, the mandrel-actuating mechanism acting through the collar 20 upon mandrel bar M causes each mandrel to be moved into the interior of the nipple a sufficient distance to cause the opposed conical mandrel expanders 26 to abut one against the other, the continued advance of the mandrels then forcing the expanders against the conical seats 25, this resulting in the radial expansion of the resilient mandrel fingers 23 within the nipple blank. With this construction, while it is possible to expand the mandrel so that the blank is securely gripped thereby, it has been found preferable to adjust the mandrels so that when fully expanded, the nipple blank is still permitted a slight floating movement, as shown in Fig. 20. This permits a somewhat eccentric blank to automatically accommodate itself to the thread chasers so that threads of a more uniform depth may be cut thereon. If non-expansible mandrels, as shown in Fig. 19 are employed, the mandrel diameter should be somewhat smaller than the internal diameter of the blank to permit a slight floating movement of the blank relative to the mandrel, as above set forth.

After the completion of the thread-cutting operation the mandrels are withdrawn from the nipple, the pressure of spring 28 ejecting the mandrel expanders 26 during the initial part of such movement, thus permitting the mandrel to collapse and slide freely out of the nipple, even though the inner surface thereof be burred or somewhat irregular as is often the case where cast blanks are used. The fully expanded position of the mandrels is shown in Fig. 3.

Each mandrel head 21 is supported against angular displacement by the torsion tube or sleeve N previously referred to, this sleeve having rigidly secured upon its left hand end a splined collet 35, the internal keys 36 of which lie accurately within the six keyways 24' formed in the mandrel head 21. While the said collet 35 rigidly supports the mandrel against angular displacement, the two are susceptible of free relative axial displacement. The collet 35, in addition to providing an effective torsional support for the mandrel slidably keyed within it, performs a second important function, namely, to engage the ends of the nipple blank whereby to prevent the axial displacement of the blank. The collets 35 in the two opposed head-stocks are advanced toward the nipple blank by the movement of the head-stock slides 10, the left hand collet 35 being positively shifted to the right by the axial movement of the torsion tube or sleeve N, which sleeve is positively advanced by the left hand guide 14 rigidly mounted upon the left hand slide or head-stock frame 10. The movement of the said guide 14 is transmitted to the torsion tube N through flanges 40, 41 rigidly secured to the said tube, the flanges embracing the guide head, as shown in Fig. 3. The flange 40 is internally threaded and screwed on to a threaded portion 42 of the tube N, the flange being tightened securely against the shoulder 43 afforded by the squared end portion 17 of the tube. The flange is prevented from unscrewing by a radially-disposed set screw 44 which bears against the recess 45 formed in the surface of the tube end. The flange 41 is secured in a like manner upon the outer end of the tube N. The flanges 41, 42 embracing the guide head 14 of the left hand head-stock A need not permit any sliding movement between the head and the torsion tube carried within it, the advance of such tube always being preferably positively determined by the movement of the head occasioned by the reciprocation of the left hand head-stock slide 10.

The corresponding flanges embracing the guide head 14 of the right hand head-stock are, however, separated a sufficient distance to permit of a slight axial play between the torsion tube and its guide 14, this play being clearly seen in Fig. 3. The spacing between the disks in actual practice may be, for example, $\frac{1}{16}$th of an inch greater than the thickness of the guide head which they embrace. The object of this axial play is to permit the displacement of the right hand collet 35, whereby it will automatically adjust itself to nipple blanks of slightly different lengths. If both the opposing collets were positively advanced to grip the ends of a nipple blank, variations in the length of different blanks would result either in excessive pressures against the blank, or, in the case of a short nipple blank, a failure of the collets to exert any pressure at all. To overcome this difficulty, the left hand collet is positively advanced, as above set forth, while the right hand collet is permitted a slight movement relative to the sliding head-stock and engages the right hand end of the nipple blank resiliently instead of positively. Such resilient engagement is effected by the interposition of springs 46 between the guide head 14 and the flange 40 carried upon the tube N through which the collet is actuated. The springs 46 are disposed within bores 47 formed in the guide head 14 on opposite sides of the tube N, the springs seating against the bottom of the said bores and exerting their thrust against the flange 40, which is of a sufficient diameter to be engaged by said springs.

By the aforesaid construction, it will be apparent that when the head-stocks are advanced to engage a blank, the right hand collet 35 will yield to a greater or lesser extent in accordance with the length of the blank, but regardless of any normal variations in such length, the blank will always be firmly but resiliently gripped between the opposed collets by the action of the springs 46. The end portion of the collets must obviously be of a lesser diameter than the internal diameter of the threads which are to be cut upon the nipple blank, in order that the rotary thread-cutting tools E may pass axially along the collets without interference. For this reason the end portion of the collet in which the keys 36 are formed, is of a smaller diameter than that of the base of the collet where it is screwed onto the torsion tube N, and which latter diameter is necessary in order to provide a torsion tube of sufficient rigidity and one having a sufficiently large internal diameter to accommodate the mandrel-actuating bar M. Since, when the hollow spindle C which drives the cutting tools E is in rotation, it is turning with relation to the torsion tube N lying within the spindle, suitable anti-friction bushings 50, 51 are interposed between the two. The bushing 50 has a slightly flanged end portion 52 which is engaged between the disk 53 and the flange 54 of the spindle head D whereby the bushing is held against axial displacement. The bushing 51 has at is outer end a flange 56 which is held securely against the end of the spindle C by screws 57.

The design of the spindle head 55 and the thread chasers or cutting tools E form the subject-matter of a companion application Serial No. 335,468, filed January 28, 1929 and need not here be described in detail. It will be apparent that any suitable dies or other rotary cutting tools may be driven by the head-stock spindles C, although the thread chasers herein illustrated and which are fully described in my said companion application, are particularly adapted for use in the present machine and have been found to give satisfactory results.

Briefly, the spindle head D comprises the disk or flange 54 formed integrally with the hollow spindle C upon which is mounted a body disk 58 and the face plate or disk 53. Against the face of the latter disk the thread chasers E are mounted. These chasers comprise separate blocks of very hard material suitable for high speed cutting tools, and have formed upon their radially inward surfaces cutting teeth 59 which are of the correct dimensions and pitch to cut the desired thread upon the blank. The chasers E which comprise the actual cutting tools are each rigidly clamped against the face plate 53 by means of a bolt 60 which passes completely through the cutter head, the bolt being secured by a nut 61 tightening against the rear face of the flange 54. The head 62 of bolt 60 is provided on its inner surface with a conical recess 63 which engages a corresponding conical projection 64 formed on the face of the chaser block E, whereby an improved grip is provided between the bolt and the block to insure against displacement of the tool under the torsional strain of being advanced to cut threads upon the nipple blank. The dimensions and relative angular disposition of the chasers E carried by the right and left hand spindle heads is such as to permit of the chasers on opposite heads to interfit slightly when the heads are advanced to complete the threading of the nipple, whereby the right and left hand threads may be caused to meet, and if desired, to slightly cross one another at the center of the nipple. The angular relationship of the two spindle heads is at all times accurately preserved because of the fact that they are rotated by the pinions G carried upon the common spindle drive shaft H, as hereinbefore set forth (see Fig. 2).

The details of the spindle drive are clearly shown in Fig. 3. Upon each of the spindle ends projecting from the spindle bearings 10'' a large gear F is mounted, the gear hub portion 65 being clamped against a shoulder 66 formed on the spindle by a threaded lock ring 67, which is screwed on to the threaded spindle end 68. The lock ring is provided with radially-projecting lugs 69 which may be engaged by a suitable wrench to tighten the said ring against the gear. A key 70 is interposed between the gear hub and the spindle to prevent relative angular movement between the two. To simplify the replacement of the working surfaces of the gear, and also to provide for a certain angular adjustment between the gear and its drive, the hub portion 65 is formed as a separate annulus, the gear teeth 71 being formed in a replaceable gear ring 72 which is adjustably clamped against a flange 73 on the said hub portion 65 by means of screws 74. Concentricity of the ring with respect to the hub is insured by the accurate fitting of the internal circular opening in such ring upon the annular shoulder 75 of the hub. To insure against accidental angular displacement between the gear ring and hub portion, headed driving studs 76 are secured by nuts 77 in the hub flange 73, the stud heads 78 lying within openings 79 in the gear ring.

Referring to Figs. 3 and 8, it will be observed that the openings 79 are generally rectangular in shape and are sufficiently large to permit the squared and eccentrically-formed heads 78 of studs 76 to be turned into four different angular positions. Because of the different distances of the flat sides of the stud heads from the center of the stud shank an adjustment of the angle between the flanged hub and the gear ring 72, when the latter is positively engaged by faces of the driving studs, is permitted. The screws 74 pass through arcuate slots 74' in the gear ring and thus when loosened permit the adjustment of the ring as above set forth. This adjustment makes it possible to alter somewhat the angular relationship between the spindle heads D which carry the thread-cutting tools, whereby the relationship between the initial threads cut at opposite ends of the blank may be varied.

The two spindle gears, generally referred to by the letter F, are engaged by the pinions G, which are keyed to the spindle drive shaft H, as hereinbefore set forth. Each of the pinions G is secured against axial displacement by a set screw 80. It will be noted that the pinions are approximately one and one-half times the width of the gears F, such additional width permitting the gears to be axially shifted by the reciprocation of the head-stocks without carrying the gears off the working faces of the pinions. In the actual mechanism illustrated, the movement of the head-stocks is approximately ¾ths of an inch, this permitting a separation of the spindle heads D sufficient to allow the transverse blank-feeding mechanism to deliver a blank during such separation into position between the heads. Adjacent to the right hand spindle driving pinion G and keyed upon the spindle driving shaft H, is a worm gear 81 which engages a worm wheel 82. The said worm wheel is mounted upon and keyed to a transverse timing shaft 83. Through the action of such timing shaft upon the automatic control mechanism f hereinbefore briefly referred to, and which mechanism will hereinafter be more fully described, the forward rotation of the spindle heads is checked at a predetermined point, the backward rotation instituted, and after the cutters have been backed off the threads, the spindle heads brought to rest. It will be borne in mind that the timing shaft 83 is not rotated continuously in one direction but is oscillated, rotating first clockwise, and then counter-clockwise, because of the fact that it is driven from the spindle driving shaft H, the rotation of which is reversed to periodically change the direction of rotation of the thread-cutting tools.

The advance of each of the spindle heads, whereby the thread-cutting tools mounted thereon are caused to move axially along the blank in accordance with the desired pitch of the threads which are to be cut thereon, occurs during a period when the slidable head-stocks A, A' are held stationary upon the bed of the machine. This regular advance and withdrawal of the rotary cutting tools along the blank is produced by a threaded sleeve or nut O surrounding the spindle C and engaging a similarly threaded collar 85, which is rigidly mounted upon the said spindle. It will be understood that the description of the right hand spindle illustrated in Fig. 3 applies also to the left hand spindle, which is not shown on such an enlarged scale. The threaded collar 85 is held against axial displacement by the threaded lock ring 86 which clamps the said collar securely against a shoulder 87 formed by a slight reduction in the diameter of the spindle. The lock ring 86 is screwed upon the threaded portion 88 of the spindle. Angular displacement of the threaded collar 85 is prevented by the key 89 interposed between the collar and spindle. The elongated nut O fits accurately between the flanged ends of the bushings 90, which bushings provide antifriction surfaces for the two main spindle bearings of the head-stock. The bushings 90 are positively held against axial displacement because of the fact that their flanged ends 91, 92 embrace the flat end surfaces of the two bearing supports 10', 10'', which, as shown, are cast integrally with the head-stock frame 10 in accordance with usual practice. The upper half of the bearing supports is removably secured to the base portion by means of screws 93, whereby the bushings 90 may be readily replaced when worn.

At the left hand end of the elongated nut O (Figs. 3 and 11), an adjusting flange 94 is provided, the said flange having a plurality of notches 95 around its circumference, which notches may be engaged by a suitable tool to turn the nut when adjusting it. The said notches also serves to lock the nut in a desired adjustment when one or another is engaged by the locking pin 96 which is carried upon an arm 97 formed integrally with the upper half of the right hand spindle-bearing support 10'. The locking pin 96 is disposed in a vertical bore 98 in arm 97 and is clamped in a fixed position by a screw 99 which is capable of deforming the said bore sufficiently to positively grip the pin. The lower end of the pin, when moved into engagement with one of the locking notches 95 of flange 94, positively locks the nut O against angular displacement in either direction. When it is desired to adjust the nut, the locking pin is released by loosening screw 99 and raised sufficiently to permit the rotation of the notched flange. The object of providing an adjustment for the nut O is to permit of regulating the relationship between the right and left hand threads which are cut upon the nipple blank by the tools carried on the two opposed spindles. If, for example, it is desired to cause a greater number of threads to be cut on the right hand end of the nipple blank than on the left hand end, the right hand nut O will be rotated to advance the right hand spindle the required distance. The cutters carried by this spindle will then engage the blank earlier than the cutters carried by the left hand spindle, with the result that one or more threads will be cut on the right hand end of the blank before the other set of thread cutters commence to thread the left hand end of the blank. The two spindles being rotated by the common driving shaft H, will turn through the same number of revolutions, but one may be made to cut a greater number of threads than the other by the adjustment of the nut O, as above set forth.

Having now ascertained the construction of the head-stocks, the mechanism whereby the various reciprocating motions are imparted to the head-stock slides 10, and also to the mandrel bars M, will be set forth. Since the mechanisms for reciprocating the elements of the right and left hand head-stocks are substantially alike, only one will be described, reference being had to the enlarged axial cross-section of the right hand mechanism shown in Fig. 3, and the transverse cross-section shown in Fig. 11, the symmetrical arrangement of the right and left hand mechanisms being diagrammatically indicated in Fig. 2. The head-stock A' is bodily reciprocated along the guideway 11 by a lever 100 centrally mounted upon a freely rotatable transverse rock shaft 101 supported at opposite ends in suitable bearings 102 formed in the walls 12a, 12b, of the box-like bed or frame 12. The upper end of lever 100 is formed to provide a fork 103, between the fingers of which a square block 104 is slidably engaged, the said block being rotatively mounted upon a transverse shaft 105 which is secured in the base of head-stock slide 10. When the lever is shifted, the square block 104 can turn in accordance with the angular displacement of the lever, and at the same time the relative vertical movement between the lever and head-stock, due to the fact that the former moves in the arc of a circle while the latter slides horizontally, is accommodated by the slidable engagement of block 104 with the fork 103.

The head-stock shifting lever 100 is actuated by the cam P which is rigidly secured to the longitudinal cam shaft Q, the lower end of the lever carrying upon a transverse stud 107 a cam roller 108 which lies within the walls of the peripheral cam groove 109. In order to insure the accurate positioning of the head-stock slides when advanced to the thread-cutting position, abutment studs 110, 111, are provided respectively in the base of the slides and in the slideway bed (Figs. 2, 3 and 22). Positive contact between the cooperating abutments 110, 111, and the required degree of pressure to hold the slides rigidly in position during the threading operation, is made possible by providing an adjustment between the cam roller stud 107 and the slide-actuating lever 100. For this purpose the lower end of the lever is slotted to receive and guide the stud, its position longitudinally of slot 112 being regulated by opposed adjusting screws 113 bearing against opposite sides of the stud. With the cam P in the position to impart the maximum advance to the head-stock slide, screws 113 are adjusted to bring the head-stock abutment stud 110 into positive contact with the fixed abutment 111 and to press thereagainst with the necessary force to insure the immobility of the head-stock during the threading operation. The stud is securely locked in the adjusted position by nut 114. The cam groove 109 is so formed as to impart to the head-stock the reciprocating movement graphically illustrated in the timing diagram, Fig. 16, line A. As will be seen in such diagram, the head-stock remains stationary during the first 40 degrees of rotation of the cam shaft, from 40 to 160 degrees the head-stock is drawn back (the right-hand head-stock moving to the right, and the left-hand head-stock moving to the left), from 160 to 200 degrees the head-stock remains stationary in its withdrawn position, from 200 to 320 degrees the head-stock is moved back to its original position and remains there during the 40 degrees required to complete the revolution of the cam shaft. While attention is directed to the timing diagram, it may be desirable to momentarily consider the correlative movement of the transverse blank feed mechanism shown in Fig. 12, which mechanism carries the blanks into position between the head-stocks. The movement of this blank feed is indicated in line C. Comparing this with line A, it will be seen that the entire period during which the head-stocks are being withdrawn (separated), and then advanced (moved toward each other), is occupied by the action of the transverse feed, the blank being brought into axial alignment with the head-stocks when the latter are most widely separated, the said transverse feed, after delivering the blank into such position, retreating or disappearing so that it escapes from between the simultaneously-advancing spindle heads carried by the head-stocks. When the transverse feed has carried the nipple blank into position between the head-stocks, the nipple is engaged by the mandrel heads, which, as hereinbefore set forth, move independently of the head-stocks. The movement of the mandrels 21 carried on the mandrel bars M is indicated by the line B in the timing diagram, and, as will be seen, the mandrel heads commence to advance toward the nipple while the head-stocks remain stationary in their withdrawn or separated positions and while the transverse blank feed during its inward dwell holds the blank stationary in axial alignment with the said mandrels. The inward dwell of the transverse feed occupies a period represented by the angular motion of the cam shaft between 180 and 240 degrees, and during this period the mandrels are advanced sufficiently to enter the nipple blank and secure it against axial displacement when the transverse feed returns to its initial or outer position. It will be recalled that the final advance of the mandrels results in their expansion, being brought about by the abutting of the conical mandrel expanders 26. As will be seen in Fig. 16, line B representing the movement of the mandrels and also in the development of the mandrel-actuating cam R (Fig. 15), the slight forward movement necessary to expand the mandrel heads occurs during the movement of the cam shaft from 330 to 350 degrees or 10 degrees beyond the point at which the head-stocks have come to rest.

At the outer ends of the two mandrel bars M, the mandrel-actuating arms 115 are connected, and since the arms and actuating connections therefor are substantially identical, only the parts associated with the right hand mandrel will be described. These parts are shown to the right in Fig. 3 and also in the transverse cross-section Fig. 10. The mandrel bar could be actuated by a simple lever similar to the lever controlling the head-stock slide, but in the preferred embodiment, a two-part lever is employed, the upper arm 115 and the lower arm 116 of which are resiliently connected, whereby, in the event of the nipple blank failing to register accurately with the mandrel, the mandrel may yield instead of jamming against the blank, very possibly doing damage to some part of the mandrel-actuating mechanism. In the preferred construction the upper arm 115 is mounted to freely swing about the transverse supporting bar 117, the ends of which are secured in the walls 12a, 12b of the base of the machine. The said arm has formed at its upper end a fork 118, the fingers 119 of which carry axially-aligned transverse studs 120. These studs enter opposed bores 121 in the split collar 20 which lies within the annular groove 20' formed in the enlarged head 19 of the mandrel bar M. The internal diameter of the collar 20 is somewhat larger than the diameter of the mandrel bar where the latter passes through the collar, thus permitting the collar to be shifted vertically through the small distance required to accommodate the arcuate movement of arm 115 to the straight line horizontal movement of the mandrel bar.

The lower arm 116 is forked at its upper end to embrace the arm 115, the transverse supporting shaft 117 passing freely through the forked end 121 of the lower arm. The lower end of arm 115 fits loosely within the fork 121, so that the two arms are free to swing independently, the said arms being held against axial displacement, however, along shaft 117 by the collars 122 surrounding the shaft at either side of the fork, and secured to the shaft by means of set screws 123, as shown in Fig. 10. Upon the two arms near their adjacent ends, transverse shoulders are formed, the said shoulders extending at right angles to the axis of shaft 117. Between the right hand shoulders 125, 126 of the upper and lower arms respectively, a heavy coil spring 127 is interposed, the spring being retained in the lower shoulder within a bore 128 and seating against the bottom of said bore. The upper end of the spring bears against shoulder 125 and is held against axial displacement by a central pin 129 which is driven into the said upper shoulder. The spring is designed so as to exert a continuous force tending to move the upper end of arm 115 toward the left when the parts occupy the normal position indicated in Fig. 3. An adjustable stop 130 is interposed between the shoulders 131, 132 extending to the left from arms 115 and 116 respectively, the said stop comprising a simple threaded plug which is screwed into the upper shoulder 131, a jam nut 133 being provided to maintain the stop in a desired adjustment.

With the lower arm 116 held in any given position, it will be apparent that the angular position of the upper arm 115 with respect thereto may be regulated by adjusting the position of the threaded plug 130. Consequently, the axial position of the mandrel bar M may be regulated so that the maximum advance of the mandrel bar when the mandrel-actuating cam R has effected its full throw, may also be adjusted. Through such adjustment the desired expansion of the mandrel heads 21 is controlled, it being recalled that such expansion is the result of the pressure exerted upon the conical mandrel expanders 26, due to their mutual engagement. The mandrel expanders are brought to rest at the instant that they come into contact with each other, but the expansible mandrel heads 21 continue to move forward, and by such motion are expanded. By the adjustment of stop 130 between the two lever arms 115, 116, the degree of such movement, and consequently the degree to which the mandrels are expanded, is determined. The strength of spring 127 is sufficient to cause the required mandrel expansion. If, however, for any reason the mandrel fails to enter the nipple blank when arm 116 is swung to the right by the action of cam R, relative motion will occur between arms 116 and 115, the spring 127 yielding sufficiently to permit the normal swing of arm 116 without setting up excessive stresses in arm 115 or the mandrel bar, both of which are prevented from moving because of the aforesaid defective nipple engagement.

The mandrel-actuating cams R which are keyed to the cam shaft Q at opposite ends thereof, as indicated in Fig. 2, are right and left hand counterparts to each other. The cam grooves 135 are identical in size and contour except that while one causes a movement of the left hand arm 116 in one direction, the other causes a similar movement of the right hand arm 116 in the opposite direction. The arms 116 are controlled by the peripheral cam grooves 135 through cam rollers 136 mounted upon transverse studs 137 carried at the lower ends of the said arms. The relation between the movement imparted to the mandrels by cams R and the various movements of the other elements of the sliding head-stocks has been hereinbefore set forth with reference to the timing diagram of Fig. 16, in which diagram the line B represents the movement produced by the said cams. As previously mentioned, it should be borne in mind that the cam shaft Q does not rotate continuously, but is periodically turned through a complete revolution and then brought to rest, the cam shaft remaining stationary during the rotation of the head-stock spindles while the nipple is being threaded and the cutters thereafter backed off the finished threads by the reverse rotation of the spindles. The relationship between the action of the cam shaft and the period during which the head-stock spindles are in rotation is illustrated in Fig. 16a, which shows the timing of a complete production cycle. In this diagram it will be seen that the nipple-threading machine is adjusted to complete a production cycle in twelve seconds. The cycle is assumed to commence at the moment that the thread-cutting tools have been backed off the threaded nipple. During approximately the first two seconds of the new cycle, the various operations necessary to release the previously finished nipple and insert the new nipple blank are performed, as indicated by the lines A, B and C, the spindles remaining stationary during such period. Thereafter, the head-stock slides, mandrels and blank-feeding mechanism are held stationary, these all being controlled by the cam shaft Q, which, after making one revolution, comes to rest, and for the remainder of the production cycle only the head-stock spindles are in motion, as indicated by the line D. For approximately seven seconds, the spindles are forwardly rotated and advance to cut the threads on the nipple blank, the spindles then being reversed and rotated at a higher speed so that in approximately three seconds they are backed off the completed nipple. As long as the machine is in operation, the above-described cycle is continuously repeated.

*The spindle drive.*—The mechanism through which the head-stock spindles are rotated first in one direction to cut the threads on the nipple blank, and then in the opposite direction to rapidly spin the cutters or chasers off the threaded nipple, may comprise two friction clutches and a clutch-shifting device similar to the clutch mechanism set forth in my United States Patent No. 717,836, granted January 6, 1903. There are other well known reversing clutches which can be employed for this purpose, but the patented mechanism above referred to has been found to be particularly well adapted for use in the machine according to the present invention. Briefly described, this clutch mechanism comprises, as shown in Figs. 7, 7a, 7b, 7c, 7d, 7e, and 8, two opposed friction drums 140, 141, mounted for free rotation upon the spindle driving shaft H, this being the shaft which carries the spindle driving pinions G, as hereinbefore set forth. The drum 140 is prevented from shifting to the left by means of a collar 142 which is seated against a shoulder 143 formed on the shaft H, the collar being prevented from rotating by a set screw 144. The drum 141 is prevented from shifting to the right by the hub portion 145 of a brake wheel 146, which is keyed to shaft H and held against axial displacement therealong by a set screw 147. The friction drums 141, 140, comprise respectively the forward and reverse driving elements of the reversible clutch mechanism. Peripherally, these drums form large gears 148, 149, which receive power from the main drive shaft L. The gear 148 is driven directly by a pinion 150 which is keyed upon the said shaft, the pinion being held against axial displacement between a shoulder 151 of the shaft and a collar 152, which is held in position by a set screw 153. The gear 149 formed on the reverse driving drum 140 is rotated oppositely to gear 148 through an intermediate pinion 155 which is interposed between the said gear 149 and a driving pinion 156 which is keyed to the main drive shaft L. As will be seen in Fig. 8, the compact arrangement of the gear and pinions necessitates the elongation of intermediate pinion 155, so that the gear 149 and driving pinion 156 may mesh with the intermediate pinion side by side. The intermediate pinion 155 is keyed upon a shaft 157, which at either end is supported in suitable bearings 158 formed in bosses which are integral with the end walls 12c and 12d of the castings, comprising respectively the hollow box-like bed or frame of the machine, and the clutch housing. The hub portion of intermediate pinion 155 bears against the end of the left hand boss 158, thus preventing shaft 157 from shifting to the left, and a collar 159 bearing against the end of the right hand boss and secured to the shaft by means of set screw 159′ prevents the said shaft from shifting axially to the right. Suitable anti-friction bushings 160 are preferably provided within the bosses to insure the free rotation of the shaft.

The main driving shaft L is similarly mounted in bearings which extend through bosses 161 also formed integrally with the walls 12c, 12d. The shaft L like shaft 157, does not extend through the wall 12c, but it does extend through the right hand wall 12d, and it is upon such extension that the main driving pulley 162 is mounted. Support is provided for the outer end of the drive shaft by a bearing 163 (Fig. 7) which is carried upon a bracket arm 164, the said bracket being secured to the end wall 12d of the clutch housing. Between the pulley 162 and the said clutch housing a sprocket wheel 165 is mounted, the said sprocket wheel and the pulley being secured to the shaft L by a key 166 extending through both. The sprocket wheel 165 is preferably of the gear type used in silent chain drives, and it is through such a drive that power is transmitted from the main driving shaft L to the intermediate shaft V, (Figs. 1, 4, 7 and 8) which, in turn, is geared to the clutch shaft U, as will hereinafter be more fully set forth.

The forward and reverse driving members 141, 140 of the reversible friction clutch mechanism (Figs. 7, 7a and 7b) are alternately connected to the spindle driving shaft H through the internal clutch elements 170, 171, which are rigidly secured to the said shaft by a key 172. The adjacent hub portions of said clutch elements provide externally a continuous cylindrical surface 173 concentric with the shaft H, upon which surface the clutch-actuating collar 174 freely slides. Expanding friction bands 175, 176 secured to the inner clutch elements are alternately caused to engage the driving drums 140, 141 when the clutch collar 174 is shifted from a central or neutral position, first to the left, and then to the right. As will be seen in Figs. 7a and 7b, the mechanism whereby the axial movement of collar 174 causes the engagement of the friction bands with the driving drums comprises radially-disposed cam shafts 200, each mounted in a boss 201 extending radially inward from the peripheral flange 202 of each of the internal clutch elements 170, 171. The band expanding mechanism in both the reverse and forward driving clutches being substantially alike, only the latter will be described. At the outer end of the said cam shaft, an elliptical cam head 203 is formed, the cam head being interposed between the two ends of the expanding friction band 176. In Fig. 7b the left hand drum 140 is cut away to show the band 175 and its cam expander 203, while to the left, both the drum 141 and band 176 are cut away to show the cam-actuating mechanism. When the cam is turned so that its lesser diameter lies in the plane of the band, the free ends of the band are permitted to approach one another sufficiently to disengage the band from the surrounding drum 141. When the cam is rotated so as to bring the portion thereof having a greater diameter between the ends of the friction band, the two ends will be thrust apart, this resulting in an expansion of the band sufficient to cause it to frictionally engage the internal surface of the surrounding drum.

At the lower end of the clutch-band-expanding-shaft 200, an arm 204 is rigidly secured, the said arm being disposed so as to freely swing through the arc required to expand and contract the clutch band. The arm 204 carries at its outer end a transversely-extending stud 205 which lies within the transverse groove 206 of a member 207 (Figs 7a, 7b, 7c) rigidly secured to the clutch-actuating collar 174. While the collar 174 slides freely axially of the driven clutch elements, it is held against angular displacement with respect thereto by member 207 which forms a slidable key between the said elements and the collar, the said member 207 being rigidly secured to the collar by set screw 207ª. Consequently the member 207 actuated by the collar will always be maintained in fixed angular relationship with respect to the arms 204 actuated thereby because the said arms also rotate with the driven elements of the clutch.

From the foregoing description of the spindle driving clutches it will be apparent that when the clutch-actuating collar 174 is shifted to the right, the forward driving clutch member 141 will be clutched to the driven element 171 whereby the shaft H is rotated to advance the spindles, and when the collar is shifted to the left, as shown in Fig. 7b, the forward driving clutch is released and the reversing clutch is engaged. When the clutch-actuating collar is in a position midway between the forward and reverse driving positions, neither of the clutch elements are engaged and no power is applied to the shaft H. The position of cams 203 when the clutches are in neutral is shown in Fig. 7c.

Within a peripheral groove 180 formed in the clutch-actuating collar 174 (Fig. 7), a clutch shifter ring 181 is mounted, the said ring being diametrically engaged by studs 182 carried upon the arms 183 of a clutch-shifting fork 184 which embraces the said ring. This fork is rigidly keyed upon a horizontal transverse rock shaft 185, the said shaft being supported in bearings (Fig. 8) provided respectively in the rear wall 12e of the clutch housing, and the front wall 12f of said housing. The rock shaft 185 extends through the forward wall 12f, and upon its outer end is rigidly mounted a clutch-actuating arm 188 (Figs. 4 and 8). The shaft end is preferably tapered, and the head 189 of arm 188 is similarly internally tapered, a nut 190 screwed on to the end of said shaft bearing against the head 189 of the arm to insure positive locking of the taper connection between the arm and shaft. A key 190' is preferably interposed between the tapered part of the said arm and shaft to insure a rigid driving connection.

The lower end of clutch-actuating arm 188, which, when the clutch is in neutral, projects vertically downward from the rock shaft 185, carries a cam roller 192 upon a stud 193, the said cam roller lying within the peripheral cam groove 194 of the clutch-shifting cam W. As shown in Fig. 4, the said cam is carried rigidly upon the longitudinally-disposed clutch control shaft 195, which is supported toward either end in bearings 196', 197' provided in brackets 196 and 197 secured to the front walls 12a and 12f of the bed of the machine and the clutch housing respectively.

It should be noted that in describing the machine the elevations appearing, for example, in Figs. 1, 2 and 3, are arbitrarily said to be the front of the machine. Actually the operator stands on the opposite side when feeding the machine, and from his point of view what is herein termed the front of the mechanism, would be the rear. The arbitrary designation of the elevations in the said figures as front elevations is chosen to simplify the description, inasmuch as the major working parts of the mechanism all appear in these elevations.

The cam groove 194 of the clutch-shifting cam W is so formed as to provide at 120° intervals the three control positions for establishing the forward drive, the reverse drive, and neutral. The development of cam W is diametrically indicated in Fig. 15a. In the initial position the cam holds the clutch-actuating arm 188 in the vertical or neutral position, both clutches being disengaged. The cam in rotating through 120° brings about the engagement of the forward driving clutch J. A further rotation of the clutch from 120 to 140 degrees swings the clutch-actuating arm from the forward driving position to the reverse, the arm passing through neutral but without any dwell in the neutral position. At 240° the reverse driving clutch K is fully engaged. Thereafter the movement of the cam between 240 and 360 degrees carries clutch-actuating arm 188 back to the neutral or initial position.

The cam W is rotated into the successive positions above set forth by three separate movements, the cam being brought to rest in each control position and there maintained for the various periods required. It will be recalled that the spindles are forwardly rotated during the threading of the nipple blank for a period of approximately seven seconds, and are then backwardly rotated at a higher speed for a period of approximately three seconds to spin the chasers or cutters off the threaded nipple. Thereafter, the spindles are held stationary, as far as any rotative movement is concerned, for a period of approximately two seconds, during which the finished nipple is replaced by a new nipple blank. To avoid loss of time, an intermittent drive is provided for the cam W, such drive rotating the cam rapidly from one control position to the next at high speed, the cam being brought to rest after each advance and held in the required control position during the necessary period.

The intermittent drive for cam W is had through a dog clutch 210, 211, as shown in Fig. 4. The driving element 210 of this clutch is rigidly secured to the clutch shaft U, the right hand section U—212 of which shaft is continuously rotated through the intermediate drive shaft V, as hereinbefore set forth, the driven element 211 of the dog clutch (Fig. 14) is formed at the left hand end of a sleeve 213, which is freely rotatable upon the clutch shaft U—212. Upon the right hand end of the said sleeve, a pinion 214' is formed, the pinion teeth being cut directly in the material of the sleeve. The said pinion engages a gear 214" rigidly secured upon the left end of the clutch control shaft 195, upon which shaft the cam W which controls the friction clutches, is mounted. The diameter of the gear is three times that of the pinion, so that one complete revolution of the driven element 211 of the dog clutch will cause the cam W to shift 120° and thereby carry the cam from one control position to the succeeding control position, as hereinbefore set forth. The peripheral cam groove 214 formed in the sleeve 213 is designed to co-operate with a cam pin 215 to disengage the dog clutch 210, 211 after each revolution of the sleeve 213, the clutch remaining thus disengaged until the pin 215 is momentarily withdrawn from the groove by suitable timing mechanism, hereinafter to be set set forth. When the pin 215 is withdrawn, the clutch sleeve 213 is moved to the left by the action of springs 216 carried within longitudinal bores 217 formed in the right hand end of the said sleeve. The said springs act upon plungers 218, which lie partially within the bores 217, the right hand end of said plungers engaging a thrust disk 219 surrounding the clutch shaft. The thrust disk bears against the end of a bracket 220, which bracket provides a bearing support for the right hand end of the clutch shaft U—212. Upon the withdrawal of cam pin 215, the spring-pressed clutch sleeve 213 will instantly bring about the engagement of the toothed faces of the dog clutch 210, 211, and the shaft 212, which rotates at 120 R. P. M., will cause the pinion 214' thus clutched to it to rotate the cam W to its succeeding control position in a period of one-half second. The cam pin 215 is only momentarily withdrawn from the cam groove 214 and is permitted almost immediately thereafter to reengage the said grooves, whereby, upon the completion of one revolution, the driven element 211 of the clutch will be disengaged from the driving element 210 by the axial movement of sleeve 213. The clutch is shown in such disengaged position in Fig. 4.

It will be understood that upon the disengagement of dog clutch 210, 211, the cam W is freed from any positive driving connection with the clutch shaft 212. To prevent the cam from being angularly displaced while thus disconnected, a spring-pressed detent 225 is provided, as shown in Figs. 4 and 10, the said detent engaging the periphery of a notched disk 226 rigidly secured upon the clutch-actuating shaft 195 and adjacent to the clutch-actuating cam W. Three V-shaped stop notches 227 are provided at 120° intervals around the disk 226, the said notches being angularly related to the setting of cam W in such manner that each notch will register with, and be engaged by, the spring-pressed detent 225 when the cam is rotated to the corresponding control position. The first notch will maintain the clutch-actuating cam in neutral position, for example, the second in the forward driving position, and the third in reverse driving position. The detent 225 slides vertically in a bracket 228, which is secured to the clutch housing. The lower end of the detent is guided freely within a vertical bore 229, the detent shank 230 being of a sufficiently reduced diameter to permit of the insertion of a spring 231 within the said bore and surrounding the shank. The upper end of the detent shank extends entirely through the bracket 228, being guided therein by a bore 232 which is of smaller diameter than the bore 229 and forms an extension thereof. The spring 231 acts upon the enlarged head 233 of the detent, and will cause the wedge-shaped nose thereof to forcibly seat itself in a stop notch 227 whenever the disk 226 is rotated to bring one of said notches into alignment with the detent. The angle of the wedge-shaped detent nose 234 is approximately 90°, and consequently, while the detent is capable of resisting moderate forces which may tend to displace the clutch cam shaft 195, it will not interfere with the rotation of such shaft when the latter is positively actuated through the dog clutch drive 210, 211. When the disk is thus positively rotated, the advancing inclined wall of the V-shaped notch will act as a cam element and lift the detent out of the notch, the detent then riding on the circular contour of the disk until the succeeding notch is engaged. The detent 225 is prevented from rotating so as to maintain the wedge-shaped nose portion 234 in alignment with the notches 227 by means of a guide pin 235 which is screwed into the bracket 228, the said pin engaging a vertical guide slot 236 formed in the detent head.

It will be recalled that the speed of the spindle driving shaft, when driven by the forward driving clutch J, is considerably lower than the speed at which it is rotated in the reverse direction by the clutch K. In an actual construction, for example, the forward speed may be approximately 250 R.P.M., while the reversing speed is 472 R.P.M. With such a reversing speed it will be apparent that after the cutters have been backed off the finished nipple and the clutch K disengaged, the spindle drive will have a very considerable momentum, which, if not checked, would result in the cutters being backed off through the action of the spindle nuts O an excessive distance, and considerable time would be lost in bringing the cutters back to the position where they would engage the succeeding nipple blank. To avoid this overrunning of the spindles, an automatic braking device is provided, the said device being controlled by a cam 240 which is rigidly mounted upon the right hand end of clutch-control shaft 195 (see Figs. 4 and 8). The brake-controlling cam 240 engages a cam roller 241 carried at the lower end of a rocker arm 242, the said rocker arm being pivotally supported upon a transverse shaft 243. The bracket 197 which provides a support for the said shaft, also affords a housing for the brake-engaging spring 244, the said spring being retained within a bore 245 extending diagonally downward into the body portion of bracket 197. A plunger 246 rests against the upper end of spring 244 and is guided within the said bore 245, the upper end of the said plunger engaging the rocker arm 242 at a point above its pivotal support, whereby the said arm is resiliently urged to swing in a counter-clockwise direction. A brake band 250 surrounds the brake drum 146 hereinbefore referred to (see Fig. 7). the said drum being rigidly secured to the spindle drive shaft H. One end of the brake band is connected to a pin 251, the said pin being rotatively mounted in a bracket 251' which is secured on the inner face of the clutch housing wall 12f. The other end of the brake band is adjustably secured to the upper end of rocker arm 242, the movement of which arm is controlled by the cam 240. The upper end of the said rocker arm may be formed as a fork 252, within which a square block 253 is pivotally supported upon a large pin 254 which passes through the fork. A brake-adjusting rod 255 extends transversely through the block 253 and pin 254, the said rod being threaded at its upper end to receive adjusting nut 256 and lock nut 257. The said brake-adjusting rod is free to slide through the block 253 and is connected in any suitable manner to the lower end of brake band 250. By varying the position of adjusting nut 256, the effective length of brake rod 255 may be adjusted to take up on the brake when wear occurs.

The brake-actuating cam 240 presents a circular contour to the cam roller 241 except for a cut-away portion 258. When such portion is brought under the cam roller by the rotation of the clutch control shaft 195, the spring 244 causes the rocker arm 242 to swing in a counter-clockwise direction, whereby the brake band 250 is tightened against drum 146 and the spindle drive shaft H brought to rest. A further rotation of the cam 240 through the action of the inclined surface 259 swings the rocker arm in a clockwise direction against the action of spring 244, thereby releasing the brake. The cutaway portion 258 of the cam is angularly disposed with respect to the clutch-actuating cam W in such manner as to cause the application of the brake at the moment that the reverse driving clutch K is disengaged. The angular width of the said cutaway portion of the brake-controlling cam 240 being somewhat less than 120°, insures the release of the brake prior to the engagement of the forward driving clutch J, because, as hereinbefore set forth, the clutch-controlling cam W must be rotated through 120° in order to pass over the neutral control position. The brake control cam 240 and the clutch control cam W being both rigidly secured to the shaft 195, must necessarily co-act in the aforesaid manner.

While considering Fig. 8, attention may be called to the gearing which connects the intermediate drive shaft V with the right hand end of clutch shaft U. This gearing is also seen in Fig. 4. The intermediate shaft is supported in a bearing 260 formed within the head of a bearing bracket 261 secured upon the lower face of the clutch housing. To the right of bearing 260, and upon the end of shaft V, the driven sprocket 262, of the silent chain drive by which the shaft V is connected to the main driving shaft L, is rigidly mounted. The driving ratio between sprockets 165 and 262 connected by the silent chain 263 is such as to cause the intermediate shaft B to rotate at approximately 440 R.P.M. with a main drive shaft speed of 1000 R.P.M. the said speed being the normal speed of rotation of the driving pulley 162 through which power is supplied to the entire machine. Toward its left end the shaft V is supported in a bearing provided in a bracket 265 which is secured upon the front wall of the clutch housing. The bracket 265, as shown in Figs. 4 and 8 carries an adjustable plate 266 upon which a transverse stud 267 is mounted. The said stud projecting to the left of adjusting plate 266, provides a bearing for the intermediate pinion 268, the said pinion being retained upon the stud by the flanged head 269. The intermediate pinion meshes with the driving pinion 270 which is rigidly mounted upon the end of shaft V and serves to transmit power from said shaft to the gear 271 which is rigidly secured upon the right hand end of the clutch shaft U. The stud 267 is shouldered, as shown at 267' (Fig. 21), and its right hand portion, which is of a reduced diameter, extends through plate 266, the stud being held securely in position by a nut 267'' threaded onto the right hand end of the stud. The adjustable pinion-carrying plate 266 is pierced by the shaft V, the opening through the plate fitting closely to insure that, regardless of any angular adjustment of the pinion stud 267 about the shaft V, the axis of said pinion remains at a fixed radial distance from the axis of said shaft. The plate 266 is secured against the face of the supporting plate 273 which is formed integrally with the bearing supporting bracket 265, by means of screws 274. The said screws pass through slots 275 formed in the supporting plate and engage threaded holes 276 in the said adjustable plate 266, whereby the two plates may be securely clamped together. By this construction the gear ratio between the intermediate drive shaft V and the clutch shaft U may be readily altered, to change such ratio it being only necessary to replace the driving pinion 270 with one of different diameter and substitute a corresponding idler pinion 268 such as will preserve the fixed sum of the combined pitch radii of the two pinions determined by the distance between the axis of shaft V and the stud 267. If such a change in gear ratio is effected, the new idler pinion 268 may be brought into proper mesh with the clutch shaft gear 271 by loosening screws 274 and rocking plate 266 around shaft V, such angular motion being permitted by the elongated openings or slots 275 in the adjustable plate through which the said screws pass. As hereinbefore set forth, the speed at which it has been found satisfactory to drive the clutch shaft, is 120 R.P.M.

*The friction clutch timing mechanism.*—
The mechanism whereby the forward and reverse driving friction clutches J, K are actuated, has hereinbefore been fully set forth. The timing mechanism whereby such clutch-actuating mechanism is set in motion at appropriate intervals to cause the desired operation of the clutches, will now be described, reference being had particularly to Figs. 4, 11 and 13. It will be recalled that the forward, reverse, and neutral driving positions of the friction clutch devices which control the rotation of the spindles are determined by the three angular positions successively assumed by the friction clutch control cam W. The said cam is advanced to these three successive control positions by the intermittent engagement of the clutch 210, 211, through which the continuous movement of shaft U is imparted periodically to the pinion 214' which, through gear 214'', rotates the cam W. It will also be recalled that the driven element 211 of the said clutch is caused to engage the driving element 210 by the action of springs 216 whenever the cam pin 215 is withdrawn from the cam groove 214 of sleeve 213, upon which the driven clutch element 211 is formed. If the cam pin 215 is momentarily withdrawn to permit the spring engagement of the clutch, and thereafter yieldingly pressed against sleeve 213, it will spring into the cam groove 214 as soon as the "low" section 280 of the cam surface is brought opposite the cam pin by the rotation of the sleeve. The cam pin is then in a position to engage the inclined contour 281 of the cam groove, and when such engagement occurs, will cause sleeve 213 to move to the right a sufficient distance to disengage the multiple toothed clutch. It will be understood that the expression "low section of the cam groove" is used figuratively, as in the actual construction it is the portion of the cam groove which lies to the right of the inclined surface 281, and which surface may be figuratively termed the "rise in the cam", since it is this surface which performs the work and primary function of the cam, i. e., the disengagement of the clutch. It will be apparent, therefore, that to permit the engagement of the multiple toothed clutch 210, 211, and insure the disengagement of such clutch after the completion of a single revolution, it is only necessary to provide a means for withdrawing cam pin 215 from cam groove 214, and within a period of approximately one-quarter second to release said pin, whereby, under the action of a spring, it may be caused to re-enter the cam groove in time to engage the inclined surface 281 which effects the release of the clutch. The clutch shaft rotating at 120 R. P. M. causes the clutch sleeve 213 to make a complete revolution in one-half a second, and the cam groove is designed so that the pin 215 may re-enter it at any point within approximately 180° measured rearwardly from the rise or incline 281. The direction of rotation of the clutch shaft and clutch sleeve 213 is indicated by the arrow on said sleeve, shown in Fig. 4, the rotation being in a clockwise direction as the clutch is viewed in Fig. 11.

Actually, cam pin 215 is adapted to be controlled by two distinct agencies. One of these is the trip disk *g* carried upon the cycle shaft X, and the other is the oscillating trip disk *k*, the movement of which is controlled by the forward and reverse rotations of the spindle drive shaft H transmitted to the said oscillating disk through the worm drive connection *m*, hereinbefore fully set forth. As shown in Fig. 11, the cycle shaft X rotates in a counter-clockwise direction, the said shaft being driven through suitable gear reduction *b*, (Figs. 1 and 23) hereinafter to be described, from the left hand section of clutch shaft U, and makes one complete revolution every twelve seconds. The trip disk *g* carries on its right hand face a trip block 284 which is rigidly secured to the disk by means of a bolt 285 and pin 286 which pass through the block and disk. On the radially outward surface of the trip block, a V-shaped projection is formed, the inclined surfaces 288, 289 thereof being adapted to exert a camming action upon the lower arm of a bell-crank 290, which controls the motion of the cam pin 215 hereinbefore referred to. The inclined surface 289 is only of use when the machine is rotated backwardly by hand for the purpose of making some adjustment in the mechanism, and is provided simply to insure that the bell-crank arm will ride over the trip block instead of jamming against it. During the normal operation of the machine, the inclined surface 288 of the trip block engages the nose piece 291 at the end of the downwardly projecting bell-crank arm once every twelve seconds, and thus imparts a clockwise movement to the bell-crank 290, as seen in Fig. 11.

This motion is transmitted to the cam pin 215, whereby the clutch sleeve 213 is released and the driven element 211 of the multiple toothed clutch permitted to engage the driving element 210 under the action of springs 216. The construction by which this action is accomplished is as follows:

A clutch-timer housing bracket 293 is secured upon the front face 12ª of the main frame or bed of the machine by means of four large screws 294. This bracket provides at its left end a bearing support 295 for the clutch shaft U. The bracket also provides immediately below the clutch sleeve 213 a vertical guideway 296, within which a rectangular block 297 freely slides.

The block is retained within the guideway 296 by a cover-plate 297' secured upon the outer face of the bracket by screws 298. At the bottom of said guideway a fixed abutment 299 is provided, between which abutment and the slidable block 297 a compression spring 300 is interposed. The said abutment is conveniently formed by setting a pin in the body of the bracket 293, the end of the pin projecting into the guideway and having a flattened surface 299' against which the said spring reacts. The major portion of said spring is housed within a vertical bore 301 formed in the sliding block 297 and its thrust is exerted against the upper end of said bore, whereby the block is at all times urged upwardly. It is upon the said slidable block that the cam pin 215 is mounted, the shank 302 of said pin being rigidly secured in a vertical bore 303 formed in the upper surface of said block. A rectangular aperture 305 extends transversely from front to rear through the slidable block 297, the said aperture receiving the slightly enlarged head 306 of the horizontal arm 307 of bell-crank 290. The said bell-crank arm passes through a considerably larger aperture 308 in the front cover-plate 297, the said aperture being disposed in relation to the aperture 305 in the slidable block in such manner as to permit the free vertical reciprocation of the slide and bell-crank arm 307 cooperating therewith over the distance required to engage a cam pin 215 in the cam groove 214, and also to draw said pin downwardly out of engagement with said groove to permit the spring engagement of the clutch. The bell-crank 290 is mounted upon a stud 307*a* secured to the outer end of an arm 307*b*, which arm is rigidly secured to the side wall of the timer housing bracket 293 by screws 307*c*. When the inclined surface 288 of the trip block 284 is moved past the nose 291 of the lower bell-crank arm, the horizontal arm 307 of the bell-crank will be swung downwardly, thereby depressing the slidable block 297 against the action of spring 300 and the cam pin 215 will be withdrawn from the cam groove. The continued rotation of the cycle shaft X carries the trip block beyond the end of the lower bell-crank arm, whereupon spring 300 immediately moves the slide 297 upwardly, bringing cam pin 215 into engagement with the cam groove 214 at a point somewhat in advance of the cam incline 281, whereby, upon the completion of a revolution, the driven element 211 of the clutch will be disconnected from the driving element, as hereinbefore set forth.

In each production cycle, the first movement of the friction clutch controlling cam W whereby the clutch mechanism is shifted from neutral to the forward driving position, is brought about through the engagement of trip block 284 with the lower arm of bell-crank 290. In other words, the machine is started upon a production cycle through the primary timing action of the cycle shaft X, and such shaft, at twelve second intervals, will initiate a new production cycle as long as the shaft continues to revolve. From the foregoing it will be apparent that the cycle shaft only controls the first movement of the clutch-shifting cam W, that is to say, the movement which carries the clutch from neutral into the position where a forward drive is imparted to the head-stock spindles. Means wholly independent of the timing action of the cycle shaft are employed to bring about the second and third movements of the clutch-shifting cam W whereby the friction clutch drive is reversed and subsequently entirely disconnected or set in neutral. It will be recalled that all three movements of the cam W are brought about by successive single revolutions of the multiple toothed clutch element 211, the only difference between the first 120° movement of the cam W and the second and third movements is that the cam pin 215 which controls the engagement of the clutch is in the first instance withdrawn from the cam groove 214 in sleeve 213 by the action of the cycle shaft X, whereas in the second and third movements of the cam W, the cam pin 215 is withdrawn by the action of oscillating trip disk $k$ which is forwardly and backwardly rotated in accordance with the forward and backward rotation of the spindle driving shaft H. The connections by which the oscillating trip disk causes the second and third engagements of the dog clutch 210, 211, will now be considered.

The clutch timer housing bracket 293, as will be seen in Figs. 4, 11 and 13, carries a vertical guideway 310 immediately above the driven head 211 of the clutch. This guideway, except that it is somewhat narrower, corresponds closely to the guideway 297 previously described. A rectangular block 311 slides freely within the guideway 310, the said block or slide being retained within the guideway by a cover-plate 312 secured by screws 313 upon the face of the said guideway. The slide 311 is urged upwardly by a spring 314 which is disposed largely within a vertical bore 315 formed in the slide. The lower end of the spring bears against an abutment 316 which projects into the guideway, the said abutment being conveniently formed as a pin which is driven into the body of the bracket. In the upper end of the spring-retaining bore 315 a trip pin 317 is rigidly mounted, the head of said pin extending above the slide and guideway 311 a sufficient distance to be engaged by the trip blocks 318, 319 which are carried by the oscillating disk $k$. The trip pin head 317 is wedge-shaped and provides oppositely-inclined surfaces which are alternately engaged by the correspondingly inclined faces of trip blocks 318, 319. It will be noted that the trip blocks are rigidly but adjustably secured upon the front face of disk $k$ by bolts 320, the heads 321 of which are retained within an undercut annular groove 322 formed in the said disk. A bore 323 coincident with, and of a diameter equal to the width of the undercut groove 322, permits the insertion of the bolt head in the groove from the rear of the trip disk. When the bolts are loosened the trip blocks may be shifted to any desired point around the annular groove and there made fast by tightening nuts 320', and to insure against displacement of the blocks, locating pins 324 may be employed to secure the blocks upon the face of the disk after the desired adjustment has been established.

From the foregoing it will be clear that when the oscillating trip disk $k$ is rotated in a clockwise direction from the position indicated in Fig. 4, the trip block 318 will eventually be brought into contact with the inclined face of trip pin 317, this resulting in a depression of the slide 311 against the action of spring 314. The depression of slide 311 through mechanical connections hereinafter to be set forth, results in the withdrawal of cam pin 215 from the cam groove 214 of the dog clutch sleeve, thus permitting the automatic engagement of clutch 210, 211, the said clutch being automatically disengaged after each revolution, as hereinbefore set forth. It will be recalled that the initial movement of the clutch-shifting cam W, whereby the spindles are set in forward rotation, is brought about through the timing action of the trip disk $g$ on the cycle shaft X. The forward rotation of the spindle driving shaft H causes the oscillating trip disk $k$ to carry the trip block 318 from the initial position approximately shown in Fig. 4, in a clockwise direction until the trip pin 317 is depressed. The depression of the trip pin by the engagement therewith of the trip block 318 brings about the second actuation of the clutch-shifting cam W, whereby the clutch mechanism is shifted from forward to reverse drive, and thereafter the spindles are backwardly rotated until the reverse movement of the oscillating trip disk $k$ causes the trip block 319 to depress pin 317. This last depression of the trip pin brings about the third or final movement of the clutch-shifting cam W, whereby the spindle drive is brought to rest, the friction clutches therefor being set in neutral.

In any production cycle the first movement of the cam W is brought about by the timing action of the trip block 284, which is rotated by the cycle shaft X. The forward driving friction clutch J being thus engaged, the second movement of the cam is brought about by the timing action of trip 318, whereby the drive is shifted from the forward driving clutch J to the reverse driving clutch K, and the third movement of the cam W is brought about by the timing action of the trip block 319 also carried by the oscillating trip disk, whereby the friction drive is returned to neutral, both clutches J and K being disengaged. It will be apparent that the angular setting of trip disk 318 will be determined by the length of thread which it is desired to cut upon the nipple blank. The greater the angle between said block and the trip pin 317 measured in the direction of forward rotation of the disk $k$, the longer the spindles C will be rotated to advance the thread-cutting tools E, and consequently, the longer will be the threads. Conversely, the length of the thread produced upon a nipple blank may be shortened by decreasing the said angular separation between the trip block 318 and the trip pin 317 when the parts are set to correspond to the beginning of a production cycle, as indicated by the point at which the cycle shaft trip 284 produces the initial actuation of the timing mechanism.

All three actuations of the clutch-shifting cam W are brought about by the successive withdrawal of cam pin 215 through successive depressions of the slide block 297 against the action of spring 300. As hereinbefore set forth, the first depression of slide block 297 is caused by the actuation of bell-crank 290. The second and third depressions of the said slide block are caused by the actuation of slide block 311 under the successive control action of trip blocks 318 and 319. The mechanical connection between slide block 311 and slide block 297 comprises a simple trip bar 330 (Figs. 4, 11 and 13) which is pivotally suspended at its upper end upon a pin 331 carried by an ear 332 formed integrally with the slide block 311, the said ear projecting through a slot 333 in the cover-plate 312 of the guideway 310. The said ear is normally held in contact with the upper end of the slot by the action of spring 314, and in this manner slide 311, and consequently the trip bar 330, and trip pin 317 are normally retained in a predetermined position. The slot 333 extends downwardly to the bottom edge of the cover-plate 312, and thus permits of the ready insertion of the slide block 311 from below.

The lower end of trip bar 330 is adapted to engage the lug 335 formed integrally with the slide block 297, the said lug projecting through an aperture 336 formed in the face of the cover-plate 297'. The length of trip bar 330 is such that when both of the slides, that is, slide 311 and slide 297, are in their upper or normal positions, the nose 337 of the trip bar will lie immediately above the lug 335 carried by the lower slide. Starting with the parts in the position shown in Figs. 4, 11 and 13, it will be apparent that the downward movement of slide 311 produced by the engagement of either of the trip blocks on the oscillating disk K with the pin 317 carried by the said slide, will be imparted to the lower slide through the engagement of the lower end of bar 330 with the lug 335 carried by the lower slide 297. The depression of this slide brings about through the resultant spring engagement of clutch 210, 211, the 120° movement of clutch-shifting cam W required to carry the cam to its succeeding control position.

To avoid the possibility of the trip bar 330 holding the lower slide down for so long a period that the cam pin 215 might fail to engage the cam groove 214 in advance of the cam rise or incline 281, a trip bar kick-off is provided. This kick-off comprises a cam hump 338 (Figs. 11 and 14) formed integrally with and projecting radially outward a sufficient distance from the otherwise cylindrical contour of the driven multiple toothed clutch head 211 to swing the trip bar 330 out of engagement with the lug 335 of the slide 297. The kick-off 338 is angularly related with respect to the clutch disengaging incline 281 of cam groove 214 in such manner as to insure the disengagement of trip bar 330 from slide 297 well in advance of the point at which the cam pin 215 carried by the said slide must spring into the cam groove in order to engage the said incline to throw out the clutch. If the clutch were permitted to remain engaged for two consecutive revolutions, the clutch-shifting cam W would throw the forward driving clutch into engagement for a period considerably less than one-half a second, and thereafter immediately throw in the reverse driving clutch before more than a small fraction of the required threads were cut upon the nipple blank. This would not in any way injure the mechanism but would produce a defective nipple.

Since a considerable interval of time elapses between successive actuations of trip bar 330, a simple weighted arm 339 is relied upon to swing the bar back into alignment with the lug 335 from which it is disengaged by the kick-off 338. The weighted arm is secured to the trip bar at a point where the center of weight of the arm will act to swing the bar counter-clockwise about the pivot 331, (Fig. 11) and the end of such arm may be rounded to provide a convenient hand grip by which the trip bar may be manually disengaged from lug 335 in making various mechanical adjustments of the clutch-timing mechanism.

The worm gear 81 and worm wheel 82 through which the movements of spindle driving shaft H are transmitted to the oscillating trip disk k, have been hereinbefore described. It will be opportune at this point, however, to consider the mounting which provides the bearing support for the shaft 83, upon the opposite ends of which the said worm wheel and trip disk are rigidly mounted. This mounting as shown in Fig. 11, comprises a circular plate 340 secured over an opening 341 in the vertical front wall 12ª of the machine bed. Formed integrally with the said plate and centrally thereof, is a long tubular shaft support 342, one end of which projects inwardly a sufficient distance to support the shaft 83 at a point adjacent to the worm wheel 82. The said tubular shaft support also extends outwardly in front of plate 340 whereby the shaft 83 is supported as close as possible to the trip disk k. The tubular shaft support is preferably reinforced by radial webs 343 which may be cast integrally with the said plate and tubular shaft support. The provision of an independent mounting for the shaft 83, as above set forth, permits of the ready inspection and replacement of worm wheel 82 should this be necessary, and also facilitates the proper setting of the worm wheel with respect to the worm gear 81 carried upon the spindle driving shaft H when the machine is assembled.

The main cam shaft drive and controlling mechanism

The clutch shaft U, as hereinabove set forth, serves to actuate the automatic clutch-shifting mechanism, whereby the rotation of the head-stock spindles is controlled. This clutch shaft serves three other purposes, the first of which is to actuate the main cam shaft Q, whereby the various reciprocations are imparted to the head-stock slides and mandrels carried thereby, it being also recalled that the said cam shaft controls the movement of the transverse blank feed mechanism h, as will hereinafter more fully appear. The second function of the clutch shaft U is to actuate the longitudinal blank feed, whereby nipples are carried from the magazine p into the said transverse blank feed. The third function of the cam shaft is to drive the cycle shaft X, and in addition, it may be noted that the rotary oil pump a is driven from the said clutch shaft. The first of these functions will now be considered.

Figure 6:
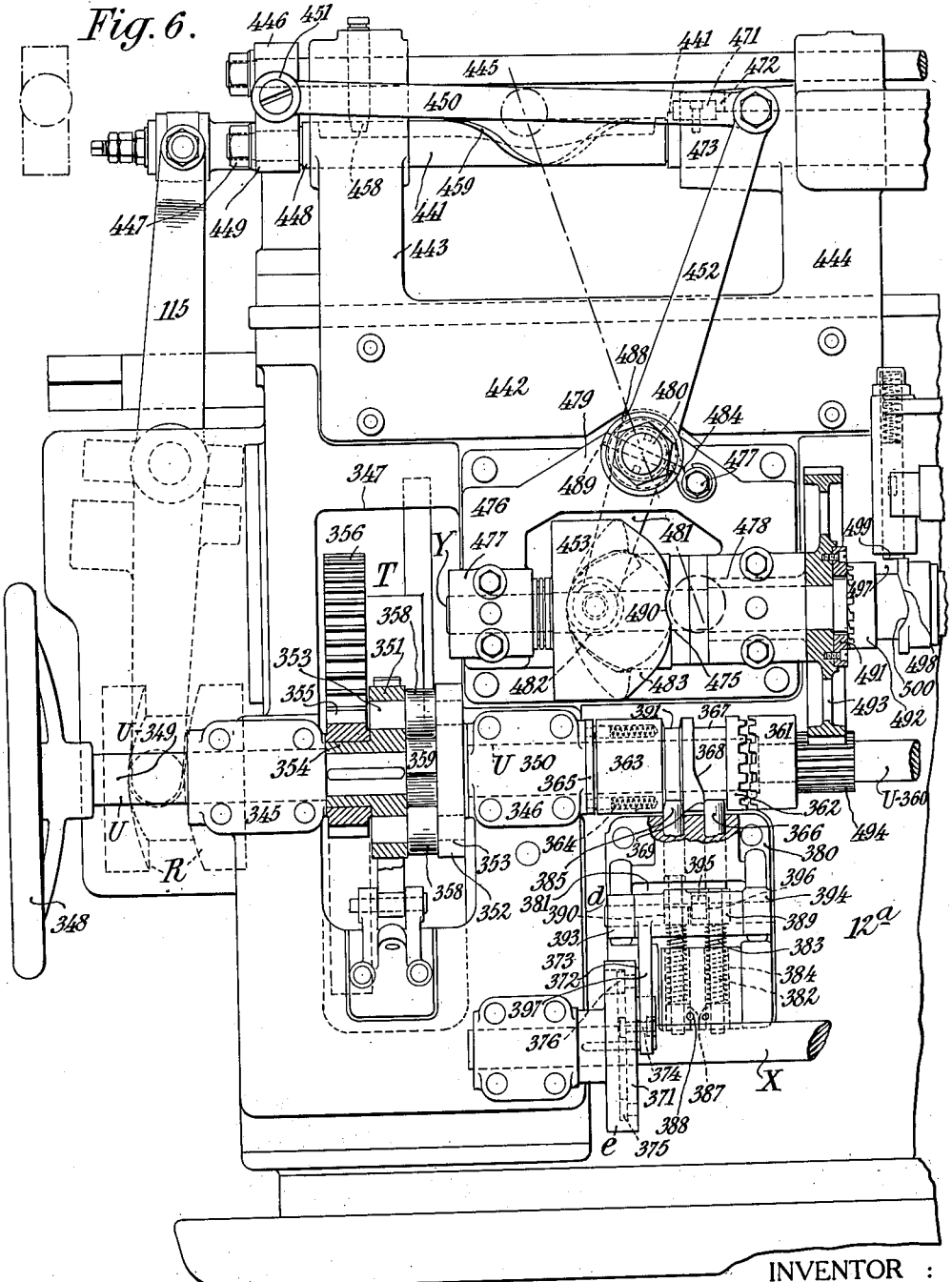

Referring particularly to Figs. 6 and 9, it will be seen that the clutch shaft U is supported towards its left hand end in bearing brackets 345, 346, which are mounted upon the front wall of the machine bed or frame on either side of a large opening 347 formed therein. The end of the said shaft projects to the left beyond the bracket 345 and carries a hand wheel 348 of comparatively large diameter, the said wheel being of use where it is desired to manually operate various parts of the mechanism associated with the clutch shaft in making adjustments or repairs.

Between the bearing brackets 345, 346 is mounted the driving and acceleration head of a uniform acceleration device. Actually, the clutch shaft U is not continuous as a shaft between the said brackets, the acceleration head presently to be described serving to connect the shaft sections U—349 and U—350. The entire uniform acceleration mechanism is of a type well known in the art and need here be only briefly described. The acceleration head per se comprises two separated disks 351 and 352, (disk 351 shown in section in Fig. 6) the said disks being mechanically connected by diametrically-disposed pins 353. The disk 352 may be formed integrally with, or rigidly connected to, the shaft section U—350. The disk 351, as shown in Fig. 6, is rigidly secured upon the right hand end of shaft section U—349. Upon a hub portion 354 of disk 351, a pinion 355 is rigidly mounted. It will be understood that the pinion and disks are concentric with respect to the shaft, and also that the pins 353 are disposed at equal radii from the axis of said shaft.

The pinion 355 meshes with the large gear 356, which is rigidly mounted upon the cam shaft Q. This gear is mutilated, a sufficient number of its teeth being removed, as shown at 356', to permit the acceleration of the cam shaft up to the corresponding constant speed of the shaft U upon which the pinion is mounted before the teeth of the pinion engage the gear teeth. The acceleration of the cam shaft is effected through the rotation of one of the pins 353, an arm 357 which is rigidly secured to the said cam shaft lying between the pins 353 when the acceleration device is in its initial or starting position. To avoid unnecessary friction and wear between the arm 357 and the acceleration pins 353, rollers 358 are provided, the said rollers surrounding the pins and being freely rotatable thereon. The head 359 of arm 357 is so formed that the upper roller 358, when rotated from the position shown in Fig. 9 at a constant angular speed in a counter-clockwise direction, will impart to the said arm a substantially uniform angular acceleration, whereby cam shaft Q will be brought up to the speed necessary to permit the smooth engagement of pinion 355 with gear 356.

It will be understood that the section 350 of shaft U, through which the acceleration head is driven, is not continuously rotated but is permitted to turn only through the number of revolutions required to impart one complete revolution to the cam shaft Q.

This timing of the clutch shaft section U—350 is effected by automatic clutch-control mechanism $d$, hereinafter to be described. In the present instance the actual gear ratio between the gear 356 and pinion 355 is 3.75 to 1, but because of the fact that the pinion is rotating more rapidly than the gear during the period that the latter is being accelerated up to the pinion speed, and subsequently decelerated upon the disengagement of the pinion, the shaft section U—350 is actually rotated through four complete revolutions in producing one turn of the cam shaft Q. It will be understood that the disengagement of the pinion above referred to, occurs when the mutilated section of the gear is brought opposite the pinion. The curved working surfaces of head 359 at the end of arm 357 are symmetrical with respect to the long axis of the arm, and consequently the engagement of said arm with one of the pins 358 upon the completion of a revolution of the cam shaft, results in a uniform deceleration of the cam shaft, the latter being brought to rest when the pins 358 occupy the position indicated in Fig. 9. The object of providing a uniform acceleration drive for the cam shaft is to relieve the cam shaft clutch mechanism from the duty of picking up the full cam shaft load at the moment the clutch is engaged. Because of the very considerable mass of the cam shaft and the frictional resistance produced by the five large cams which it actuates, particularly the cams P which in their position of rest are subjected to the stress of pressing the headstock slides securely against the abutments, any type of positive clutch which would be required to almost instantaneously bring the cam shaft up to speed, would be subjected to excessive wear. The cam shaft, it will be recalled, must be rotated at twelve second intervals, and in the normal operation of the machine the cam shaft actuating mechanism is called upon to function 300 times an hour.

The clutch employed to connect the continuously running section 360 of shaft U is a multiple toothed clutch, the driving and driven elements 361, 362 of which are almost identical with the driving and driven elements 210, 211 of the clutch at the right-hand end of the clutch shaft, which latter clutch has hereinbefore been described. The toothed driving head of the clutch controlling the uniform acceleration drive of the main cam shaft is rigidly secured upon the left hand end of clutch shaft section U—360, and is adapted to engage the toothed end of a driven clutch sleeve 363 which is slidably keyed upon the end of shaft section U—350. Springs 364 mounted within longitudinal bores formed in the said sleeve and acting against a thrust disk 365 which bears against the end of bracket 346, tend always to shift the driven clutch head 362 into engagement with the driving clutch head 361. A retractile cam pin 366 co-operating with a cam groove 367 will cause the automatic disengagement of the clutch after each revolution, the cam incline 368 reacting against the said pin to throw the clutch sleeve 363 to the left. Upon the disengagement of the clutch, the driven elements thereof will come to rest with the "high" section 369 of the cam opposite the cam pin (Fig. 6), whereby the clutch is held in disengagement until the said cam pin is withdrawn from the cam groove. To prevent the overrunning of the driven clutch elements and parts actuated thereby, upon the disengagement of the clutch, a continuously acting friction brake $t$ is provided, as will hereinafter be more fully set forth. Unlike the clutch 210, 211, which controls the 120° movement of the spindle controlling cam W, and which clutch must necessarily be disengaged upon each complete revolution, the clutch 361, 362 must remain engaged for four consecutive revolutions, whereby the uniform acceleration mechanism and pinion 355 may impart to the main cam shaft Q one complete revolution. To this end primary and secondary timing devices $e$ and $e'$ cooperating with clutch control mechanism $d$ are provided, the trip $e$ at the proper time in each cycle, withdrawing the clutch cam pin 366 from the cam groove to permit the spring engagement of the clutch and the timing cam $e'$ thereafter holding said pin out of the cam groove for somewhat more than three complete revolutions of the clutch sleeve 363. The said timing cam $e'$ then releases the cam pin, which, upon the continued rotation of the clutch sleeve, springs into the low section 370 of the cam groove in time to engage the cam rise 368 toward the completion of the fourth revolution of the clutch sleeve, and through which engagement the clutch is disengaged, as hereinbefore set forth.

The trip $e$ controlling the engagement of main cam shaft clutch comprises a trip disk 371 which is rigidly secured upon the cycle shaft X. The said disk carries a trip block 372 which, at each revolution of the cycle shaft X, brings about the engagement of clutch 361, 362, through which the cam shaft Q is driven. The disengagement of this clutch upon the completion of one revolution of the cam shaft (this corresponding to four revolutions of the clutch shaft U) is controlled by the trip cam $e'$ fixed upon the cam shaft. Details of the mechanism controlling the cam shaft driving clutch are seen in Figs. 6, 9, 12, 25 and 26.

The cam pin 366 is guided within a vertical bore formed in the body of a bracket 380 (Figs. 6, 25 and 26), the said bracket being rigidly mounted upon the machine bed or frame. The said bracket has a central transverse through opening 381, and the cam pin 366 extends downwardly through this opening into the lower body portion of the bracket, the shank 382 of the cam pin being of a sufficiently reduced diameter to pass through the compression spring 383 which is retained within the lower part of the bore 384 in which the said pin slides. To the left of pin 366, a pin 385 is similarly mounted and provided with a compression spring 386. The function of pin 385 will hereinafter be set forth. The springs 383 and 386 at their lower ends bear against sleeves 387 which surround the pin shanks, the said sleeves being retained within the vertical bores by screws 388. It will be understood that both the pins are freely slidable and are guided toward their upper ends in the said vertical bores and toward their lower ends in the sleeves 387 retained within said bores. In the space provided within the bracket body by opening 381, a block 389 is rigidly secured upon the shank of cam pin 366, the said block extending to the left and slidably embracing the shank of pin 385. Immediately below the left end of block 389 a block 390 is rigidly secured upon the shank of pin 385, the block 389 being preferably cut away toward its left hand end to permit a more compact arrangement with respect to block 390. The upper ends of springs 383 and 386 bear respectively against the lower faces of the said blocks and consequently urge the pins 366 and 385 to which the blocks are respectively secured, upwardly. When the parts are in the position shown in Fig. 6, the pin 366 engages cam groove 367 and pin 385 engages an annular clutch-restraining groove 391 formed in the clutch sleeve 370 adjacent to the said cam groove. The groove 391 is not in any sense a cam groove, but merely serves for a special purpose hereinafter to appear when engaged by pin 385, to prevent the engagement of the clutch regardless of the angular position of sleeve 363. The arrangement is such that if block 389 be moved downwardly, the two pins will be withdrawn from their respective grooves in the clutch sleeve, the block 389 acting directly upon pin 366 and indirectly upon pin 385 through the engagement of said block, with the block 390 carried upon the latter pin. On the other hand, it will be noted that upon the withdrawal of the pins the clutch sleeve 363 is shifted to the right by clutch springs 364, and thereafter, if block 389 is permitted to rise, pin 366 will enter the cam groove 367, but it will be impossible for pin 385 to enter groove 391 until the clutch sleeve 366 has been shifted to the clutch-disengaging position by the engagement of pin 366 with the cam rise 368. A one way connection is provided, in other words, between block 389 and pin 385, the said block, while it positively controls the downward movement of pin 385, being free to rise and carry pin 366 into the cam groove 367 while pin 385 remains in its downward position, in which position it bears against the outer surface of sleeve 363 until permitted to spring into the clutch restraining groove 391 by the axial movement of the sleeve upon the disengagement of the clutch.

The initial movement of block 389 is controlled by the trip $c$ on cycle shaft X, in the following manner: As shown in Figs. 6 and 26, a hollow rock shaft 392 is mounted to swing freely about a pin 393 which is rigidly supported in bracket arms 394. The rock shaft carries on inwardly projecting horizontal arm 395, the end of which lies within an aperture 396 formed in the block 389 between pins 366 and 385. The end of arm 395 is slightly rounded so that the arm may be swung to slide the block up and down without any binding action between the two. At the right hand end of the hollow rock shaft 392, an arm 397 projects downwardly into a position where its lower end will be engaged by trip block 372 and thereby swing outwardly to rotate the rock shaft in a clockwise direction, as viewed in Fig. 26. Thus, virtually a bell-crank connection is provided whereby the engagement of the said trip block with arm 397 results in the downward movement of block 389 and the consequent withdrawal of pins 366 and 385 from their respective grooves in the clutch sleeve. In a modification hereinafter to be described, after the trip block has passed beyond the end of arm 397, springs 383 return the block 389 to its upper position, thereby resetting pin 366 in the cam groove and swinging the rock shaft and connected arms counter-clockwise to their initial position.

In the preferred construction the block or slide 389 carrying the clutch-controlling pins 366 and 385 is positively prevented from being moved upwardly by the action of springs 383 until the cam shaft Q has almost completed its operating movement of one revolution, by the action of the trip cam $e'$ which is rigidly secured upon cam shaft Q (Figs. 25 and 26). The cam $e'$ acts upon a cam roller 389$a$ carried at the top of the upwardly-extending arm 389$b$, which is rigidly secured to a rock shaft 389$c$. A horizontal arm, also rigidly secured to said rock shaft, projects through the front wall of the machine frame and rests upon a shoulder 389$e$ formed at the rear of block 389. The contour of cam $e'$ is that of a circle concentric with shaft Q except for a cutaway portion which provides a "low" section $e''$ which permits the bell-crank to assume the position indicated in Fig. 21 for a movement of approximately 45° of the cam shaft Q. When the "low" section $e''$ of the cam is adjacent to cam roller 389a, the bell-crank offers no resistance to the upward movement of block 389 and therefore clutch-controlling pin 366 is free to be engaged in clutch cam groove 367 by the action of spring 383. The engagement of said pin results in the disengagement of the clutch so that cam shaft Q is brought to rest. The "low" section of cam $e'$ is angularly related to cam shaft Q in such manner as to insure the stopping of the shaft at the appropriate angular position after each revolution, the remainder of the cam surface positively maintaining the bell-crank in a position to insure the continuous engagement of clutch 361, 362 during the working movement of the cam shaft. In this construction the width of trip block 372 carried by the cycle shaft disk $e$ need be only sufficient to insure the withdrawal of clutch-control pins 366, 385 during the period required for cam shaft Q to advance cam $e'$ to bring the "high" portion of the cam into engagement with the cam roller. Thereafter, the said cam will control the movement of the clutch pin and trip block 372 will pass beyond the end of arm 397.

From the foregoing it will be apparent that clutch shaft Q is initially set in motion by the engagement of clutch 361, 362, under the control of the cycle shaft trip 372. The disengagement of the clutch whereby the cam shaft is brought to rest is effected by the automatic timing action of cam $e'$ carried by the cam shaft itself. The cam shaft, after the required period of idleness to permit of the threading of a nipple blank, will be again set in motion by the primary timing action of the cycle shaft, as above set forth.

The pin 385 and clutch-restraining groove 391 perform no useful function during the normal operation of the machine, nor do they in any way affect the automatic action of the clutch 362, 361 during such operation. The purpose of these parts is to permit the free rotation of shaft section U—350 by the use of hand wheel 348, in making various adjustments in the mechanism or in the manual withdrawal of the headstocks should it be desired to release a nipple engaged between them after the machine has been brought to rest. It will be apparent that unless some such clutch-restraining mechanism were provided, the driven element 362 of the clutch would engage the driving element 361 upon every revolution imparted to the clutch sleeve 363 by the rotation of hand wheel 348. The clutch would be disengaged for a certain period during each revolution for the period required by the rise 368, 369 of the cam groove, but immediately thereafter the clutch would be re-engaged by the action of springs 364. This difficulty is avoided in the present construction by the continuous engagement of pin 385 with the clutch-restraining groove 391 when the machine is thrown out of operation, as by such engagement the clutch sleeve is prevented from shifting to the right during those periods in which it would be otherwise permitted to do so when the cam rise 369 passes beyond cam pin 366. It will be recalled that unless the belt drive which supplies power to the machine is thrown off, and this is not the usual method of stopping the machine, the right hand section 212 of shaft U revolves continuously when the blank feed and nipple-threading parts of the machine are at rest. Furthermore, the center section 360 of shaft U is directly geared to the cycle shaft X, and while the said center section is disengaged from the continuously revolving right hand section 212 of the shaft U through the disengagement of a manually-controlled clutch U', the said center section of the shaft is geared directly to the cycle shaft X through gearing $b$, hereinafter to be described. It will therefore be apparent that unless the engagement of dog clutch 361, 362 were prevented when the shaft section U—350 is manually rotated, the cycle shaft would be turned and eventually carry the trip block 284 into engagement with bell-crank 290, with the result that the cam W would be shifted from its neutral position, which it invariably occupies when the machine is at rest, into the position which effects the engagement of the forward driving friction clutch J, whereupon the head-stock spindles would be set in rotation. If a mechanic happened to be making some adjustment of the thread cutters or spindle heads when this occurred, a serious accident might result. This danger is eliminated by the provision of the aforesaid clutch-restraining device 385, 391.

*The manual stop and start mechanism.*— Having now ascertained the primary functions of the clutch shaft U, which comprises the four axially-aligned shaft sections 212, 360, 350 and 349, the operation and function of the manually-controlled dog clutch U' may be readily understood. This clutch serves to connect the continuously revolving right hand shaft section 212 with the center shaft section 360. When the clutch is engaged, the shaft section 360 is rotated. This shaft section, as hereinbefore set forth, drives the cycle shaft through gearing $b$ and also the main cam shaft U through clutch 361, 362, and in addition to this drives the shaft Y, which, in a manner hereinafter to be described, actuates the longitudinal blank feed. It will be apparent that the disconnection of the manual control clutch U' will stop the rotation of the cycle shaft X. The engagement of clutch 361, 362 controlling the movement of the cam shaft Q, and also the engagement of clutch 210, 211 which controls the shifting of the friction clutch drive from neutral into the forward driving position, cannot take place unless the cycle shaft is rotated to actuate the trips 372 and 284, and consequently, the stopping of the cycle shaft prevents any further actuation of the cam shaft Q and any further primary actuation of the friction clutch shifting cam W. That is to say, a new production cycle will not have its inception until the clutch U' is manually reengaged. The secondary actuations of the cam W, whereby the cam is shifted from the position which establishes a forward drive to the position which establishes a reverse drive, and subsequently to the position which sets the friction clutches in neutral, being controlled, not by the action of the cycle shaft, but by the action of the spindle driving shaft H, which drives the oscillating trip disk $k$, will be performed regardless of the cycle shaft being brought to rest. The thread cutters or chasers will therefore always complete the threading of a nipple blank which they have engaged and be turned back thereafter to disengage the cutters from the threaded nipple, and thus complete the immediate production cycle, but a new production cycle can only be brought about by the manual engagement of clutch U', whereby to set the cycle shaft in motion.

Figure 5:
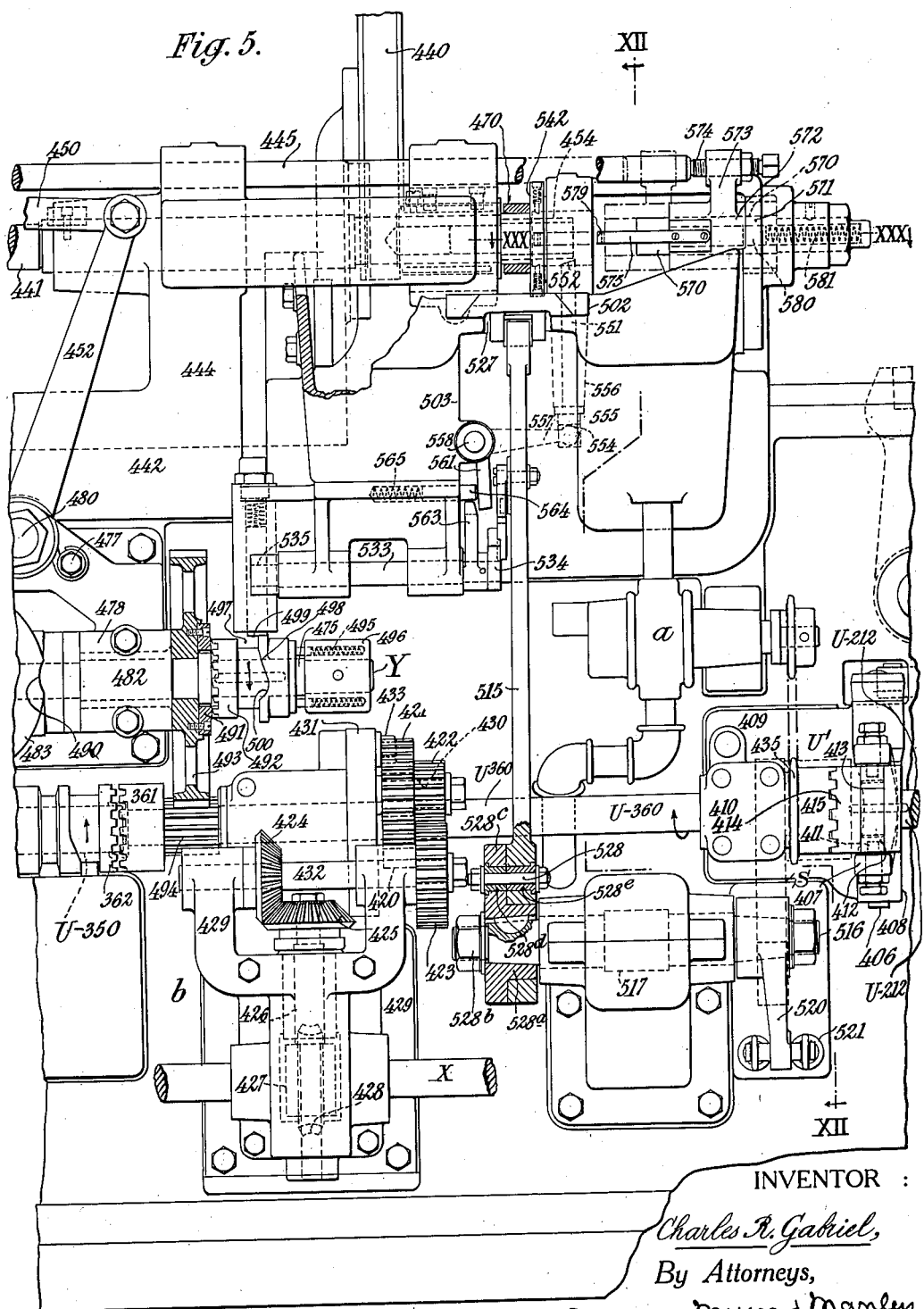

As shown in Figs. 4, 5, and 11, the clutch U' is actuated by the manual control lever 400, which is rigidly secured upon the rear end of a transverse rock shaft 401, which shaft is supported toward either end in bearings 402 formed in the front and real walls 12ª, 12ᵇ of the box-like bed of the machine. Depending from rock shaft 401 and rigidly secured thereto, is an arm 403, the lower end of which is pivotally attached to a longitudinal connecting rod 404, the left hand end of which rod is in turn pivotally connected to an inwardly projecting clutch-shifting arm 405. The said arm 405 is rigidly mounted upon the upper end of a vertical rock shaft 406, toward the mid-portion of which shaft the clutch-shifting fork 407 is rigidly mounted. The said vertical rock shaft is carried in bearings 408 formed in the bracket 409, the said bracket also providing a bearing support 410 for the right hand end of shaft section U—360. The clutch-shifting fork 407 carries diametrically-opposed pins 411 which engage corresponding recesses in the clutch-shifting collar 412, retained within a groove 413 formed in the toothed driving head 414 of the clutch U'. This driving head is slidably keyed upon the end of shaft section U—212 and is adapted in its left hand position to engage the correspondingly toothed end of the driven clutch head 415, which head is rigidly mounted upon the end of shaft section U—360. When the manual control lever 400 is shifted to the left, the driving head of the multiple toothed clutch will be shifted to the left to engage the driven head, and vice versa. To prevent the accidental displacement of manual control lever 400, a spring-pressed detent 416 is provided at a point below the lever hand grip, the said detent resiliently engaging conical recesses 417 formed in the bed of the machine opposite the two control positions of the lever.

The reduction gearing $d$, whereby the rotation of shaft section U—360 imparts the required slow motion to the cycle shaft X, is best seen in Figs. 5 and 23. The said reduction gearing comprises a driving pinion 420 rigidly secured upon the shaft section U—360, and which pinion, through idler pinions 421, 422, pinion 423, bevel gear 424, bevel gear 425, vertical shaft 426, worm 427 and worm wheel 428, drives the cycle shaft X. Suitable bearings for the short shafts which carry the various gears and pinions are provided in a frame 429, which is secured to the front wall of the machine bed. The pinions 421, 422 are rigidly connected and rotate together about a horizontal stud 430 carried by an adjustable plate 431 secured to the frame 429. The pinion 421 meshes directly with the driving pinion 420, the pinion 422 meshing with pinion 423, which latter pinion is rigidly mounted upon the horizontal shaft 432. The motion of shaft 432 is transmitted to the vertical shaft 426, which carries the worm 427 through the bevel gears 424, 425, which are respectively rigidly mounted upon the said horizontal and vertical shafts. Worm 427, which is rigidly mounted upon the vertical shaft 426, is the final connecting link between the driving pinion 420 and the cycle shaft X driven thereby, the said worm engaging the worm wheel or gear 428, which, as above set forth, is rigidly secured to the cycle shaft.

The driving pinion 420 is connected to pinion 423 through the intermediate pinions 421, 422 instead of directly, in order to permit of varying the gear ratio between the clutch shaft section U—360 and the cycle shaft X. The said intermediate pinions, as noted above, are carried upon a stud 430, which stud is mounted upon the adjustable plate 431. This plate embraces the shaft U—360 and is freely rotatable about the axis of said shaft when the screws 433 which clamp the plate to the frame 429 are loosened. The screw holes 434 in plate 431 are elongated to provide arcuate slots of a sufficient length to permit the said plate to swing through a considerable angle about the said shaft. As will be readily understood, if it is desired to change the speed of the cycle shaft whereby to increase or decrease the period of a production cycle, the required change in the driving ratio between the clutch shaft and the cycle shaft may be effected by replacing pinion 322 by a pinion of different pitch diameter. The pinion 421 will always properly mesh with driving pinion 420 regardless of the angular position of the adjustable plate 431, and the new pinion which is substituted for pinion 422 can be brought into proper mesh with pinion 423 by shifting the said plate.

It may be here noted that the shaft section U—360, through a chain of sprocket drive, rotates a rotary oil pump $a$ which delivers a suitable lubricant to the nipple and thread cutters. The driving sprocket 435 may be conveniently secured upon the left end of the clutch head 415, which rotates with the shaft section U—360.

*The blank feeding mechanism.*—Blanks are carried from the feed magazine $p$ into position between the head-stocks by two cooperating feed mechanisms. The first of these is the longitudinal blank feed which carries the blank from the magazine longitudinally into alignment with the second feed mechanism. The said second feed mechanism comprises a transverse feed adapted to carry the blank from the line of the longitudinal feed into alignment with the head-stock mandrels. The first of these feed mechanisms will now be considered.

Referring particularly to Figs. 6 and 12, it will be noted that a supply of nipple blanks 1 are retained within an inclined feed chute or magazine 440. This magazine may be of any desired length, but inasmuch as it requires twelve seconds to complete the threading of a nipple blank, the capacity of the magazine need not be great because one operator in charge of a group of machines according to the present invention, would have no difficulty in refilling such magazines as often as required. The blanks are carried by gravity, and the one at the lower end of the magazine will fall directly into the path of the longitudinal feed bar 441. The entire longitudinal feed mechanism is carried by a frame 442 which is rigidly secured to the bed of the machine. Longitudinal feed bar 441 slides axially in bearings provided toward the upper ends of arms 443, 444, formed integrally with the said frame 442, the said bearings also permitting the free rotation of the feed bar. Immediately above feed bar 441, an ejector bar 445 is slidably mounted. To the left of the frame arm 443, the ends of feed bar 441 and ejector bar 445 are connected by a cross-head 446. (Figs. 6 and 9.) The said cross-head is rigidly secured to the ejector bar but provides a freely rotatable bearing for the end of feed bar 441. The construction is such, however, as to cause the feed bar to shift axially with the cross-head while being freely rotatable therein. This is accomplished by reducing the diameter of the end of the feed bar lying within the cross-head and threading the outer end of the bar so that a nut 447 may be secured thereon. Thus, the cross-head is held against axial displacement along the bar, it being retained between the said nut and the shoulder 448. The threaded end of the bar is smaller than the portion lying within the cross-head, so that the nut cannot bind against the cross-head but is tightened against the shoulder 449. The longitudinal feed bar and the ejector bar connected by the cross-head 446 are actuated through a connecting rod 450, the said rod being pivotally secured at its left end to the cross-head at 451. The right hand end of connecting rod 450 is pivoted to the upper end of an oscillating arm 452, which arm is actuated by the longitudinal feed cam 453, as will hereinafter be set forth.

The feed bar 441, as best seen in Figs. 27 and 28, carries at its right hand end a feed mandrel 454, the shank 455 of said feed mandrel being rigidly secured within a central bore 456 formed in the end of the bar. The mandrel is of a somewhat smaller diameter than the end of the bar and is provided with six keyways 457 and is of substantially the same cross-section as the mandrel M′ illustrated in Fig. 19. The arrangement of keyways 457 provides three pairs of diametrically-opposed keyways which may engage the internal keys 2 of a nipple blank in any one of six different angular positions. When the feed bar is advanced by the movement of cross-head 446, it is also simultaneously rotated by a stationary pin 458 (Fig. 6) which engages a spiral groove 459 formed in the surface of the longitudinal feed bar. This rotation insures that one or another of the pairs of keyways 457 in the feed mandrel will be rotated into alignment with the internal keys of a nipple blank which drops down in front of the mandrel. To insure against the rotation of the nipple blank until its keys have been picked up by one or another pair of keyways in the feed mandrel, a friction chuck is provided, and this chuck is disposed in such a position that the blank which drops into the longitudinal feed at the position 460, indicated in dotted lines in Fig. 27 must be moved through the said friction chuck by the advance of the feed bar.

The said friction chuck comprises four longitudinally-disposed keys 461 which are guided within keyways 462 in the stationary chuck head 463. The said keys are pressed radially inward to resiliently engage the nipple blank which is fed through the chuck by springs 464 disposed toward either end of the said keys. The keys are retained against longitudinal displacement and also prevented from being carried out of the keyways by the action of springs 464, by retaining screws 465, the screws being threaded into the said keys but passing freely through radial bores in the chuck head, the screw heads engaging the outer surface of the said chuck head. The screw shanks 466 are of a sufficient length to permit the slight radial movement of the keys required by their frictional engagement with the outer surface of nipple blanks, but inasmuch as the blanks are of a substantially uniform diameter, this movement need be only very small. The key springs 464 are also disposed in radial bores 467 formed in the friction chuck head and are retained in such bores by threaded plugs 468, as shown in Fig. 27.

The radially movable keys 461, in addition to frictionally checking the rotation of a nipple blank fed between them until the keys of the internal blank are engaged by the keyways in the feed mandrel, perform the second important function of stripping the nipple blank from the feed mandrel 454 when said mandrel is carried backwards to its initial position ready for a subsequent feed. It will be apparent that when the feed mandrel has pushed the blank beyond the ends of friction keys 461, said keys will spring inwardly to the minimum diameter permitted by the retaining screws 465, and this minimum diameter will be less than the external diameter of the nipple blank. Therefore, upon the backward movement of the feed mandrel, the left end of the blank will positively engage the ends of the four spring-pressed keys 462 and so be stripped from the mandrel, even though in a somewhat defective blank there may be considerable friction between the blank and the mandrel.

Figure 24:
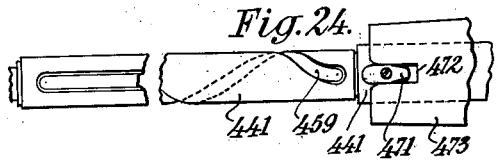
Fig. 24 is a plan view of the longitudinal feed bar alignment lock.

The nipple blank in the manner above described, is carried longitudinally into the blank-gripping friction jaws 470 of the transverse blank feed mechanism hereinafter to be described, and the blank is deposited within said jaws with its internal keys 2 in correct angular position to be accurately engaged by the keyways 22 of the non-rotatable head-stock mandrels 21 when the said transverse feed carries the said blank into axial alignment with such mandrels. The correct orientation or angular positioning of the blank keys is accomplished by the action of the rotatable feed mandrel which picks up the said keys at one of six possible angular positions and rotates the blank so as to deposit it within the transverse feed with the blank keys accurately located in one or another of the six angular positions in which it may be freely engaged by one or another of the pairs of keyways in the head-stock mandrels. The blanks being fed into the magazine at random, will be brought by the longitudinal and transverse feed mechanisms into alignment with the head-stock mandrels with their keys disposed to engage various pairs of mandrel keyways, and this is desirable inasmuch as in the long run it will quite evenly distribute the wear upon said keyways, consecutive nipple blanks engaging the same pair of mandrel keyways only by chance. To more positively insure the accurate orientation of the nipple blank keys, a locating lug 471 (Figs. 6 and 24) is rigidly secured upon the longitudinal feed bar 441 at a point where it will engage the locating slot 472 formed in the end of the feed bar guide 473 when the feed bar is fully advanced. The aforesaid arrangement is provided to avoid possible inaccuracies that might occur in the positioning of the blank keys should the spiral groove 459 which rotates the feed bar, or the pin 458 co-operating therewith, become worn. It will be noted that the extreme left hand end of groove 459 lies in a straight line parallel to the axis of the feed bar and thus holds the bar against any angular movement during the last portion of its advance. While the entrance to locating slot 472 is slightly flared to insure the free admission of locating lug 471, the remainder of the slot accurately fits the said lug, and consequently the feed bar will be positively oriented when in the fully advanced position, even though there is some lost motion between pin 458 and the spiral groove 459.

The longitudinal feed is actuated by the cam 453, which is rigidly secured upon the short longitudinal cam shaft 475. (Figs. 6 and 9.) A bracket 476 secured to the bed of the machine provides bearings 477, 478, for the said shaft and also provides a bearing support 479 for the transverse rock shaft 480 disposed above the said shaft. Upon the rear end of rock shaft 480, a depending arm 481 is rigidly mounted, the said arm carrying at its lower end a cam roller 482 which engages the cam surface 483 formed at the right hand end of the cam head 453. The said arm is at all times resiliently urged against the said cam surface by the action of a strong torsion spring 484 which surrounds the rock shaft 480. One end of the torsion spring is secured to the bracket 476 by a screw 477, the other end of the spring being fastened to a collar 488 which is rigidly mounted upon the outer end of the said rock shaft. Three diametral bores at equal angles around the said collar permit of an adjustment between the collar and the said rock shaft, whereby the tension of the torsion spring may be varied, the collar being made fast in a desired adjustment by a pin 489 which passes through one of the said diametral bores and the rock shaft. The arm 452, which is rigidly secured to and projects upwardly from the rock shaft, is connected through connecting rod 450 and cross-head 446 to the longitudinal feed, as hereinbefore set forth. It will be understood that the web 479 of bracket 476, to which the torsion spring is secured by screw 477, lies between the said spring and the arm 452.

From the foregoing description it will be apparent that the transverse feed bar is carried to the right, or advanced by the torsional effect of spring 484 upon rock shaft 480. This resilient advance of the feed bar is provided to insure against damage to the mechanism should a misfeed occur, and which, in case of a mistimed actuation of the mechanism, might cause the longitudinal feed bar to be driven against the transverse feed slide at a time when the said slide is not in position to receive the nipple blank. The withdrawal or backward movement of the feed bar is under the positive drive of the cam surface 483, arms 481 and 452 being rigidly connected through the rock shaft 480. However, no damage can result through such positive backward movement of the feed bar because all parts of the feed which might jam when moved together, are, under such conditions, being separated from one another. It will, of course, be understood that the resilient advance of the feed bar through the action of torsion spring 484, is, under normal conditions, perfectly controlled by the cam 453 because the spring holds the cam roller 482 at the lower end of arm 481 against the cam surface with considerable force.

The working surface 483 of cam 453 (Fig. 6) provides a cam contour which results in a smooth acceleration and retardation of the longitudinal feed bar, first to the right, and then to the left. At a point where the said cam effects the full backward movement of the feed bar, a slight arcuate depression 490 is formed in the working surface of the cam. This depression serves to prevent the overrunning of the cam at the end of each revolution, the cam roller 482 being thrown into said depression with considerable force by the action of torsion spring 484. The point at which depression 490 is engaged by the cam roller represents the normal position of rest of the longitudinal feed actuating cam 453. In moving the feed bar from its normal position to its fully advanced position, the cam is rotated through 180°, and the full rearward movement of the said feed bar is brought about by a second 180° movement of the cam. Thus, a complete actuation of the longitudinal feed mechanism is produced by a single revolution of cam 453, the cam coming to rest at the end of each revolution at the point where the cam roller engages the arresting depression 490.

The single revolution of feed cam 453 is effected through a self-disengaging multiple toothed clutch 491, 492. (Figs. 5 and 6.) This clutch is carried upon the right hand end of cam shaft 475, the driving element 491 of the said clutch being rigidly secured upon the face of a gear 493 which is freely rotatable about the said shaft. Gear 493 meshes with a pinion 494 which is rigidly mounted upon the section U—360 of the clutch shaft, and as hereinbefore set forth, this section of the clutch shaft is in continuous rotation when the machine is in operation. The driven element 492 of the clutch is slidably keyed upon the cam shaft 475, springs 495 carried in a head 496 rigidly secured upon the end of said shaft tending at all times to shift the toothed face of the said driven element 492 of the clutch into engagement with the toothed face of driving element 491. A cam groove 497 is formed in the periphery of the said driven element of the clutch, the said cam groove having an inclined surface 498, which, when engaged by a cam pin 499, results in the axial movement of the said clutch element to the right. This disengages the clutch, the cam rise or inclined surface 498 being angularly related to the arresting depression 490 in cam 453 in such manner as to disengage the clutch and thereby stop the rotation of the cam in the position where cam roller 482 drops into the said depression. It will be apparent that the action of clutch 491, 492 is similar in principle to the action of clutch 210, 211, and also to the action of clutch 361, 362, hereinbefore described. When the driven element 492 of the clutch has been brought to rest, the longitudinal blank feed mechanism will remain inactive until the said element is permitted to reengage the driving element under the action of springs 495 by the withdrawal of cam pin 499. The mechanism which controls the movement of clutch pin 499 is primarily actuated by a part of the transverse blank feeding mechanism, which mechanism, it will be recalled, is itself actuated by a cam S carried upon the main cam shaft Q. It may here, therefore, be briefly stated that the withdrawing of cam pin 499 from the clutch cam groove 497, which results in an actuation of the longitudinal blank feeding mechanism, as above set forth, is timed by the said main cam-shaft cam S. The cam pin is only momentarily withdrawn, and thereafter rides yieldingly upon the periphery of the axially slidable clutch head 492 until it falls into the low section 500 of the cam contour whereby it will be permitted to engage the cam rise 498 to disengage the clutch toward the completion of a single revolution thereof.

A detailed description of the timing mechanism, whereby cam pin 499 is controlled, will be postponed until the transverse blank feed mechanism is described, inasmuch as the cooperative relationship between the two will then be more readily understood.

The transverse feed mechanism, as best seen in Figs. 1, 5 and 12, comprises a transversely reciprocated slide 501 which is carried upon a horizontal guideway 502. The said guideway is supported by a substantial bracket 503 projecting forwardly from the bed of the machine and rigidly secured thereto. The slide 501 is carried in transverse alignment with the median point between the spindle heads D, so that the blanks will be fed between the said heads and at an equal axial distance from both. The slide 501 carries upwardly-extending walls 505 between which two blank-gripping levers 507 are pivotally mounted on pins 506. Interposed between the said levers is a distance piece 508, the said piece being adjustably secured between the side walls 505 by bolts 509 which pass through the piece and the said walls, the bolts clamping the walls securely against the sides of the said distance piece. Interposed between the outer ends of levers 507 is a strong compression spring 510, which, in urging the said lever ends apart, causes the opposite ends of the lever to be moved toward one another, the maximum approach of said latter lever ends being determined by the distance piece 508 interposed between them. The width of distance piece 508 is just sufficient to insure a spacing of the inner ends of the levers such as will permit the relatively free insertion of a nipple blank therebetween when such blank is advanced by the longitudinal feed bar 441, as hereinbefore set forth. The inner ends 470 of blank-gripping levers 507 are cupped, as shown in Fig. 12, to conform to the curvature of the nipple blanks which are successively engaged between them. It will be noted that the inwardly-projecting arms of the levers 507 are reduced in thickness toward their free ends so as to provide the necessary degree of resiliency to permit of the frictional engagement of the jaw portions 512 with a nipple blank inserted therebetween and without compressing the spring 510. Unless such resiliency were provided toward the ends of the lever arms, the slight separation of the ends 470 thereof necessary to insure a frictional grip upon a blank fed between them would result in the moving together of the opposite ends of the levers and a compression of spring 510. Forming the levers as shown with resilient end portions 507', permits spring 510 to hold the portions of the levers opposite distance piece 508 securely in contact with such distance piece, even when the blank-gripping portions of the levers are slightly separated to frictionally engage a blank, and thus the accurate horizontal positioning of the lever ends is determined and maintained by distance piece 508 during the advance of the transverse feed slide. It is necessary that such horizontal alignment be accurately preserved inasmuch as the blank must be carried from the axis of the longitudinal feed to the axis of the spindle heads with great accuracy to permit the free engagement of the spindle mandrels M. If the blank should be carried too high or too low a jam would occur, the said mandrels engaging the ends of the blank instead of penetrating it.

As hereinbefore set forth, the blank is fed longitudinally between the jaws 470 of the transverse feed, the internal keys of the blank being accurately oriented so as to be freely engaged by one of the pairs of diametrically-disposed keyways in the headstock mandrels M when the blank is carried into axial alignment with such mandrels. The motion of the transverse feed slide is such as to carry the blank from the axis of the longitudinal feed into alignment with the mandrels, at which point a dwell in the motion of the transverse feed permits of the entrance of the mandrels within the blank. After the mandrels have penetrated the blank a sufficient distance to hold it against axial displacement, the transverse feed slide is withdrawn and restored to its outer position, the ends 470 of the blank-gripping levers 507 being permitted by the yielding of spring 510, to separate sufficiently to slip off the nipple blank.

The motion of transverse feed slide 506 is controlled by the cam S which is carried by the main cam shaft Q, and which, therefore, will always act in accurately timed relationship with the mandrel advancing cams R which are also carried upon said cam shaft. The connection between cam S and the transverse feed slide is established through an arm 514 and arm 515, said arms being respectively rigidly secured upon longitudinal rock shafts 516 and 517. (Fig. 12.) The motion of rock shaft 516 is transmitted to rock shaft 517 through toothed sectors 518, 519 secured respectively thereon. Depending from arm 514 is an arm 520 formed integrally therewith, the said arms constituting a bell-crank, to the lower end of which is connected parallel tension springs 521. The said tension springs extend transversely through the hollow bed of the machine and at their rear ends are secured to a nut 522 threaded on an adjusting bolt 523, and which bolt is rotatably secured in the rear wall of the machine bed. As shown in Fig. 12, the action of springs 521 tends to rotate arms 520 and 514 and also rock shaft 516 in a counter-clockwise direction, and such action resiliently holds the cam roller 524 carried at the inner end of the arm 514 against the working surface of cam S. The upper end of arm 515 carries a fork 525 which slidably engages a squared block 526 pivotally carried by the transverse feed slide 501. As will be seen in Fig. 5, a central opening 527 in guideway 502 permits the free fore and aft reciprocation of the forked end of arm 515 which projects therethrough.

From the foregoing description it will be apparent that the transverse feed slide is not positively advanced or carried inward from the blank-receiving position to the blank-delivering position, but executes such movement through the action of springs 521, which action is merely controlled by the cam S. The reverse movement of the slide is brought about by the positive driving effect of cam S and against the action of springs 521. This construction has been adopted to protect the mechanism against damage in the event of a jam. If, for example, a blank previously engaged by the head-stock mandrels should not be released at the proper time, it would be engaged by the ends 470 of the blank-gripping levers carried by the transverse feed slide, when the slide is advanced to deliver a new blank, but since the slide is resiliently actuated, no damage would result. Although the feed slide is resiliently actuated, it will be understood that its advance is accurately controlled by cam S, the cam roller 524 being held securely in contact therewith by the very considerable tension of springs 521. The contour of cam S is such as to provide a considerable dwell in the movement of the transverse feed slide after such slide is moved to its blank-delivering position, and also just before the slide is advanced from it blank-receiving position, the said dwells occurring between the two arcs of constant radius 525, 526, indicated by arrow lines toward the periphery of cam S, as shown in Fig. 12. The timing of the transverse feed mechanism with relation to the head-stock and mandrel-actuating means, is diagrammatically shown in Fig. 16, the line C indicating the movement of the transverse feed, as hereinbefore set forth.

To insure against any possible damage to the transverse feed mechanism during its rearward movement under the positive drive of feed-actuating cam S, the arm 515 is driven from rock-shaft 517 through a shear-pin 528. As shown in Figs. 5 and 12, a driving hub 528$^a$ making a taper-fit with the end of shaft 517 is rigidly keyed thereto and secured by a nut 528$^b$ threaded on the end of said shaft. The lower end of arm 515 embraces the cylindrical portion of hub 528$^a$ but would be free to turn thereon except for the shear-pin 528 which passes through the arm 515 and a flange 528$^c$ formed integrally with hub 528$^a$. The shear pin which is in the form of a bolt serves also to prevent arm 515 from sliding axially along the hub. The pin is preferably made of relatively soft metal such as cold rolled steel, and to insure the ready shearing of the pin it may be retained within hardened bushings 528$^d$, 528$^e$, which are fixed in the hub flange 528$^c$ and arm 515 respectively.

The timing device whereby the longitudinal blank-feeding mechanism is caused to act in timed relationship to the movement of the transverse feed slide, will now be described. It will be recalled that the longitudinal feed bar 473 is caused to advance, and thereafter immediately to be withdrawn, by the action of cam 453. This cam is controlled by the multiple jawed clutch 491, 492, which, after effecting a single revolution of the cam, is automatically disengaged, as hereinbefore set forth. The advance of the feed bar causes a nipple blank to be carried from the lower end of the magazine into the blank-gripping jaws 470 of the transverse feed slide, the feed bar thereafter being returned to its initial position ready for a subsequent feed, and both these actions are brought about by a single revolution of the cam 453.

It will also be recalled that the transverse feed slide remains stationary in its outer position, as shown in Fig. 12, for a period of approximately ten seconds during each production cycle, the cam shaft Q controlling the movement of said slide remaining stationary during such period because of the disengagement of clutch 361, 362. With the foregoing in mind, it will be apparent that the periodic operation of the longitudinal blank-feeding mechanism may be conveniently instituted by a timing device controlled by the transverse feed mechanism, said device co-operating therewith in such manner as to bring about the actuation of the longitudinal blank feed at the moment that the transverse feed slide is restored to its outer or blank-receiving position. In the preferred construction, a trip finger 530 (Figs. 5, 12, 27 and 29) is pivotally secured upon the arm 515 which reciprocates the transverse feed slide. The said finger is resiliently held against a stop lug 531 projecting from the said arm by a tension spring 532. Rigidly secured at the right hand end of a longitudinal rock shaft 533 is an arm 534, the upper end of said arm being disposed in a position where it will be engaged by trip finger 530. As shown in Fig. 12, the stop lug 531 lies to the right of said finger, thus preventing the finger from swinging further counter-clockwise. The said finger is, however, free to swing in a clockwise direction against the action of spring 532, and will so swing when the slide-actuating arm 515 is advanced (moved to the right of Fig. 12), the finger riding idly over the end of rock shaft arm 534. Upon the reverse movement of the slide-actuating arm, the finger 530, when it engages the end of the rock shaft arm, abuts against stop lug 531 and consequently postively acts upon the said rock shaft arm, causing it to be swung in a counter-clockwise direction. The relationship of the trip finger and rock shaft arm is such that the aforesaid positive actuation of the latter will occur practically simultaneously with the arrival of the transverse feed slide 501 at its outer or blank-receiving position.

Upon the left hand end of rock shaft 533 is rigidly secured an inwardly-projecting arm 535, the inner end of which lies within a slot 536 formed in the vertically-slidable clutch cam pin 499, hereinbefore referred to. The said end of arm 535 is slightly rounded, as shown, to permit of the free swinging movement of the arm within slot 536 while insuring a positive connection with the arm as far as the vertical-component of its motion is concerned. A compression spring 537 is mounted in the upper end of the vertical bore, within which the cam pin slides, said spring at all times tending to move the pin into engagement with the cam groove 497. When rock shaft arm 534 is swung counter-clockwise or tripped by the action of finger 530, arm 535 at the opposite end of the rock shaft will be swung upwardly and thereby withdraw cam pin 499 from the said cam groove. As hereinbefore set forth, the withdrawal of the said cam pin permits the immediate engagement of clutch element 492 with the driving clutch element 491 through the action of clutch springs 495. (Fig. 5.) Thereafter cam 453 will be rotated through one complete revolution to actuate the longitudinal blank-feed mechanism, the clutch being disengaged at the end of such revolution by the action of cam pin 499, which, in the meantime, will have been permitted to reenter cam groove 497, the said pin being only momentarily withdrawn from the groove by the passage of trip finger 530 over the end of rock shaft arm 534. After such passage has occurred, there is no restraint whatever upon the movement of the rock shaft and cam pin 499 will be thrown into the cam groove by spring 537 immediately upon the arrival of the low section 500 of the cam surface beneath the said pin.

From the foregoing description of the primary timing mechanism for controlling the longitudinal blank-feed, it will be clear that a new blank will be carried from the magazine longitudinally into the transverse feed jaws 470 immediately after the transverse feed slide is restored to its initial or receiving position. The actual time required in the present construction to complete the action of the longitudinal blank-feed mechanism is slightly in excess of two seconds. It will therefore be apparent that in the normal operation of the machine, the transverse feed slide will remain stationary in its initial or outer position for a period of somewhat more than seven seconds after a new blank has been inserted between the jaws 470 thereof. In other words, less than one-quarter of the period during which the transverse feed slide is idle or stationary, is occupied by the longitudinal blank feed mechanism in completing its cycle of operation. The remainder of the period during which the transverse feed mechanism is idle, may be utilized, according to the present invention, to insure that the blank which the said slide will subsequently deliver to the head-stock mandrels, is free from such defects as might interfere with the free engagement of the mandrels therein. The mechanism whereby imperfect blanks are rejected during the idle period of the transverse feed mechanism will be described under the following heading.

*The blank-rejecting and re-feed mechanism.*—Co-axially with the longitudinal feed bar 473 and immediately to the right of the blank-gripping jaws 470 of the transverse feed slide, is a stationary hollow cylindrical head 540 (see Figs. 5, 27 to 31 inclusive). Within said head is rigidly secured a sleeve 541, at the left end of which a flange 542 is formed. Within radial bores 543 in said flange, stripping pins 545 are slidably mounted. Said pins being of round cross-section to slide freely in the radial bores 543, but having a cutaway portion 545a which provides a flat guide surface. Small pins 545b are driven into the flanged head 542 at points where they will lie partly within the radial bores 543 and engage the flat guide surfaces 545a of the said pins and thereby prevent the rotation of the pins. The heads 546 of the pins are somewhat enlarged and are caused to seat against the radially inward ends of spring-retaining bores 547a which are co-axial with and form an extension of the radial pin-guiding bores 543. Springs 547 are retained within said bores by threaded plugs 548 which are screwed into the outer ends thereof. The radially inward ends of pins 545 project into the central opening of sleeve 541, which opening is of a diameter slightly greater than the diameter of a nipple blank, a sufficient distance to insure their positive engagement behind a nipple blank which has been carried beyond them to the right, whereby they will act to strip the blank from the feed bar mandrel 454 upon the backward movement of said mandrel. This stripping action is much the same as that of the radially-slidable friction bars 461 which strip the blank from the mandrel when such blank is deposited in the normal feed position between the jaws 470 of the transverse feed, as hereinbefore set forth. The inner ends of stripping pins 545 are formed to present an inclined surface 549 to a blank forced between the pins whereby the pins will be displaced radially outward against springs 547 to permit the movement of a blank from left to right in Fig. 6. The right hand faces of the pins, however, present sheer vertical surfaces which drop behind the blank immediately after its passage beyond the pins, and should the blank tend to stick to the mandrel upon the rearward movement thereof (to the left in Fig. 27), it will engage said vertical surfaces of the pin and thereby positively be stripped from the mandrel. The feed-bar mandrel 454, when fully advanced, penetrates sleeve 541 by a distance somewhat in excess of the longitudinal or axial width of a nipple blank. It will therefore be apparent that if the internal diameter of a blank is restricted at any point longitudinally thereof sufficiently to prevent the blank from sliding freely along the feed-bar mandrel, such blank will be carried beyond the fingers 545 a distance which will depend on the point at which the nipple blank is internally restricted, e.g., the defect 1ª within blank 2, Fig. 30. As hereinbefore set forth, the diameter and general form of the feed-bar mandrel, including the mandrel keyways, is practically identical with that of the head-stock mandrels. If a blank has an unobstructed central opening such as will permit the free passage of the feed-bar mandrel therethrough, it is certain that the headstock mandrels will also freely enter such blank when it is brought into axial alignment therewith. Such a blank will never be carried into the rejector head 540 because the feed-bar mandrel 454 will always slide through the blank while the latter is frictionally held between the friction fingers or keys 461 which lie to the left of the transverse feed slide. A normal blank is not shifted axially by the feed bar mandrel after the blank is engaged by the said friction keys, but remains substantially stationary, permitting the mandrel to slide through it up to the point where the blank is engaged by the end surface 550 of the feed bar itself.

Figure 30:
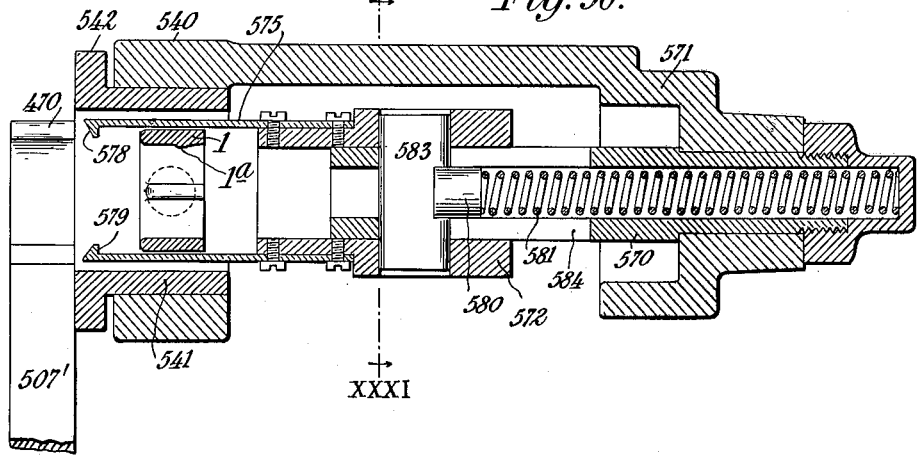
Fig. 30 is an axial horizontal section of the blank rejector head and ejector slide taken along line XXX—XXX of Fig. 5.

As above set forth, however, defective blanks which are so restricted internally as to prevent them sliding over the end of the feed-bar mandrel, will be carried into the rejector head 540, as shown in Fig. 30. When a blank is carried into the rejector head it acts directly upon a vertically-slidable trip bar 551, which, through suitable connections presently to be described, results immediately in a second operating cycle of the longitudinal blank feed mechanism. If the blank subsequently picked up by the said feed mechanism is defective and fails to slide over the end of the feed bar mandrel upon such second or "re-feed operation", it will, in a manner similar to the first described blank, bring about a third actuation of the longitudinal blank-feeding mechanism. The timing of the mechanism could be arranged to provide for a fourth and fifth re-feed, or even more if this were necessary, but in the present embodiment, provision is made for only three consecutive longitudinal feeding operations, because it is deemed highly improbable that in any random run of reasonably well made blanks that three defective blanks would drop from the magazine in succession.

The upper end of slidable trip bar 551 is formed to provide an inclined surface 552, which, when engaged by a nipple blank as the latter is carried into the rejector head 540, will cause the downward movement of the said bar. At the lower end of the trip bar an enlarged forked head 554 is formed, the said head providing a shoulder 555 which engages the lower end of stationary guide 556 when the trip bar is in its upper or normal position, i.e., the position which the bar occupies when not depressed by a rejected nipple blank. (Fig. 27.) A horizontal arm 557 rigidly secured upon the inner end of a transverse rock shaft 558 (Fig. 12) is disposed so that its free end lies within the forked head 554 at the lower end of the trip bar. The said end of the arm 557 is rounded, as shown in Fig. 27, to permit the free vertical swinging movement of the arm with respect to the fork slot in head 554, but the vertical front and rear faces of the arm provide plane surfaces which engage the walls of the forked slot and thus prevent any rotational or angular movement of the trip bar such as would throw the inclined surface 552 at the upper end thereof out of proper alignment with relation to the feed mandrel 454. The rock shaft 558 which is supported in suitable bearings 559 and 560 carried by the transverse feed slide bracket 503, carries rigidly between said bearings a downwardly projecting detent arm 561. The lower end of this arm may be swung into the path of an upwardly-extending arm 563 which is rigidly secured to the longitudinal rock shaft 533 hereinbefore described, and will be so swung whenever trip bar 551 is depressed by the entrance of a rejected nipple blank into the rejector head 540. The relative disposition of arms 561 and 563 is such that when the rock shaft 533 has been swung counter-clockwise a sufficient distance to bring about the disengagement of clutch cam pin 499 from clutch groove 497, as hereinbefore described, the arm 561 may swing into the path of arm 563 at a point which will prevent any appreciable clockwise rotation of said latter arm (Fig. 12, also see plan view in Fig. 29). The detent arm 561 in thus restraining the movement of arm 563 prevents the normal re-engagement of clutch cam pin 499 with the clutch cam and consequently the clutch, instead of being disengaged upon the completion of one revolution, will continue in engagement for a second revolution or for any greater number, depending upon the period of engagement of the detent arm with rock shaft arm 563. This period is determined by the number of blanks which enter the rejector head 540, as will hereinafter more fully appear. It will be recalled that every revolution of the driven clutch element 492 (Fig. 5) results in an actuation of the longitudinal feed mechanism, and consequently a continuous succession of blanks will be fed from the magazine by said mechanism as long as the clutch cam pin 499 is prevented from entering the clutch cam groove by the restraining action of detent 561. The movements of the longitudinal blank feed are shown diagrammatically in Fig. 16ª, line E. This diagram also shows the relationship of such movements to certain other functions of the machine occurring during a complete production cycle. The first operation of the longitudinal feed occurs immediately after the transverse feed has returned to its outward or receiving position. (Fig. 16ª, line C.) The second and third operations of the longitudinal feed (re-feeding operations) are shown in dotted lines (line E), as these occur only when one or more abnormal or defective blanks are delivered to the inspector or test mandrel 454 carried by the longitudinal feed bar 441.

Arm 561 is normally retained in its right hand position, as shown in solid lines in Fig. 27, and out of the path of motion of rock shaft arm 563 by a spring-pressed plunger 564 guided within a longitudinal bore 565 formed in the slide bracket 503 (Fig. 5). The said spring-pressed plunger swings arm 561 clockwise, thereby raising the end of arm 557 and trip bar 551, the movements of these parts being checked by the engagement of the head 554 at the lower end of the trip bar with the end of trip bar guide 556. The trip bar will be yieldingly held in this upper position by the action of spring plunger 564 until a rejected nipple blank is carried into the rejector head 540, thus depressing the trip bar against the action of said spring plunger and throwing arm 561 to the rear of and directly in the path of rock shaft arm 563, whereby the return of said arm to its normal position is prevented as long as a rejected blank lies in the rejector head, the restraining of arm 563 permitting successive re-feed operations during the period of such restraint.

The means for ejecting a defective blank which has been deposited in the rejector head 540, as hereinbefore set forth, will now be described. Upon a guide bar 570 (Fig. 5) which is rigidly mounted in a stationary end bracket 571, an ejector head 572 is adapted to freely slide. The guide bar 570 is in coaxial alignment with the longitudinal feed bar 441 and feed bar mandrel 454. The ejector slide head 572 carries an upwardly-extending arm 573, at the upper end of which is adjustably secured an abutment 574 which lies directly in the line of motion of the longitudinally-slidable ejector bar 445. This bar, it will be recalled, is actuated through cross-head 446, which also actuates the longitudinal feed bar 441. A pair of ejector claw fingers 575 (Figs. 27, 28, 30 and 31) are rigidly secured to the slidable ejector head 572, the said fingers extending to the left and being guided in longitudinal keyways 576 cut in the inner surface of the blank-receiving sleeve 541 secured within ejector head 540. The said claw fingers carry at their free ends, claws which project radially inward so as to be engaged by a nipple blank which is carried into the rejector head. The faces 578 of these claws, which are first engaged when a nipple blank is forced between the claws, are suitably inclined so that the advance of the blank will spring the claws radially outward, the claw fingers 575 being sufficiently resilient to permit the relatively slight movement of the claws necessary to permit the passage of a blank between them. When the blank has been carried beyond the perpendicular gripping edges 579 of the claws, the claws will spring inward where they will effectively engage the left hand end of the nipple blank when the ejector head 572 is subsequently shifted to the right (Fig. 30).

Within a central longitudinal bore in the guide bar 570 upon which the ejector head slides, a spring-pressed plunger 580 is mounted (Figs. 30, 31), a strong compression spring 581 being retained within said bore to the right of said plunger. The left hand end of the plunger bears against a cross-piece 583 which projects through guide slots or keyways 584 formed in the wall of guide bar 570, the front end of said cross-piece extending into and being rigidly secured in the slidable ejector head 572. The cross-piece thus serves to transmit the pressure of spring 581 to the said slidable head and also to prevent the head from turning about the guide-bar 570 along which it slides. The cross-piece also limits the movement of the ejector head to the left by its engagement with the left hand end of slots 584. The left end of said slots brings the ejector head 572 to rest when spring 581 has shifted it to the left a sufficient distance to insure the engagement of ejector claws 579 behind a rejected nipple blank lying within rejector head 540, as shown in Fig. 30. The ejector claws must not be permitted to go further than this to the left, because they would then engage the blank-gripping jaws 470 of the transverse feed slide.

Figure 31:
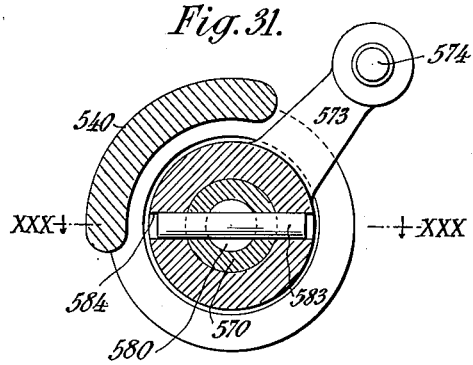
Fig. 31 is a transverse vertical section taken along the line XXXI—XXXI of Fig. 30.

The degree of movement of ejector head 572 to the right is determined by the engagement of ejector bar 445 with the abutment 574 of the said ejector head (Figs. 5 and 31).

The length of the ejector bar is such that when the abutment 574 is correctly adjusted, the ejector head will be carried to the right after the engagement of said bar and abutment a sufficient distance to cause the ejector claws 579 to draw a rejected nipple blank lying within ejector head 540 completely out of the head so that the blank will drop clear of the ejector mechanism. Since the movement of longitudinal feed bar 441 required to carry a blank from the magazine feed line into the transverse feed jaws 470 is greatly in excess of the movement required to eject a blank lying within the ejector head 540, ejector bar 445 executes the greater part of its stroke idly and does not engage abutment 574 until some time after the longitudinal feed bar has begun to move a blank from the magazine feed line.

Unless a defective blank is encountered in the operation of the machine, the rejector and re-feed mechanism hereinbefore set forth is entirely inoperative. When, however, a defective blank fails to slip over the end of the feed bar mandrel, such blank will be carried by the mandrel into the rejector head 540, where it will depress trip bar 551 and immediately bring about a second actuation of the longitudinal blank-feeding mechanism. Upon the completion of the first actuation of the said feed mechanism, ejector claws 579 will have been engaged behind the rejected nipple blank lying within head 540, and consequently, upon the second actuation or re-feed of the longitudinal blank-feed mechanism, the advance of ejector bar 445 will result in the ejection of the previously rejected nipple blank from head 540. If the blank picked up by the second feeding operation should prove to be defective, it will, in turn, be carried into the rejector head, and in like manner result in a third re-feeding operation. If, however, the second blank is not defective, it will be deposited in the normal manner between the jaws 470 of the transverse feed slide. The ejector claws 577 having simultaneously, with the second advance of the feed bar, ejected the previously rejected nipple blank from head 540, no further immediate actuation of the longitudinal feed mechanism will occur, because upon the ejection of the blank from rejector head 540, trip bar 551 is permitted to rise up into its normal position within the said head, and in the manner hereinbefore described, withdraw detent arm 561 from the path of rock shaft arm 563 so that the longitudinal blank feed actuating clutch 491, 492 will be automatically disengaged upon the completion of the second feed cycle.

*Operation.*—The operation and cooperation of the several parts of the mechanism according to the present invention has been hereinbefore fully set forth in connection with the description of said parts, so that no further detailed description of such operation need be given. Briefly summarized, the operation of the nipple-threading machine hereinbefore described, and which machine constitutes the preferred embodiment of the invention, is as follows:

Before the machine is set in motion, a supply of nipple blanks is deposited in the magazine 440. It will be assumed that the machine has previously been in operation and has been stopped at the end of a production cycle. Under such conditions a threaded nipple previously completed will be supported by the head-stock mandrels M, and a new nipple blank will lie within the jaws 470 of the transverse feed slide. When it is desired to start the machine, the manual control lever 400 at the rear of the machine is shifted to cause the engagement of clutch 414, 415, whereby the driven sections of clutch shaft U are connected to the continuously revolving section U—212 of said shaft. The setting in motion of the driven clutch shaft section U—360 causes the cycle shaft X to be revolved at a speed of one revolution in twelve seconds, the said cycle shaft being driven through the reduction gearing b. The revolution of the cycle shaft through trip block 372 carried on trip disk 371 brings about the engagement of clutch 361, 362, for four consecutive revolutions of the clutch shaft section U—360 at a speed of 120 R. P. M., the clutch disengaging pin 366 being restrained from disengaging the clutch for a period of approximately two seconds by the cam e' on shaft Q. Through such engagement of the said clutch, the main cam shaft Q is caused to execute one complete revolution and then come to rest, the connection between said clutch and the cam shaft being established through the uniform acceleration device which includes pinion 355 mounted upon the clutch shaft and the multilated gear 356 mounted upon the said cam shaft. This rotation of cam shaft Q results in the separation of the two head-stocks and the head-stock mandrels, whereby the previously completed nipple supported upon the mandrels, is permitted to drop out of the way and falls into any suitable receptacle. Simultaneously with the moving apart of the head stocks and mandrels M, the transverse feed mechanism is actuated by the cam S carried upon the said main cam shaft Q, the new nipple blank reposing within the jaws 512 of the transverse feed slide being carried transversely from the longitudinal feed line into axial alignment with the mandrels M, in which position it is momentarily brought to rest. When this occurs, the head-stocks and mandrels are brought together under the control of cams P and R, the mandrels penetrating the nipple blank held in the transverse feed jaws 470. Upon the completion of the single revolution of cam shaft Q, the cam S causes the withdrawal of the transverse feed slide, the friction jaws 470 being permitted to spring apart by the yielding of spring 510 as they are pulled off the blank engaged between them, the said blank at this time being securely held against axial displacement by the aforesaid penetration of the mandrels therein. The actuation of the head-stocks and transverse feed mechanism occupies a period of approximately two seconds. Thereafter, these parts remain stationary for the remainder of the immediate production cycle. Upon the completion of the above described movements, the cycle shaft will have rotated through a sufficient angle to cause the engagement of cycle shaft trip block 284 with the friction clutch timing mechanism, whereby clutch 210, 211 is engaged. The said clutch makes one complete revolution and is then automatically disengaged, such revolution resulting in a shifting of the friction clutch control cam W through an angle of 120°, whereby the friction clutch drive which was in neutral at the beginning of the cycle, is shifted into the forward driving position. The spindle heads D are thus caused to revolve, and in their rotation to be advanced by the stationary spindle nuts O, whereby the thread cutters or chasers E complete the threading of the nipple blank. The rotation of spindle drive shaft H causes a trip block on oscillating trip disk K to be brought into engagement with the trip pin 317 upon the completion of the threading operation, and through this tripping action the clutch 210, 211 is again engaged for a second complete revolution, whereby the friction clutch controlling cam W is shifted through a further 120 degrees, thus setting the friction drive in reverse. Thereafter, the spindle heads are backwardly rotated to back the cutters off the threaded nipple. The backward rotation of the cutters is checked by the engagement of the second trip block carried by oscillating trip disk K, with trip pin 17, through which tripping action the third engagement of clutch 210, 211 for a single revolution is brought about, and thereby the clutch-control cam W rotated through the final 120 degree movement which restores it to its initial position, and in which position the friction clutch mechanism controlled by the cam is set in neutral. A production cycle of the machine has now been completed. There remains only to be considered the action of the longitudinal blank-feeding mechanism which occurs during the threading of the nipple blank. This action is as follows:

When the transverse feed slide has been almost restored to its outer or receiving position after having delivered a blank to the head-stock mandrels, the trip finger 530 carried by the slide-actuating arm 515 engages the rock shaft arm 534 and thereby causes the engagement of clutch 491, 492 for a single revolution. Through said clutch engagement the cam 453 is turned through one complete revolution, resulting in the reciprocation of longitudinal feed bar 441, whereby a blank is carried from the magazine feed line into the friction jaws 470 of the transverse feed slide, the said blank being deposited within said jaws with the internal keys of the blank definitely oriented with respect to the keyways of the head-stock mandrels which will subsequently engage the said blank. This action of the longitudinal blank-feeding mechanism takes place in less than one-third the time required to complete the threading of a nipple blank and the backing off of the thread cutters. Should a defective blank be internally restricted so as to prevent it from freely sliding onto the feed mandrel 454 at the end of longitudinal feed bar 441, said blank will be carried by the movement of the feed bar completely through the friction jaws 470 of the transverse feed slide and into the blank rejector head 540, where such blank will act upon trip bar 551 to bring about a second actuation of the longitudinal blank feed. If the second or re-feed action picks up a normal blank, such blank will be properly positioned within the jaws 470 of the transverse feed slide, and at the same time the previously rejected blank will be drawn out of the rejector head 540 by ejector claws 577, the said claws being actuated by ejector bar 445 which is connected to the longitudinal feed bar 441 and moved synchronously therewith. The aforesaid ejection of the rejected blank permits trip bar 551 to rise into its normal position, thereby permitting the automatic disengagement of clutch 491, 492, so that the longitudinal blank feed mechanism will thereafter remain inactive during the remainder of the immediate production cycle.

It will be apparent that the mechanism hereinbefore described is adapted to perform a variety of turning and screw-cutting operations such as are ordinarily performed by automatic turning and screw-cutting machines, its use in the production of the particular form of threaded nipple being set forth merely by way of example. It will also be understood that while only a single embodiment of the mechanism according to the present invention has been hereinbefore described and illustrated, the invention is not limited thereto but may be otherwise variously modified and embodied without departing from the spirit thereof, as set forth in the following claims:

What I claim is:

1. Mechanism for threading a tubular blank, said mechanism comprising opposed head-stocks, at least one of which is reciprocatably mounted, a hollow spindle rotatively supported in each of said head-stocks, thread-cutting tools carried at adjacent ends of said spindles, non-rotatable mandrels extending through said hollow spindles and adapted to engage an inner surface of the blank whereby to support the blank against torsional displacement, a screw-thread connection between said spindles and their respective head-stocks whereby rotation of the spindles results in their axial movement in accordance with the pitch of the thread which is to be cut, automatic means for rotating said spindles first in one direction and then the other whereby to thread the blank and then back off the cutting tools, and automatic head-stock reciprocating means acting in timed relationship with respect to the said spindle rotating means and operative upon the disengagement of the thread-cutting tools to effect a separation of the head-stocks whereby to more rapidly separate the spindles carried thereby and thus expedite the removal of the threaded article and substitution of a new blank.

2. The mechanism according to claim 1, further characterized in that means are provided to reciprocate the said mandrels, the mandrels having expansible heads within which are carried axially slidable head expander elements, the said elements extending beyond the ends of the mandrel heads and being disposed so that when the mandrels are moved together by said reciprocating means the said expander elements will abut one against the other, the continued advance of the mandrels bringing about the expansion of the mandrel heads within the tubular blank.

3. The mechanism according to claim 1, further characterized in that for threading an internally-keyed tubular blank, the said mandrels are each correspondingly formed to operatively engage the blank key at opposite ends.

4. The mechanism according to claim 1, further characterized in that for threading an internally-keyed tubular blank, the said mandrels are correspondingly formed to operatively engage the blank key at opposite ends, separate means being provided to reciprocate said mandrels independently of said head-stocks, said mandrel reciprocating means acting in timed relationship with said head-stock means to cause the mandrels to advance and engage a blank from opposite ends prior to the full advance of the head-stocks.

5. The mechanism according to claim 1, further characterized in that the said spindle rotating means comprises automatically-controlled forward and reverse driving clutches to alternately rotate said spindles, the reverse driving clutch being adapted to cause the spindles to rotate backwardly at a faster rate than they are advanced by said forward driving clutch, and mandrel reciprocating means being also provided, said reciprocating means acting in timed relationship with respect to the said head-stock reciprocating means and to said automatic clutches whereby in each production cycle the separation of the head-stocks and mandrels will occur after the thread-cutting tools have been backed off the threaded article.

6. Mechanism for externally threading a tubular blank, said mechanism comprising a slidable head-stock, a hollow line spindle, a thread-cutting tool mounted at one end of said spindle, automatic means to alternately rotate said spindle forwardly to cut a thread, then backwardly to spin the tool off the thread, cooperating screw threads carried by said head-stock and said spindle whereby the latter is caused to shift axially of the head-stock in accordance with the pitch of the thread which is to be cut on the blank, a mandrel adapted to rigidly support a blank against the torque reaction of the said cutting tool, said mandrel being axially slidable within said spindle and non-rotatively secured with respect to said head-stock, and automatic actuating means to reciprocate both the said mandrel and slidable head-stock in timed relationship with respect to the automatically-controlled rotation of said spindle.

7. The mechanism according to claim 6, further characterized in that a spring-pressed sleeve surrounds said mandrel, said sleeve being adapted to resiliently engage the end of the said blank when the mandrel is inserted therein.

8. The mechanism according to claim 6, further characterized in that between said mandrel and said hollow spindle an axially slidable sleeve is mounted, said sleeve being slidably keyed to said mandrel and slidably and non-rotatively connected to said head-stock, spring means being interposed between said head-stock and said sleeve whereby the latter is resiliently urged against the end of the blank when the head-stock is advanced, the said sleeve by its non-rotative connection with said head-stock also serving to support the mandrel, to which it is keyed, against torsional displacement.

9. Mechanism for threading tubular blanks having one or more radially disposed abutment surfaces, said mechanism comprising right and left hand thread-cutting tools, each having a plurality of cutting edges disposed to engage the blank at substantially equally spaced points circumferentially thereof, and blank holding means adapted to engage at least one of the radial abutment surfaces of said blank to rigidly resist the torque reaction of the said cutting tools when relative rotation occurs between said tools and the blank-holding means during the threading of the blank, the said blank-holding means being formed to permit movements of the blank transverse to the axis about which the threads are formed while maintaining positive driving engagement with the said abutment surface of the blank whereby the blank, while thus torsionally supported, is permitted a transverse floating movement tending to equalize the depth of cuts of the said cutting edges of the tools.

10. The mechanism according to claim 9, further characterized in that the said blank-holding means comprises a mandrel adapted to enter a tubular, internally-keyed blank, the mandrel being of a smaller diameter than the internal diameter of the blank and having longitudinal keyways adapted to receive the inwardly projecting keys of the blank, the said keyways having a width and depth greater than the width and radial thickness of the said blank keys whereby through the engagement of said blank keys in the mandrel keyways, the blank is non-rotatively supported on said mandrel while being permitted to shift transversely thereof in any axial plane to equalize the cuts made by the several cutting edges of the thread cutting tools.

11. Nipple-threading mechanism comprising a rotary thread-cutting means, an expansible mandrel adapted to enter said nipple from one end, abutment means disposed toward the opposite end of said nipple, means to reciprocate said mandrel, and mandrel expanding means actuated by engagement with said abutment means and the ensuing advance of said mandrel into the nipple whereby as the mandrel is advanced within the nipple it will be expanded therein.

12. Nipple-threading mechanism comprising rotary thread-cutting means, expansible mandrels adapted to enter said nipple from opposite ends, tapered elements adapted to expand said mandrels when pressed into the ends thereof, said elements being disposed in such manner as to press against each other when the mandrels are moved together, whereby when the mandrels are moved together within the nipple they are expanded.

13. Mechanism for threading an internally keyed blank, said mechanism comprising a non-rotatable mandrel formed to receive the blank key when the mandrel is inserted within the blank, an axially slidable sleeve surrounding said mandrel, an abutment against which one end of the blank is supported against axial displacement, yielding means to hold said sleeve against the other end of said blank, and a rotary threading tool to thread said blank while the latter is engaged between said abutment and said sleeve.

14. Blank-threading mechanism comprising a slidable head-stock, cam means to reciprocate said head-stock whereby to permit the removal of the threaded blank and subsequent insertion of a new blank, a drive shaft, a clutch between said shaft and a source of power, and a positive acceleration coupling between said drive shaft and the said cam means adapted upon rotation of the said shaft to gradually accelerate said cam means.

15. The mechanism according to claim 14, further characterized in that an automatic clutch-shifting means is provided, said clutch-shifting means being adapted to periodically effect the engagement of the said clutch for a period sufficient to cause the said cam means to be rotated through one complete revolution whereby the head-stock will be caused periodically to slide away from the position occupied by the blank and return to its normal position relative to the new blank which is substituted during the sliding movement of the head-stock.

16. Blank-threading mechanism comprising a thread-cutting tool, a forward driving friction clutch adapted to advance said tool relative to the blank to cut a thread thereon, a reverse driving friction clutch adapted to withdraw said tool from the threaded blank, a friction-clutch controlling cam adapted in one control position to effect the engagement of said forward driving clutch, in a second control position to effect the engagement of the reverse driving clutch and in the third control position to set both clutches in neutral, a power shaft, a timing clutch which when engaged affords an operative connection between said power shaft and said friction-clutch controlling cam, and automatic clutch timing means adapted periodically to engage and disengage said timing clutch whereby said friction clutch controlling cam will intermittently be successively advanced from one control position to the next, thereby successively causing the advance, withdrawal and bringing to rest of the said tool relative to the blank.

17. The mechanism according to claim 16, further characterized in that the said timing clutch comprises driving and driven elements adapted to be engaged and disengaged by relative axial movement, the said automatic clutch timing means comprising a spring to engage said timing clutch elements, a cam track carried by the driven element of said timing clutch, a clutch restraining and disengaging pin cooperating with said cam track, a primary timing cycle-shaft trip adapted at intervals, representing the normal production cycle of the machine, to momentarily withdraw said pin from said cam track whereby to permit the spring engagement of the said timing clutch elements, yielding means adapted to return said pin into operative engagement with the cam track whereby the said clutch element will be disengaged upon the completion of one revolution of the driven element, reduction gearing interposed between the said driven clutch element and the friction clutch controlling cam, said gearing rotating said controlling cam from one control position to another upon each revolution of the said driven clutch element, and secondary timing means operatively connected to the thread-cutting tool adapted respectively upon a predetermined advance and withdrawal of said tool to momentarily withdraw the said clutch-restraining pin whereby through the resultant single revolutions of the driven element of the said timing clutch, the friction clutch controlling cam will be shifted respectively to the control positions corresponding to reverse drive and neutral, the said controlling cam thereafter being set in the position corresponding to forward drive by the primary timing action of the said cycle shaft trip.

18. Blank-threading mechanism comprising a thread-cutting tool, a reversible friction drive therefor, a controlling cam adapted in three different control positions to set said friction drive in forward, reverse and neutral, primary timing means actuated by a continuously rotating shaft and adapted at the desired interval of a production cycle to bring about the setting of said controlling cam in the angular position resulting in a forward drive of the said thread-cutting tool, and secondary timing means actuated in accordance with the forward and reverse movements of said tool, said secondary timing means being adapted upon a predetermined advance of said tool to set said controlling cam in the control position corresponding to reverse drive, and upon a predetermined retreat of said tool to set said cam in the control position corresponding to neutral, the cyclic period of the said primary timing means being of sufficient duration to permit of the controlling cam being restored by the said secondary timing means to the position corresponding to neutral prior to the subsequent initiation of a new cycle by said primary timing means.

19. The mechanism according to claim 18, further characterized in that manually controlled means are provided to stop and start the said continuously rotating shaft of the primary timing means without interfering with the operation of the thread-cutting tool during the engagement of said tool with the blank, the stopping of the said shaft only insuring that a new production cycle will not thereafter be initiated but permitting the completion of the immediate cycle regardless of the time at which the said shaft is stopped because of the continued operativeness of the friction drive controlled by the independent secondary timing means.

20. Blank-threading mechanism and the like, comprising a cutting tool adapted to perform a desired operation upon a blank, a friction drive therefor, primary timing means which is advanced at a rate accurately proportionate to the advance of the driving element of the said friction drive, said primary timing means being adapted at regular intervals to initiate a relative movement between said tool and blank, and secondary timing means actuated by said relative movement and adapted to reverse said movement after a predetermined run and to stop said movement after a corresponding reverse run.

21. The mechanism according to claim 20, further characterized in that separate drives are provided for rotating said cycle shaft and for producing relative movement between said tool and blank, the cycle shaft drive including a manually-controlled clutch whereby at any phase of a production cycle the cycle shaft may be stopped while the said separate drive for producing relative movement between the tool and blank continues to be operative under the control of the said secondary timing means.

22. Blank-threading mechanism and the like, including a cutting tool, a mandrel to internally support a blank while work is being performed thereon by said tool, a transverse feed slide adapted to frictionally engage a blank and deliver it into alignment with said mandrel, mandrel-reciprocating means adapted to cause said mandrel to penetrate the blank while the latter is held by said transverse feed slide and to support the blank during the engagement of the tool therewith, the withdrawal of the mandrel thereafter releasing the blank, a reciprocatable longitudinal feed slide, a guideway along which the blank is propelled by said longitudinal slide into a position to be engaged by the said transverse feed slide, a blank magazine adapted to deliver one blank at a time into said guideway, and means adapted to reciprocate said feed slides and said mandrel in timed relationship whereby a blank is carried by the longitudinal feed slide into the transverse feed slide while the latter is stationary at one end of its run, the mandrel being advanced to engage the blank after the said transverse feed slide has been advanced and come to rest at the opposite end of its run.

23. The mechanism according to claim 22, further characterized in that to handle internally-keyed nipple blanks or the like, the said mandrel is provided with a number of keyways at least equal to the number of keys on the blank, the end of said longitudinal feed slide substantially corresponding in peripheral dimensions at its blank-engaging portion to the peripheral dimensions of the mandrel, means being provided along the said guideway to produce relative rotation between said longitudinal slide and the blank whereby the keyways at the end of said longitudinal feed slide will be caused to register with and thereafter engage the blank keys, the said end of the slide penetrating the blank and propelling it into the transverse feed slide with the blank keys so oriented as to be freely engaged by the said mandrel keyways when the blank is carried by said transverse slide into alignment with the said mandrel.

24. The mechanism according to claim 22, further characterized in that to handle internally-keyed nipple blanks or the like, the said mandrel is provided with a number of keyways at least equal to the number of keys on the blank, the end of said longitudinal feed slide substantially corresponding in peripheral dimensions at its blank-engaging portion to the peripheral dimensions of the mandrel, and carrying a stop adapted to regulate the penetration of the said end of the slide into the blank whereby the normal blank will be carried into a predetermined linear position with respect to the transverse feed slide, means being provided to rotate the said longitudinal feed slide through a predetermined angle as it is propelling the blank toward the transverse slide, and friction means being also provided along the said guideway to restrain the blank from rotating as it is being propelled therethrough until the said keyways of the longitudinal slide are caused by the rotation of said slide to register therewith, whereafter the advancing longitudinal slide penetrates the blank and rotates it so that the blank is delivered to the transverse slide with its keys in a predetermined angular position.

In witness whereof, I have hereunto signed my name.

CHARLES R. GABRIEL.

CERTIFICATE OF CORRECTION.

Patent No. 1,914,085.  June 13, 1933.

CHARLES R. GABRIEL.

It is hereby certified that error appears in the printed specification of the above numbered patent requiring correction as follows: Page 1, line 96, for "automotive" read "automatic"; page 2, line 18, for "consequently" read "consecutively"; page 5, line 69, for "displacel" read "displaced"; page 7, line 67, for "collect" read "collet"; and line 124, for "dimeinsions" read "dimensions"; page 22, line 82, for "on" read "an"; page 24, line 37, for "real" read "rear"; and that the said Letters Patent should be read with these corrections therein that the same may conform to the record of the case in the Patent Office.

Signed and sealed this 15th day of August, A. D. 1933.

M. J. Moore.

(Seal)  Acting Commissioner of Patents.